United States Patent [19]

Kinoshita et al.

[11] Patent Number: 4,470,676
[45] Date of Patent: Sep. 11, 1984

[54] FOCUS DETECTING DEVICE

[75] Inventors: Takao Kinoshita, Tokyo; Takashi Kawabata, Kanagawa; Kazuya Hosoe, Tokyo; Tokuichi Tsunekawa, Yokohama; Toshio Sakane, Yokohama, all of Japan

[73] Assignee: Canon Kabushiki Kaisha, Tokyo, Japan

[21] Appl. No.: 59,635

[22] Filed: Jul. 23, 1979

[30] Foreign Application Priority Data

Jul. 28, 1978 [JP] Japan .................. 53-92099
Dec. 4, 1978 [JP] Japan .................. 53-150378

[51] Int. Cl.³ .................. G03B 3/00; G01J 1/36
[52] U.S. Cl. .................. 354/406; 250/204; 354/409
[58] Field of Search .............. 354/25, 31, 25 A, 25 N, 354/25 P, 31 F, 60 L, 53, 60 E, 198; 352/140; 250/201, 204, 578, 214 AG; 356/1, 4, 5; 355/56; 328/144; 307/493, 211 D; 357/24, 29-32; 365/183; 235/92 U, 92 EA, 92 SA

[56] References Cited

U.S. PATENT DOCUMENTS

| 3,621,136 | 11/1971 | Stanwood | 358/227 X |
|---|---|---|---|
| 3,896,304 | 7/1975 | Aoki et al. | 354/25 X |
| 3,906,389 | 9/1975 | Matsumoto et al. | 354/25 A X |
| 3,930,261 | 12/1975 | Stauffer | 354/25 |
| 4,083,056 | 4/1978 | Nakamura et al. | 354/25 |
| 4,117,325 | 9/1978 | Holle et al. | 250/201 X |
| 4,157,217 | 6/1979 | Isono | 354/25 |
| 4,178,098 | 12/1979 | Asano et al. | 354/25 X |
| 4,183,642 | 1/1980 | Fukuoka | 354/25 |
| 4,203,031 | 5/1980 | Kamachi et al. | 250/201 |
| 4,301,471 | 11/1981 | Holscher et al. | 250/578 X |
| 4,333,717 | 6/1982 | Tamura | 354/25 |

FOREIGN PATENT DOCUMENTS

| 43-10265 | 4/1968 | Japan . |
| 51-141649 | 12/1976 | Japan ................ 354/25 R |

OTHER PUBLICATIONS

"Two Dimensional Charge Transfer Arrays", IEEE Journal of Solid-State Circuits, by Carlo H. Sequin, vol. SC9-9, No. 3, Jun. 1974, pp. 134–142.
Frosch, et al., "Optical Microtopography Measurement and/or Automatic Focussing", IBM Technical Disclosure Bulletin, vol. 15, No. 2, 7/72, pp. 504–505.

Primary Examiner—William B. Perkey
Attorney, Agent, or Firm—Toren, McGeady and Stanger

[57] ABSTRACT

In the device disclosed, an image formed by an optical system is scanned by an image sensor composed of independently arranged photoelectric transducing elements to produce an image scanning signal. A detecting circuit detects the variation of the brightness between the adjacent image elements as a measure of the sharpness of the image and the focus of the optical system. The focus detection accuracy is improved by non-linear transformation of the brightness variation signal with a non-linear transformation circuit that weighs the brightness variation signal on the basis of the signal level.

42 Claims, 173 Drawing Figures

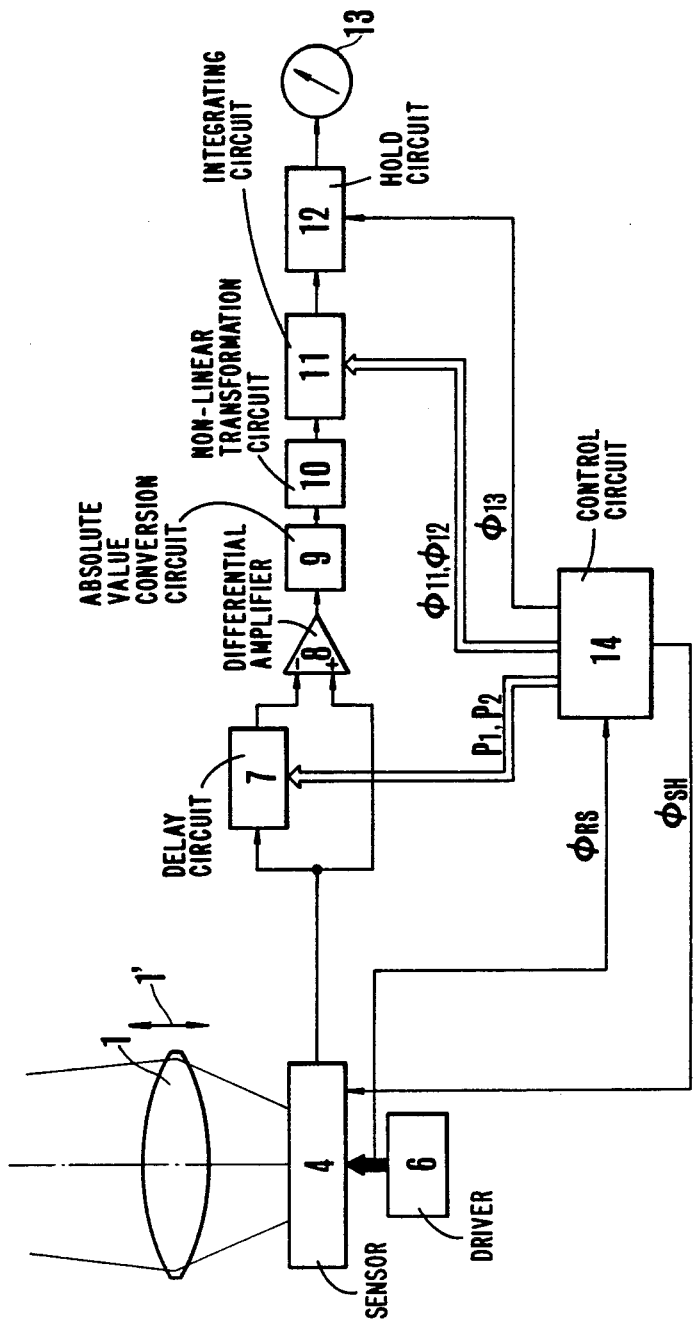

FIG. 6a  IMAGE PATTERN 
FIG. 6b  4-OUTPUT
FIG. 6c  7-OUTPUT 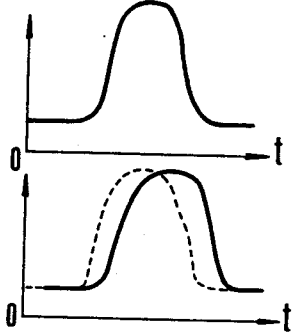
FIG. 6d  8-OUTPUT 
FIG. 6e  9-OUTPUT 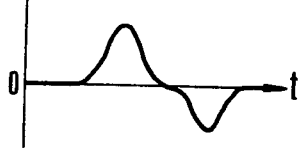
FIG. 6f  10-OUTPUT 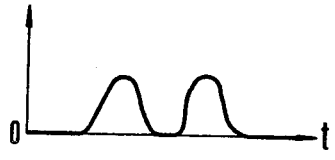
FIG. 6g  12-OUTPUT 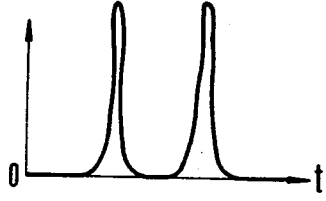

FIG.8
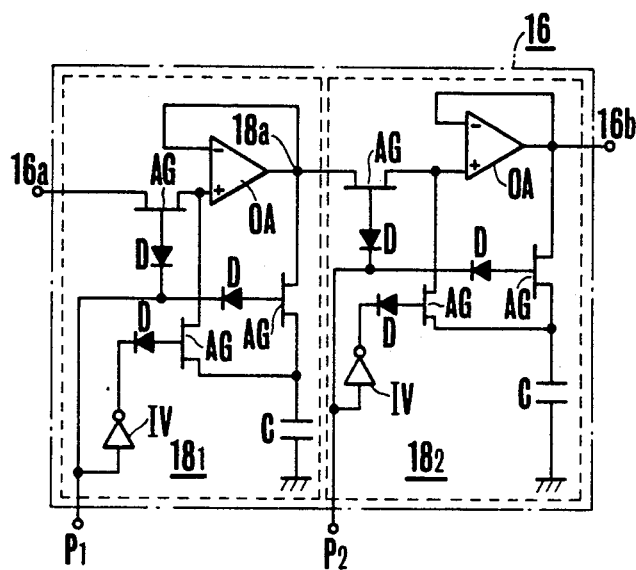
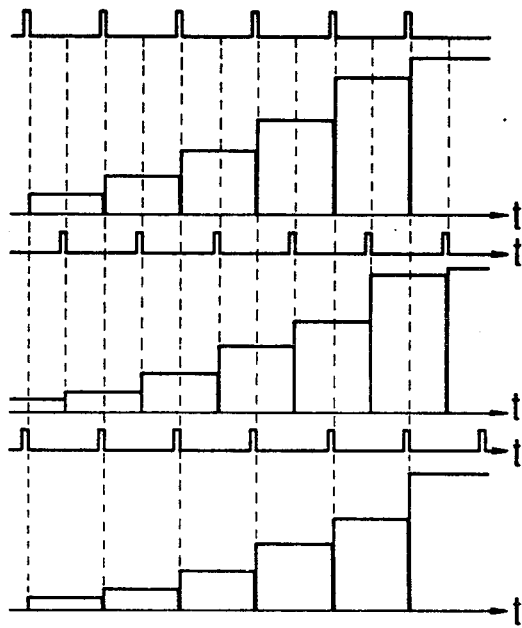
FIG.9a  φRS
FIG.9b  16a-INPUT
FIG.9c  P1
FIG.9d  18a-OUTPUT
FIG.9e  P2
FIG.9f  16b-OUTPUT FIG.16
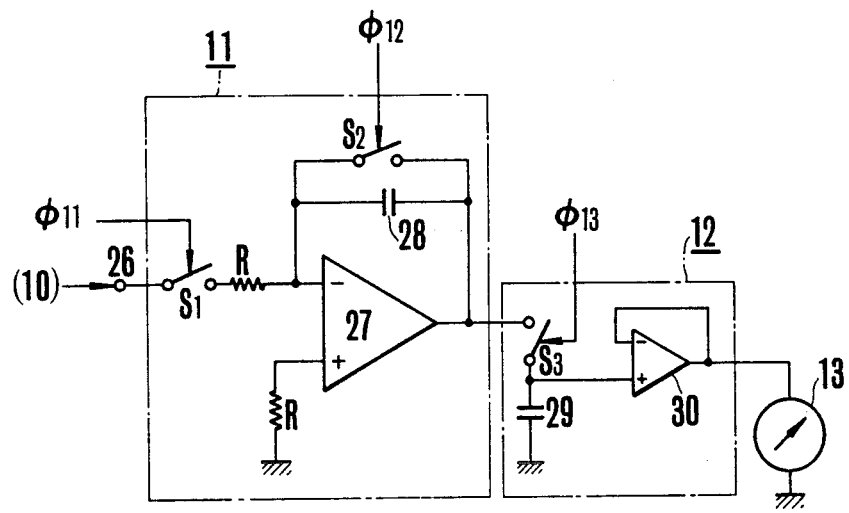
FIG.17a $\phi_{SH}$
FIG.17b 26-INPUT
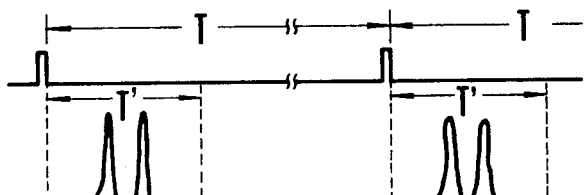
FIG.17c $\phi_{11}$
FIG.17d $\phi_{12}$
FIG.17e $\phi_{13}$
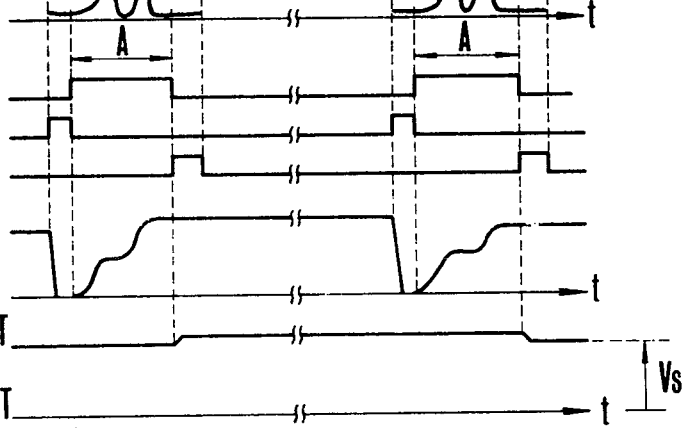
FIG.17f 11-OUTPUT
FIG.17g 12-OUTPUT

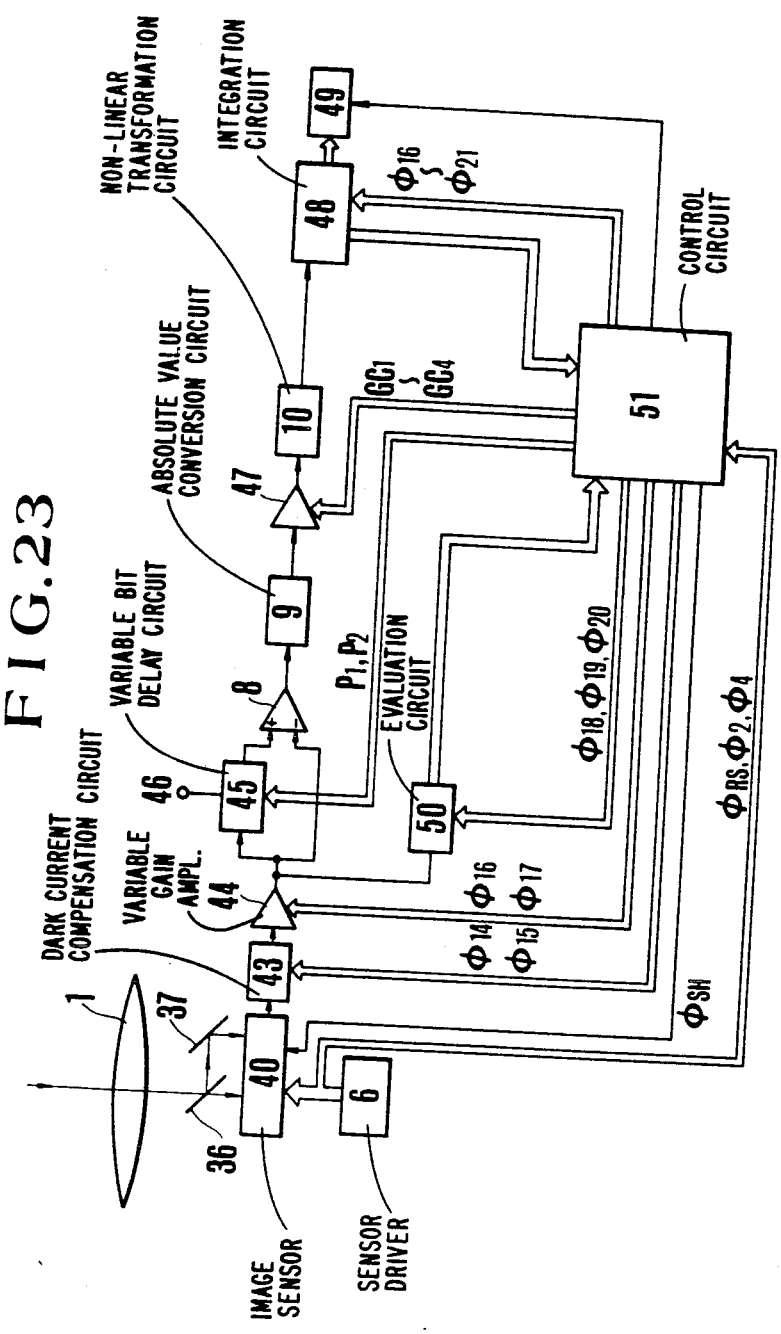

FIG. 24a  IMAGE PATTERN 
FIG. 24b  40-OUTPUT 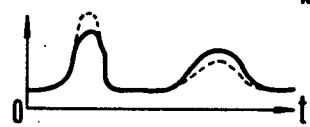
FIG. 24c  43-OUTPUT 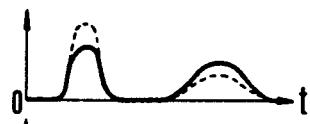
FIG. 24d  44-OUTPUT 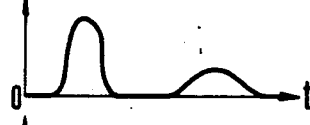
FIG. 24e  45-OUTPUT 
FIG. 24f  8-OUTPUT 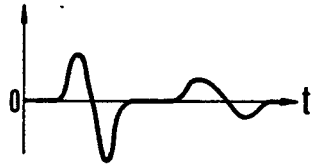
FIG. 24g  9-OUTPUT 
FIG. 24h  10-OUTPUT
FIG. 24i  48-OUTPUT 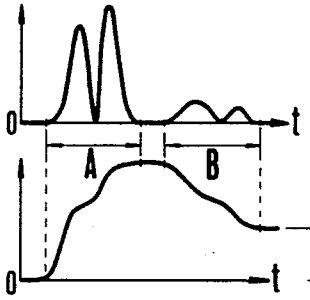

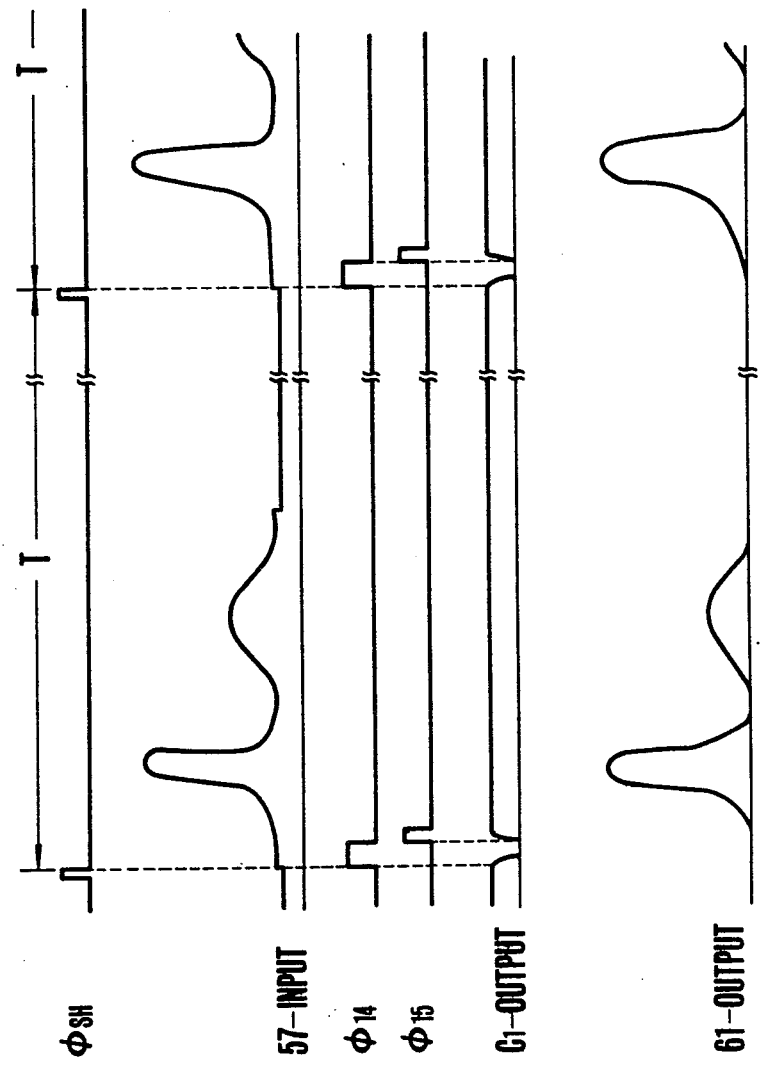

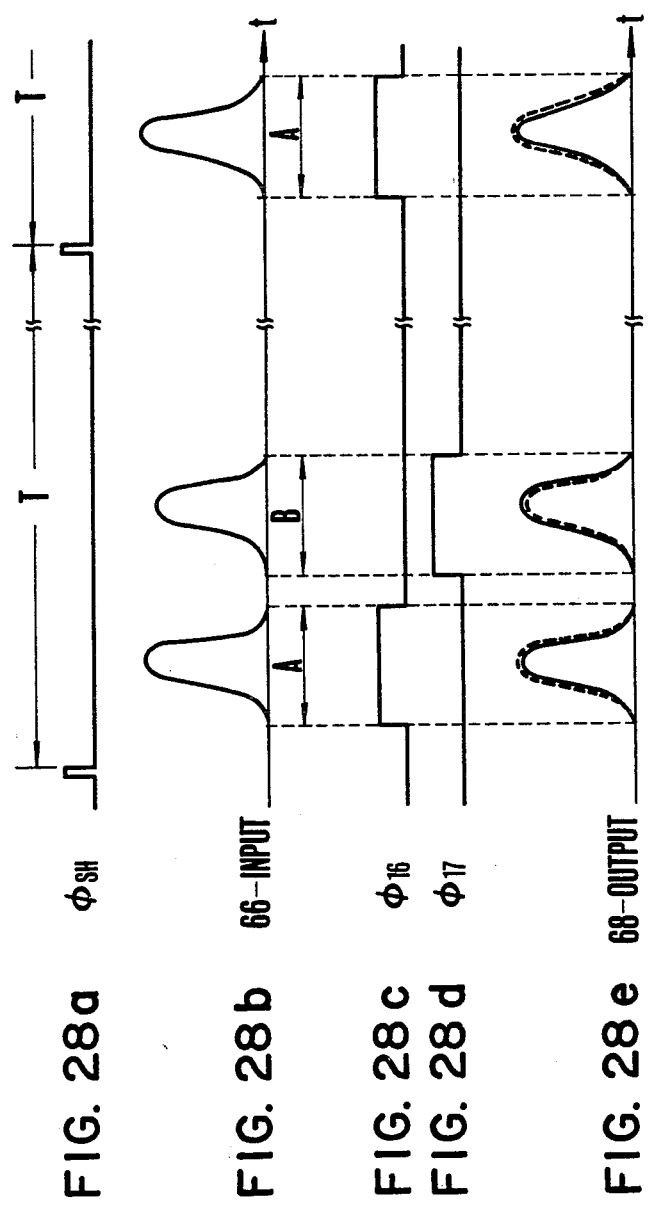

FIG.29
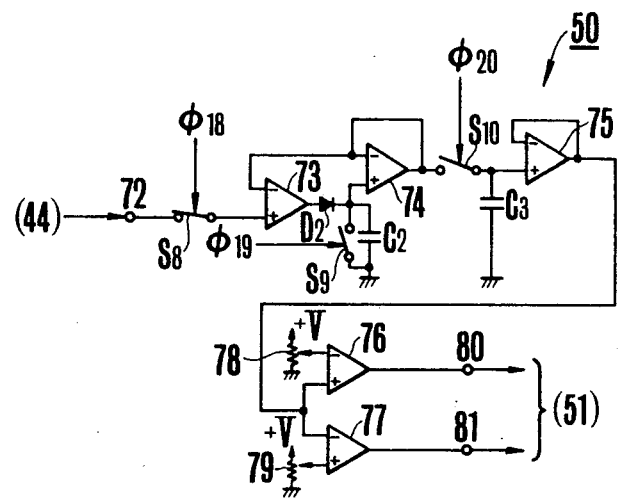
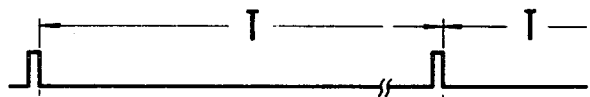
FIG.30a  φSH
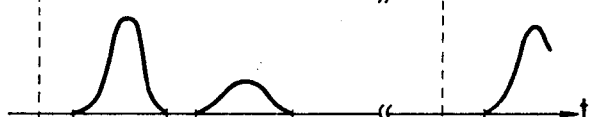
FIG.30b  72-INPUT
FIG.30c  φ18
FIG.30d  φ19
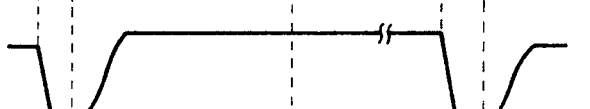
FIG.30e  74-OUTPUT
FIG.30f  φ20
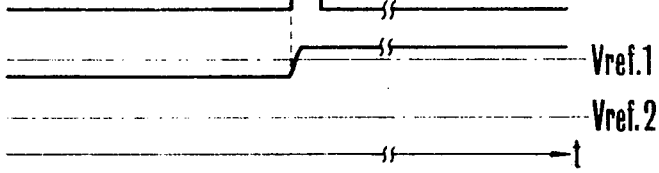
FIG.30g  75-OUTPUT FIG. 31
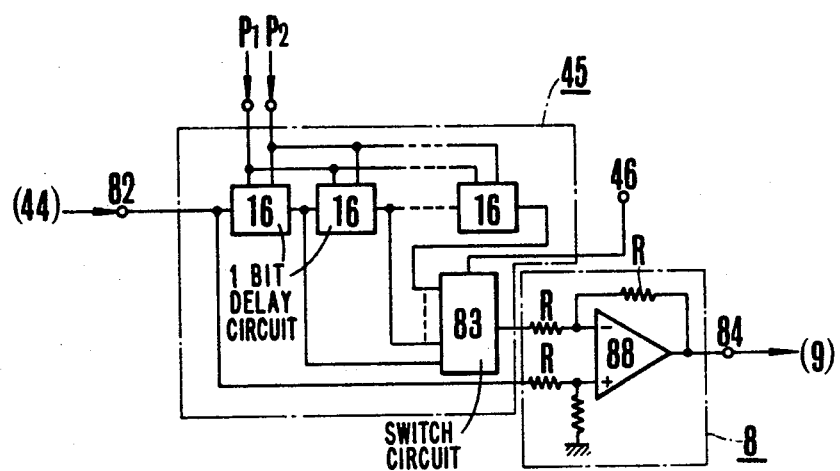
FIG. 32a
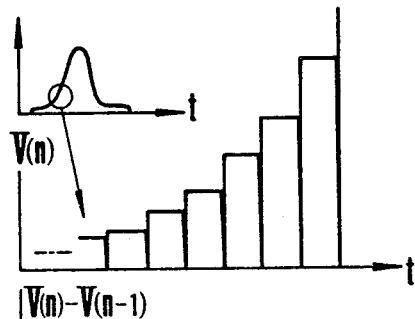
FIG. 32b
FIG. 32c
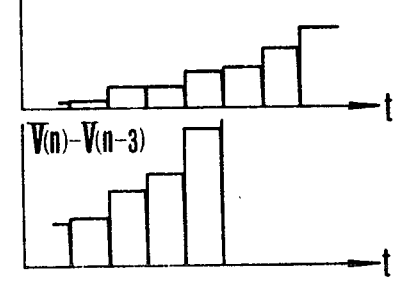
FIG. 32d

| Fno. | n |
|---|---|
| 1.2 | 1 |
| 1.4 | 2 |
| 2 | 3 |
| 2.8 | 4 |
| 3.5 | 5 |
| 4 | 6 |
| 4.5 | 7 |
| 5.6 | 8 |
| 8 | 12 |
| 11 | 16 |
| ..... | ..... |

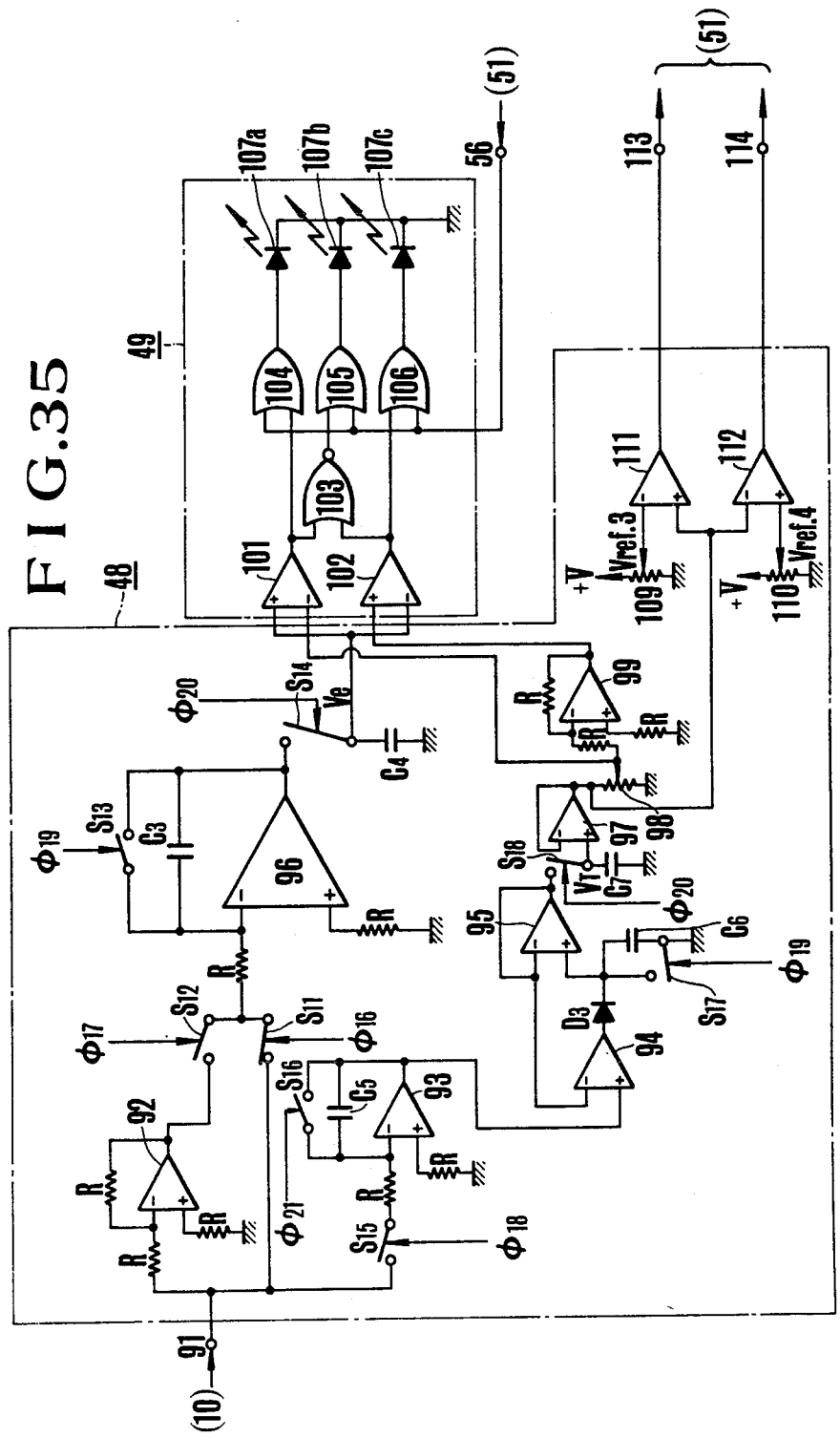

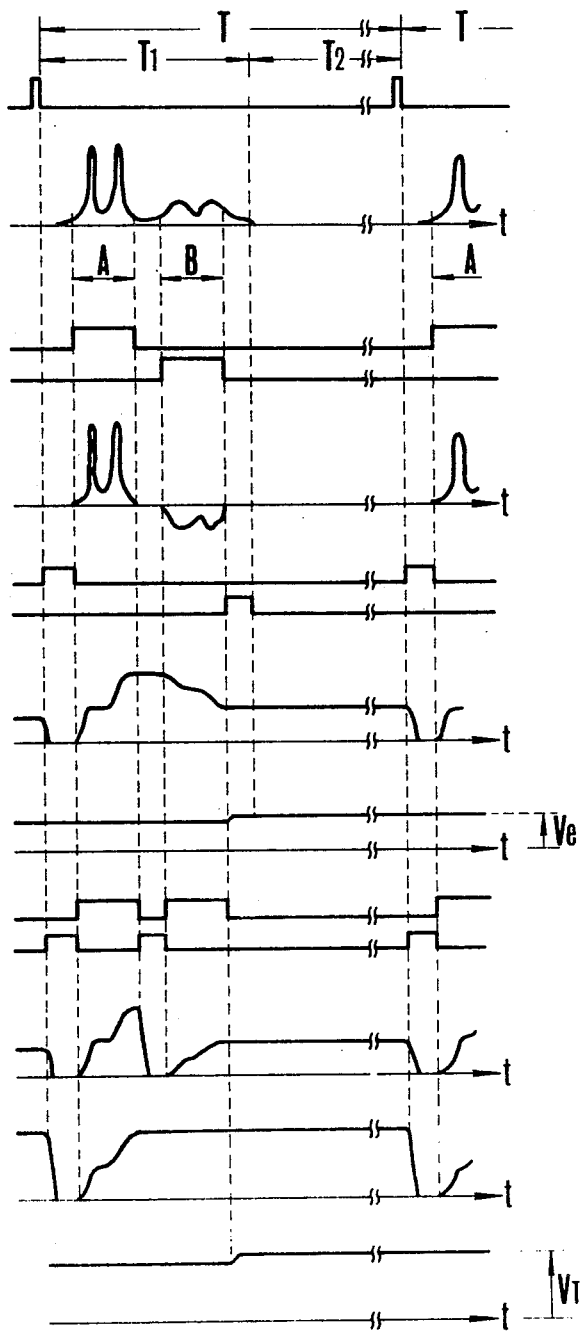
FIG. 36a $\phi_{SH}$
FIG. 36b 91-INPUT
FIG. 36c $\phi_{16}$
FIG. 36d $\phi_{17}$
FIG. 36e 96-INPUT
FIG. 36f $\phi_{19}$
FIG. 36g $\phi_{20}$
FIG. 36h 96-OUTPUT
FIG. 36i 100-OUTPUT
FIG. 36j $\phi_{18}$
FIG. 36k $\phi_{21}$
FIG. 36l 93-OUTPUT
FIG. 36m 95-OUTPUT
FIG. 36n 97-OUTPUT FIG. 44a  IMAGE PATTERN 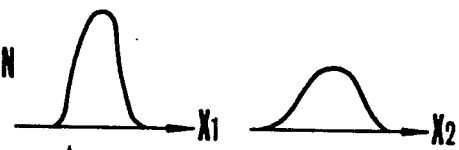
FIG. 44b  4,4'-OUTPUT 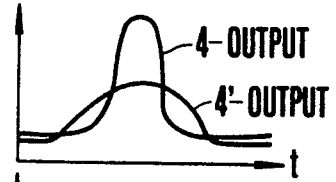
FIG. 44c  43,43'-OUTPUT 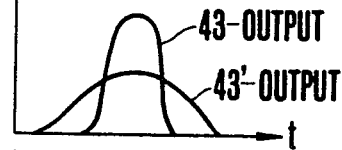
FIG. 44d  119,119'-OUTPUT 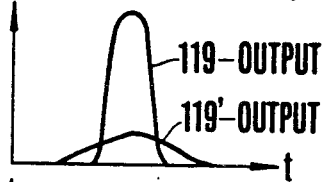
FIG. 44e  8-OUTPUT 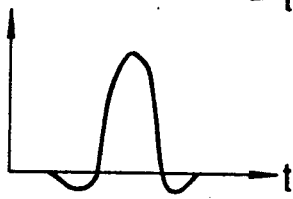
FIG. 44f  122-OUTPUT 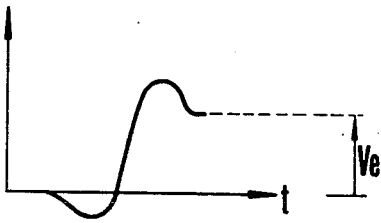

| FNO. | γ |
|---|---|
| 1.2 | 1.2 |
| 1.4 | 1.4 |
| 2 | 2 |
| 2.8 | 2.8 |
| 3.5 | 3.5 |
| 4 | 4 |
| 4.5 | 4.5 |
| 5.6 | 5.6 |
| 8 | 8 |
| 11 | 11 |
| ⋮ | ⋮ |

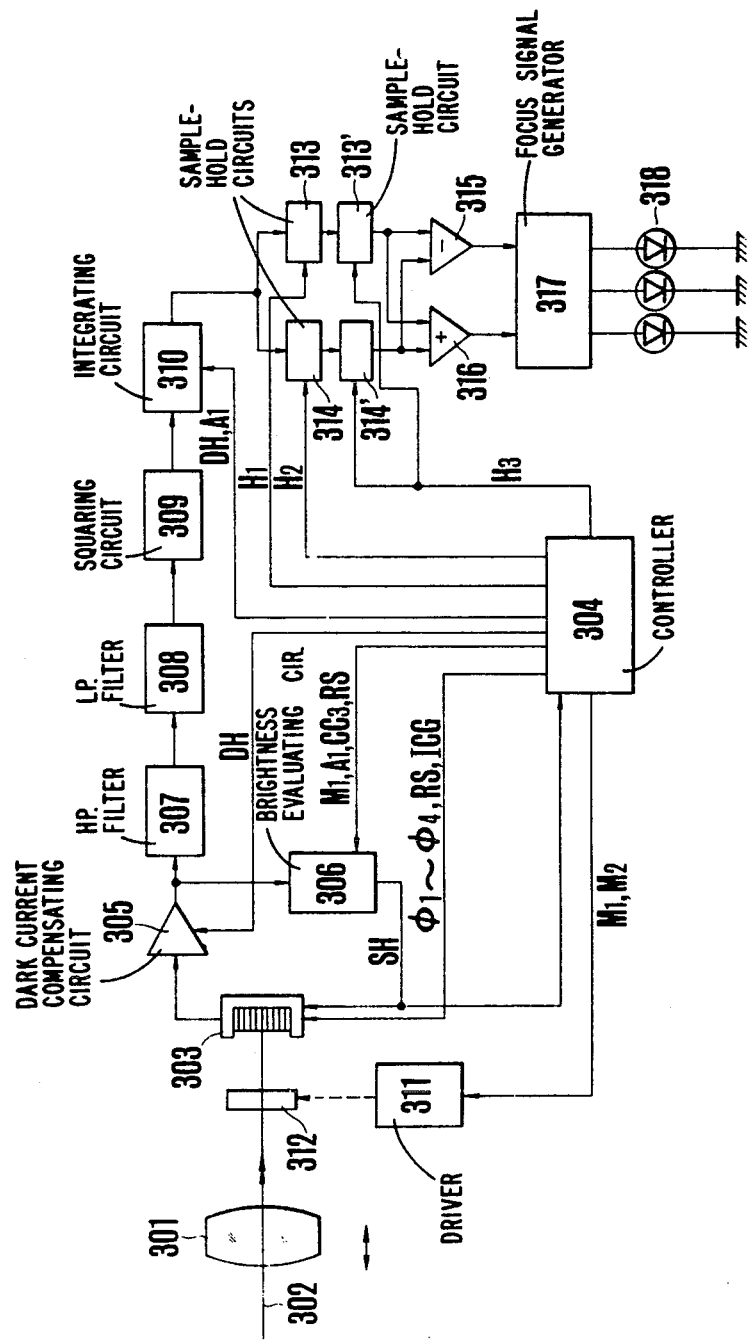
F I G. 59

FIG. 60a  305-OUTPUT 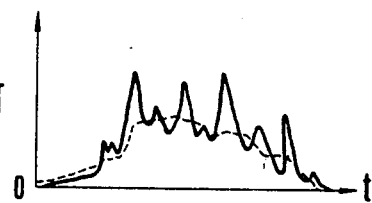
FIG. 60b  308-OUTPUT 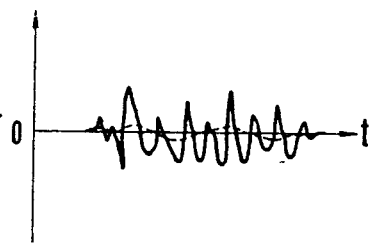
FIG. 60c  309-OUTPUT 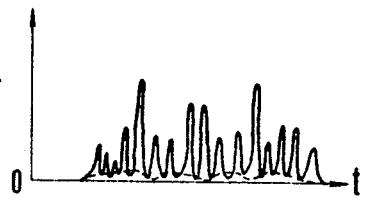
FIG. 60d  310-OUTPUT 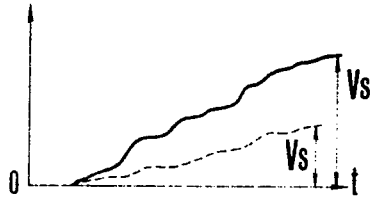

FOCUS DETECTING DEVICE

BACKGROUND OF THE INVENTION

1. Field of the Invention

The present invention relates to a focus detecting device, particularly to a device which detects the focus of an image formed with an optical system by evaluating the sharpness of the image on the basis of a signal obtained by scanning the image with an image sensor.

2. Description of the Prior Art

Various kinds of focus detecting devices of the so-called image sharpness detecting type have been proposed. For example, U.S. Pat. No. 4,047,187 (filed Mar. 31, 1975, issued Sept. 6, 1977, granted to Mashimo et al. entitled "SYSTEM FOR EXPOSURE MEASUREMENT AND/OR FOCUS DETECTION BY MEANS OF IMAGE SENSOR" (corresponding to DT-OS No. 25 14 230) and assigned to the same assignee as this application, proposes a device in which an image formed by an optical system is scanned by an image sensor composed of independently arranged photoelectric transducing elements known as a CCD photosensor, BBD photosensor or photodiode array and so on, to produce an image scanning signal. The latter is passed to a brightness variation detecting circuit by which circuit a signal corresponding to the brightness variation in each between the two adjacent image elements at each scan.

The sharpness of the object image is represented by thus obtained integrated output. The device in accordance with U.S. Pat. No. 4,047,186 is excellent in that a signal precisely corresponding to the imaging condition can be obtained with the image sensor so as to detect the image sharpness with high accuracy.

It goes without saying that even the device in accordance with U.S. Pat. No. 4,047,187 still has room for improvement, for example, with respect to the detection accuracy. For example, as is known, a photoconductive element such as a CdS and so on, can produce a non-linear brightness to output characteristic by selecting the $\gamma$ of the photoelectric material so it is not equal to 1, and it is possible to detect the image sharpness by making use of this non-linear brightness to output characteristic. On the other hand, as is generally well known, the $\gamma$ of the photoelectric transducing elements of the image sensor is equal to 1. In consequence, much of the further improvement of the detecting accuracy can be expected for example in the device in accordance with U.S. Pat. No. 4,047,187 by introducing a process for non-linearly transforming the signal representing a brightness variation in each between the adjacent two image elements, while taking the effect of the non-linear brightness to output characteristics of the photoconductive element such as CdS into consideration.

SUMMARY OF THE INVENTION

A main object of the present invention is to significantly improve the detectability as well as the focus detecting accuracy of focus detecting systems.

According to a feature of the present invention, the image scanning signal is non-linearly transformed by a non-linear transformation circuit and the image sharpness detection is carried out on the basis of this non-linearly transformed image scanning signal.

According to another feature, in the non-linear transformation circuit, the higher the level of the input signal, the more it is weighted or emphasized. According to an embodiment, a squaring circuit, a broken line approximation circuit and so on are used as or in the non-linear transformation circuit. According to another embodiment, the non-linearly transformed image scanning signal is integrated for non-linearly transformed image scanning signal is for each scan by means of an integrating circuit and the image sharpness is evaluated on the basis of the integrated output.

According to another feature of the invention, the peak value of the non-linearly transformed image scanning signal is detected in order to evaluate the image sharpness.

Another object of the present invention is to improve the ability to detect the focus as well as the accuracy of focus detecting devices.

According to another feature of the invention, this is accomplished by scanning the image formed by the optical system with the image scanning means, having the brightness variation detecting circuit detect the brightness variation between two adjacent image elements, detecting the image sharpness out on the basis of the brightness variation signal, and by realizing the same characteristics as the non-linear brightness to output characteristics of the photoconductive elements such as CdS, CdSe and so on by means of an electrical circuit.

To achieve this object, according to another feature of the invention, the brightness variation signal is non-linearly transformed by means of the non-linear transformation circuit and the image sharpness detection is carried out on the basis of thus non-linearly transformed brightness variation signal. According to another feature of the invention, the non-linearly transformed brightness variation signal is integrated for each scan by means of the integrating circuit and the image sharpness is evaluated on the basis of the integration output. In this case, the brightness variation signal from the brightness variation detecting circuit is either positive or negative and an absolute value converting circuit is provided before or after the non-linear transformation circuit. According to another feature of the invention, a squaring circuit is used as a non-linear transformation circuit, and both the non-linear transformation operation and the absolute value conversion operation are carried out at the same time. In that case, it is not necessary to provide an absolute value conversion circuit.

Where the brightness variation signal is integrated by an integrating circuit, and the image sharpness is evaluated on the basis of the integration output, the non-linear transformation of the brightness variation by the non-linear transformation circuit becomes quite important. For example, let us suppose that there is an object with a simple bright-dark pattern. If the image of the object is not sharp, a half bright range exists in the boundary between the bright part and the dark part. If the object image is very sharp, practically no half bright range exists in the boundary between the bright part and the dark part. The difference in the level between the bright part and the dark part does not vary unless the amount of light varies. Consequently, even if the brightness variation signal is integrated over a given range of the image of bright-dark pattern, the integrated value exhibits practically no difference whether the image is sharp or not, so that it is difficult to detect the image sharpness.

On the other hand, when, as mentioned above, the brightness variation signal is integrated after different weights are accorded on the basis of the level by non-linearly transforming the brightness variation signal, the integrated value differs largely on the basis of whether the image is sharp or not because the level of the signal to be integrated depends largely on whether the image is sharp or not. Hence, it is possible to carry out a very precise detection of the image sharpness.

According to another feature for image sharpness detection on the basis of the non-linearly transformed brightness variation signal, the peak value of the non-linearly transformed brightness variation signal is detected and the image sharpness is evaluated on the basis of this peak value.

According to another feature of the invention, brightness variation detecting circuit, besides including a delay circuit for delaying the image scanning signal by predetermined bits and a differential circuit for obtaining the difference between the original signal and the signal delayed by the delay circuit, includes a circuit capable of picking up only a part of the signal whose variation is comparatively large, such as high pass filter, differentiating circuit, etc.

Yet another object of the present invention is to provide a continuously stabilized focus detection. This is accomplished according to another feature by various feed back controls in the signal processing systems.

According to still another feature of the invention, the latter object may be attained in whole or in part, by stabilizing the image signal by means of various feed back controls such as ones which provide automatic control of the integrating time of the image signal of the image scanning means on the basis of the image scanning signal, or automatic gain control of the amplifier in the signal processing circuit on the basis of the non-linearly transformed image scanning signal or the brightness variation signal.

Yet another object of the present invention is automatically to adjust the detecting sensitivity of the device in accordance with the aperture value of the photographic objective lens, particularly in a single lens reflex camera.

To achieve this object, according to a feature of the present invention, the sensitivity of the device is adjusted by adjusting the non-linear transformation characteristics of the non-linear transformation circuit or varying the distance in each between the two image elements whose brightness variation is to be detected by the brightness variation detection circuit (namely, the delay bit amount of the delay circuit in case the delay circuit is combined with the differential circuit) in accordance with the aperture value of the photographing lens used in the camera. This is particularly effective if this kind of device is used in a single lens reflex camera.

Another object of the present invention is, besides the afore-mentioned objects, to detect not only whether the image-forming optical system is in focus or out of focus but also whether it is focused ahead of or behind the intended image plane such as the photosensitive circuit, (i.e. whether it is before focus or behind focus condition) with high accuracy when it is out of focus.

For this object, it is a feature of the present invention that the image formed by the image-forming optical system is scanned by means of the image scanning means at two positions before and behind the predetermined focal plane of the image-forming optical system at the same distance from the focal plane so that whether it is in focus, before focus or behind focus is detected through comparison of the two image scanning signals then obtained at the two positions. According to one embodiment, the image is scanned simultaneously at the two positions, and the thus obtained two image scanning signals are non-linearly transformed by the non-linear transformation circuit and then applied to the differential circuit in order to obtain the difference between the two signals. The difference signal is integrated by means of the integrating circuit and it is considered in focus if the integrated value is "0", while it is considered to be focused before (or behind) the plane when the integrated value is positive and behind (or before) the plane when the integrated value is negative. Further, in a second embodiment, the image is scanned at the aforementioned positions in time sequence, namely sequentially, and the obtained two image scanning signals are passed to the brightness variation detecting circuit one by one. The brightness variation in each between the two adjacent image elements is detected and then non-linearly transformed by means of the non-linear transforming circuit. The non-linearly transformed brightness variation signal is positively integrated by means of the integrating circuit with respect to the first position and negatively integrated with respect to the second position. It is considered to be in focus when the integrated value is "0", while it is considered to be before (or behind) focus when the integrated value is positive and behind (or before) focus when the integrated value is negative. Further, in a third embodiment, which is a variation of the second embodiment, the aforementioned non-linearly transformed brightness variation signals are positively integrated with respect to the first and the second positions and memorized separately. Through the comparison of these memorized values, it is considered to be in focus when both integrated values are equal to each other while it is considered to be before or behind focus when the one is larger or smaller than the other. In short, the case of the first and the second embodiment, the image sharpness data at the first and the second positions are compared (difference detection in case of the embodiment) without being separately memorized and the compared result is memorized as a focus signal and utilized, while in the third embodiment, the image sharpness data at the first and at the second positions are memorized and the compared result of the memorized information is utilized as a focus signal.

These and other features are pointed out in the claims. Other objects and advantages of the present invention will be evident from the following detailed description when read in light of the accompanying drawings.

BRIEF DESCRIPTION OF THE DRAWINGS

Below the present invention will be explained in detail in accordance with the accompanying drawings of embodiments, in which:

FIGS. 5 to 18 show a first embodiment of the present embodiment, in which:

FIG. 5 shows a block diagram of the electrical circuit system of the first embodiment, FIGS. 6(a) to 6(g) illustrate output waveforms of the circuit blocks in the circuit system shown in FIG. 5, FIG. 7 shows an n-bit delay circuit and a differential amplifier circuit in the circuit system shown in FIG. 5, in a concrete way, FIG. 8 shows a 1-bit delay circuit in the n-bit detail circuit shown in FIG. 7, in a concrete way, FIGS. 9(a) to 9(f) illustrate waveforms showing the operation of the 1-bit delay circuit shown in FIG. 8, FIG. 10 shows an absolute value conversion circuit in the circuit system shown in FIG. 5, in a concrete way, FIG. 11 shows an input-output characteristic diagram of the absolute value conversion circuit shown in FIG. 10, FIG. 12 shows a first embodiment of a non-linear transformation circuit in the circuit system shown in FIG. 5, FIG. 13 shows an input-output characteristic diagram of the non-linear transformation circuit shown in FIG. 12, FIG. 14 shows a second embodiment of the non-linear trasnformation circuit, FIG. 15 shows an input-output characteristic diagram of the non-linear transformation circuit shown in FIG. 14;

FIG. 16 shows an integrating circuit and a sample hold circuit in the circuit system shown in FIG. 5, in a concrete way, FIGS. 17(a) to 17(g) illustrate waveforms showing the operation of the integrating circuit and the sample hold circuit shown in FIG. 16, and FIG. 18 shows a control circuit in the circuit system shown in FIG. 5, in detail.

FIGS. 21 to 39 show a second embodiment of the present invention, in which;

FIG. 21 shows an embodiment of the optical arrangement of the second embodiment, FIG. 23 shows a block diagram of the electrical circuit system of the second embodiment, FIGS. 24(a) to 24(i) illustrate output waveforms of the circuit blocks in the circuit system shown in FIG. 23, FIG. 25 shows a dark current compensation circuit in the circuit system shown in FIG. 23, FIGS. 26(a) to 26(f) illustrate waveforms showing the operation of the dark current compensation circuit shown in FIG. 25, in a concrete way, FIG. 27 shows a first gain variable amplifier circuit in the circuit system shown in FIG. 23, FIGS. 28(a) to 28(e) illustrate waveforms for showing the operation of the first gain variable amplifier circuit shown in FIG. 27, FIG. 29 shows an integration time evaluation circuit in the circuit system shown in FIG. 23, in a concrete way, FIGS. 30(a) to 30(g) are timing charts for showing the operation of the integration time evaluation circuit shown in FIG. 29, FIG. 31 shows a variable bit delay circuit and a differential amplifier circuit in the circuit system shown in FIG. 23, in a concrete way, FIGS. 32(a) to 32(d) are waveforms for showing the aspect of the signal delay due to the variable bit delay circuit shown in FIG. 31, FIG. 33 shows an example of the relation of the bit delay amount n of the signal to the F No. of the lens.

FIG. 34 shows a second gain variable amplifier circuit in the circuit system shown in FIG. 23, in a concrete way, FIG. 35 shows an integrating circuit and a display circuit in the circuit system shown in FIG. 23, in a concrete way, FIGS. 36(a) to 36(n) are waveforms showing the operation of the integrating circuit shown in FIG. 35, FIG. 37 shows a control circuit in the circuit system shown in FIG. 23, in a concrete way, and FIGS. 38 and 39 show waveforms of the focus signal obtained in the second embodiment.

FIGS. 40 and 50 show a third embodiment of the present invention, in which;

FIGS. 40 and 41 respectively show an embodiment of the optical arrangements of the third embodiment, FIGS. 44(a) to 44(f) illustrate waveforms of the output of the circuit blocks in the circuit system shown in FIG. 43, FIGS. 50(a) to 50(g) are timing graphs for showing the operation of the integrating circuit shown in FIG. 49, FIGS. 51 to 54 show a focus detecting system of the single lens reflex camera as application of the device in accordance with the present invention, in which;

FIGS. 59 to 72 show a fourth embodiment of the present invention, in which;

FIG. 59 shows a block diagram of the electrical circuit system of the fourth embodiment, FIGS. 60(a) to 60(d) are waveforms of the output of the circuit block in the circuit system shown in FIG. 59, FIG. 61 shows variation of the spectrum distribution of the image due to the sharpness, FIG. 62 shows variation of the level of the output Vs of an integrating circuit in the circuit system shown in FIG. 59 with reference to the advancement of the lens, FIGS. 63(a) to 64(c) and 64(a) to 64(c) show sketches for explaining the efficiency of optical path length varying means and the aspect of the image in focus, before focus or behind focus due to the efficiency, FIG. 65 shows a construction of an image sensor, a dark current compensation circuit and a brightness evaluation circuit in the circuit system shown in FIG. 59, in a concrete way, FIGS. 66(a) to 66(l) are timing charts for showing the operation of the circuit system shown in FIG. 65, FIG. 67 shows a first embodiment of a high pass filter circuit in the circuit system shown in FIG. 59, FIG. 68 shows an embodiment of a low pass filter circuit in the circuit system shown in FIG. 59, FIG. 70 shows a focus condition signal producing circuit in the circuit system shown in FIG. 59 in a concrete way, FIG. 71 shows another embodiment of the focus condition signal producing circuit and a display circuit, and FIG. 72 shows a block diagram of a controller in the circuit system shown in FIG. 59 in detail.

And FIGS. 73 to 76 show a fifth embodiment of the present invention, in which;

FIG. 73 shows a block diagram of the electrical circuit system of the fifth embodiment, FIG. 74 shows an example of the construction of the light sensing part of the image sensor applicable to the embodiment, FIG. 75 shows an example of the construction of the two image separating optical system applicable to the embodiment, and FIG. 76 shows an example of the construction of the image sensor applicable to the embodiment.

DETAILED DESCRIPTION OF THE PREFERRED EMBODIMENTS

Before explaining the embodiments of the present invention, the relation of the image formed by an image forming optical system to the brightness distribution of the image on the focal plane are explained in connection with FIGS. 1(a) to 3(c).

Figure 1A:
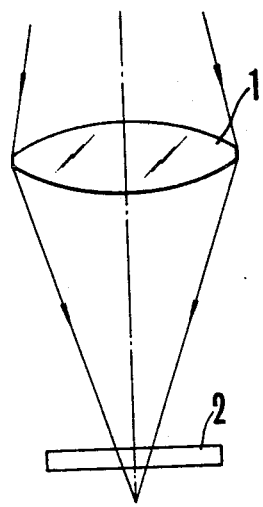
FIGS. 1(a) to 1(c), FIGS. 2(a) to 2(d), and FIGS. 3(a) to 3(c) respectively show the aspects of the image formed by a conventional image-forming optical system, patterns of objects with specified patterns in respective imaging conditions and the brightness distribution of the images in respective imaging conditions.
Figure 1B:
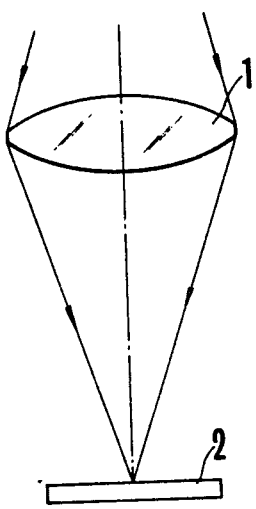
Figure 1C:
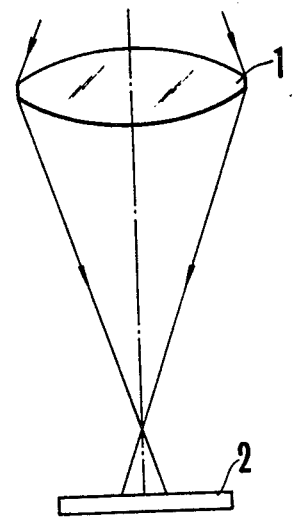

FIGS. 1(a) to 1(c) show the imaging conditions of an conventional optical system. Here, the image of an object, not shown is formed near a predetermined focal plane 2 by an image forming optical system 1. In FIGS. 1(a), the image of the object is formed behind the predetermined focal plane 2 (which may be called an after focus,) so that the image on the predetermined focal plane 2 is out of focus. In FIG. 1(b), the image of the object is formed correctly on the predetermined focal plane, so that the image is sharpest, i.e., in-focus. In FIG. 1(c), the image of the object is formed in front of the predetermined focal plane 2, (which may be called a before focus,) so the image on the predetermined focal plane 2 is out of focus as in FIG. 1(a).

Figure 2A:
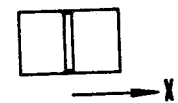
Figure 2B:
Figure 2C:
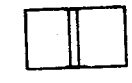
Figure 2D:
Figure 3A:
Figure 3B:
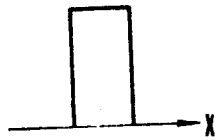
Figure 3C:

FIGS. 2(a) to 2(d) illustrate the relation of the variation of the sharpness of the image to the object. FIG. 2(a) shows an example of an object with a white line on the black base. The images for the imaging conditions shown in FIGS. 1(a), 1(b) and 1(c) are respectively shown in FIGS. 2(b), 2(c) and 2(d). FIGS. 3(a) to 3(c) illustrate the brightness distribution on the predetermined focal plane 2 of the images shown in FIGS. 2(b), 2(c) and 2(d). That is, FIGS. 3(a), 3(b) and 3(c) respectively show the brightness distribution of the images in the imaging condition shown in FIGS. 1(a), 1(b) and 1(c). The direction x in FIG. 3 corresponds to the direction x in FIG. 2(a).

Figure 4:
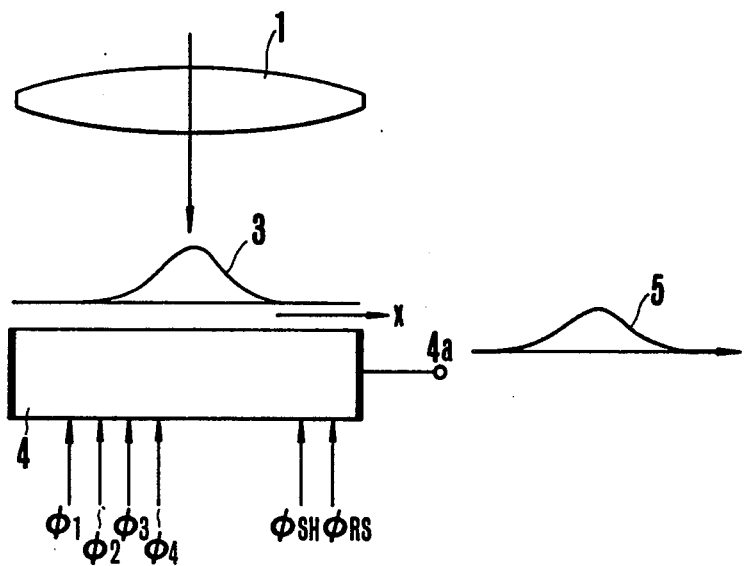
FIG. 4 shows a sketch for explaining the scanning of the image by means of the image sensor.

FIG. 4 illustrates how electrical signals (the image scanning signals) are obtained by way of time series in accordance with the brightness distribution 3 of the image shown in FIGS. 3(a) to 3(c) by scanning the image formed by the image forming optical system 1 with a solid state image pick up device 4 (hereinafter called image sensor) such as a CCD photosensor, BBD photosensor, CCD photodiode or MOS photodiode array and so on. According to this embodiment, the image sensor 4 is composed of a CCD of a four phase driving type analog shift register having N floating PN junctions forming the light sensing portion. The signal charge produced and stored in the light sensing portion is read out and shift electrodes control the transfer of the signal charge to the shift registers. As is well known, the image sensor 4 receives a shift pulse (start pulse) $\phi SH$ for the shift gate electrode, four clock pulses $\phi 1$, $\phi 2$, $\phi 3$ and $\phi 4$ for the analog shift registers for charge transfer, and a reset pulse $\phi RS$ for discharging the charge voltage converting capacitor at the output. The image scanning signal 5 appears time serially as a voltage from the output terminal 4a of the image sensor. The arrow x in the drawing shows the reading out direction of the signal. The electrical signal 5 is produced as an N bit time serial signal after the shift pulse $\phi SH$ occurs. It is an electrical signal corresponding to the signal charge produced and stored in the light sensing portion between the last shift pulse and the then shift pulse. As is well known, the time interval between the two following shift pulses is the storage pulse.

FIG. 5 shows an embodiment of the focus detecting device in accordance with the present invention. Here, the variation of the image brightness distribution on the predetermined focal plane as is shown in FIGS. 3(a) to 3(c) and is converted into electrical signals by means of the image sensor 4 so as to detect the sharpness of the imaging condition, namely the image sharpness. In the drawing, the image-forming optical system 1 is held by means of a member, not shown, movable along the arrow 1' relative to the image sensor 4 whose light sensing portion is arranged to be in alignment with the predetermined focal plane. In the drawing, the image of an object, not shown, as in FIG. 2(a) is supposed to be formed on or near the light sensing plane of the image sensor. The image sensor 4 receives the rest pulse $\phi RS$ and the transfer clock pulse $\phi 1$, $\phi 2$, $\phi 3$ and $\phi 4$ from the conventional sensor driver 6. The shift pulse $\phi SH$ is applied from a control circuit 14 to be more fully described.

In operation, the optical system 1 may, for example, form the image pattern shown in FIG. 6(*a*) from the object shown in FIG. 2(*a*), out of sharpness, on the light sensing plane of the image sensor 4. The scanning signals of the image pattern are produced as time serial signals as shown in FIG. 6(*b*) from the image sensor 4. The absissa in FIGS. 6(*b*)–(*g*) is the time axis, while the ordinate shows the electrical output. The signal in FIG. 6(*b*) is shifted upwards due to the increase of the DC component of the dark current of the image sensor 4.

The output signal of the image sensor 4 is delivered to the positive input terminal of a differential amplifier circuit 8 on the one hand and to the n-bit delay circuit 7 on the other hand. The output signal delivered from the image sensor 4 to the delay circuit 7 is delayed by n-bits and delivered to the negative input terminal of the differential amplifier circuit 8 in the present embodiment. The details of the n-bit delay circuit 7 are explained at a later portion of this specification. The signal in the broken line in FIG. 6(*c*) shows the signal which was not delayed, while the signal shown as a solid line is the one delayed by the n-bit delay circuit 7. FIG. 6(*d*) shows the differential output of the differential amplifier circuit 8 for such two inputs. The differential output signal is then delivered to the absolute value conversation circuit 9, so as to be transformed into the absolute value signal as is shown in FIG. 6(*e*). The details of the absolute value conversion circuit 9 are explained later.

The differential output of the differential amplifier circuit 8 is converted into a positive absolute value signal through the absolute value conversion circuit 9 to prevent the elimination of the positive signal by the existing negative signal during later integration. The output of the absolute value conversion circuit 9 is then delivered to the non-linear transformation circuit 10. The details of the non-linear transformation circuit 10 are explained later.

The output signal of the non-linear transformation circuit 10 assumes an exaggerated form corresponding to the level of the input signal as shown in FIG. 6(*f*). The circuit 10 is an important feature of the present invention. It is in this way that the weight in accordance with the level of the signal is given. The output signal of the non-linear transformation circuit 10 is integrated for the scan by means of the integration circuit 11. This is done in such a manner that the then integrated value is held by means of the hold circuit 12 at the termination of each scan and delivered to the display instrument 13 consisting, for example, of a volt-meter for displaying the image sharpness. The specific construction of the integration circuit 11 and the hold circuit 12 are explained later. FIG. 6(*g*) shows how the signals are integrated and held. The final voltage Vs is the output signal representing the image sharpness.

In this way, in the present focus detecting device, the difference between the output of the image sensor and the delayed output is formed. In other words, the brightness variation between the adjacent two image elements or the two image elements very close to each other is detected, converted into an absolute value, and then non-linearly transformed in such a manner that the larger the variation is, the more it is exaggerated and then it is integrated over the whole measuring viewfield so as to detect sharply the image sharpness in the measuring view field.

The signal delay operation of the n-bit delay circuit 7, the signal integration operation of the integration circuit 11 and the sample hold operation of the sample hold circuit 12 are controlled by the control circuit 14 in accordance with the reset pulse $\phi$RS from the sensor driver 6 to the image sensor 4. The details of the control circuit 14 are explained later.

Figure 7:
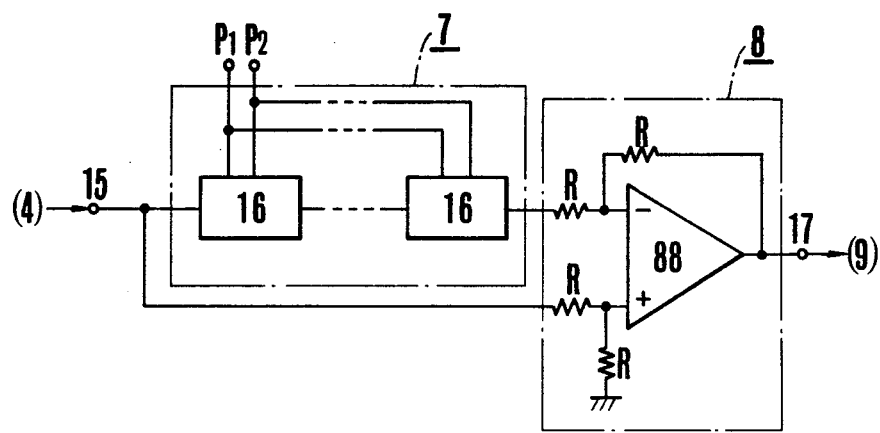

The important circuits of the system in FIG. 5 operate as follows:

FIG. 7 shows details of the n-bit delay circuit 7 and the differential amplifier circuit 8 of FIG. 5. Here, the image signal is delivered from the image sensor 4 shown in FIG. 6(*b*) to the input terminal 15. In a 1-bit delay circuit 16, n circuits are cascade connected in such a manner that the input signal from the terminal 15 is delayed for n-bits and applied to the negative input terminal of the differential amplifier circuit 8 composed of an operational amplifer 88 with an input resistance R and a feed back resistance R. The positive terminal of the differential amplifier circuit 8 receives the undelayed input signal from the input terminal 14, so that the signal shown in FIG. 6(*d*) appears at the output terminal, as mentioned. Hold pulses P1 and P2 are delivered from the control circuit 14 to the 1-bit delay circuit 16.

FIGS. 8 and 9 respectively show details of the 1-bit delay circuit 16 and how the signal is delayed one bit. In FIG. 8, conventional sample hold circuits $18_1$ and $18_2$ of the same construction are each composed of an operational amplifer OA, a diode D, an analog gate AG, an inverter IV and a capacitor C as is shown in the drawing. The hold pulse P1 is applied to the sample hold circuit $18_1$ in the first step, while the hold pulse P2 is applied to the sample hold circuit $18_2$ in the second step. The one bit delay circuit 16 is composed of the combination of the two sample hold circuits $18_1$ and $18_2$. In this case, the hold pulse P1 applied to the sample hold circuit $18_1$ in the first step is, as will be understood from FIGS. 9(*a*) and 9(*c*), shifted by half a period relative to the reset pulse $\phi$RS from the sensor driver 6 to the image sensor 4. In consequence, the sample hold circuit $18_1$ in the first step produces a signal at the output terminal 18*a*, which signal is delayed, as shown in FIG. 9(*a*), by just ½ bit relative to the input signal to the input terminal 16*a*, for example, as is shown in FIG. 9(*b*). On the other hand, the hold pulse P2 applied to the sample hold circuit $18_2$ has the same period as the reset pulse $\phi$RS as shown in FIGS. 9(*a*) and 9(*e*). In consequence, as shown in FIGS. 9(*c*) and 9(*e*), it is delayed by half a period relative to the hold pulse P1 applied to the sample hold circuit $18_1$ in the first step. Thus, the sample hold circuit $18_2$ in the second step produces a signal which appears at the output terminal 16*b* and which is further delayed ½ bit, as shown in FIG. 9(*f*), relative to the output signal shown in FIG. 9(*d*) from the sample hold circuit $18_1$ in the first step. Thus, the 1-bit delay circuit 16 produces a signal which appears at the output terminal 16*b* and which is delayed by just 1-bit relative to the input signal at the input terminal 16*a*. The input and output signals are shown in FIGS. 9(*b*) and 9(*f*) respectively. In consequence, as is shown in FIG. 7, by providing a necessary number of 1-bit delay circuits 16, it is possible to delay the output signal of the image sensor 4 by a necessary number of bits.

Figure 10:
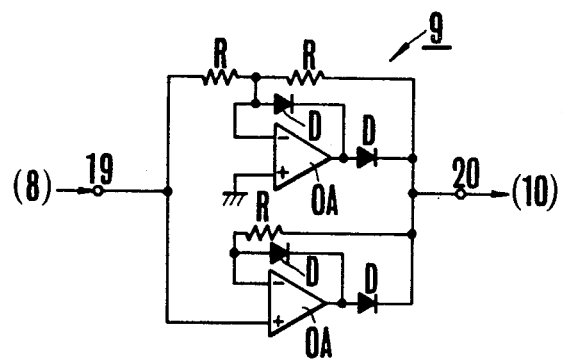
Figure 11:
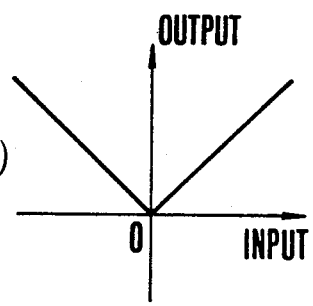

FIGS. 10 and 11 respectively show details of the absolute value conversion circuit 9 and its input-output characteristics. The circuit shown in FIG. 10 is the conventional absolute value conversion circuit composed of an operational amplifier OA, a diode D and an input resistance R connected to each other as shown.

The signal applied to the input terminal 19 is converted into an absolute value in the circuit and taken from the output terminal 20 as a positive signal in accordance with the characteristics shown in FIG. 11, whether the input signal is positive or negative.

Figure 12:
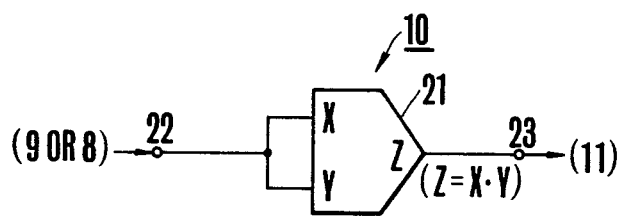
Figure 13:
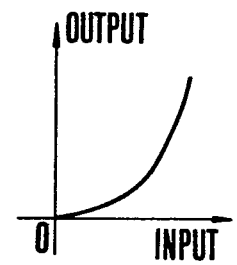

FIGS. 12 and 13 show a detailed example of the non-linear transformation circuit 10 and its input-output characteristics. The circuit shown in FIG. 12 is composed of a square or squaring circuit 21. The squaring circuit 21, with this connection, produces an output $Z=X\cdot Y$ from the two inputs X and Y, and has an input-output characteristic as shown in FIG. 13. In consequence, the input signal to the input terminal 22 is square transformed or squared by the squaring circuit 21, namely, non-linearly transformed and delivered from the output terminal 20.

Figure 14:
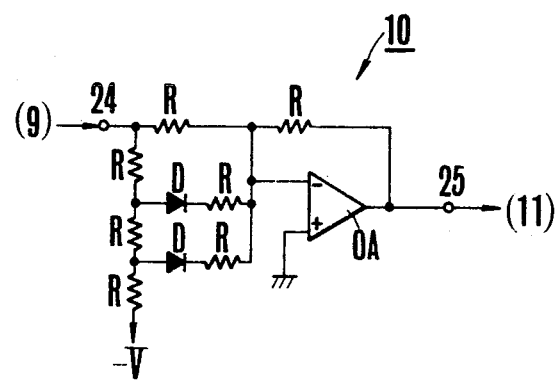
Figure 15:
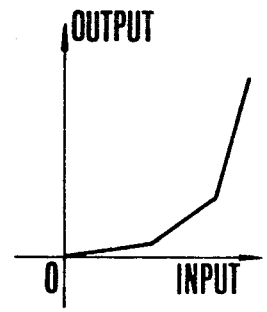

FIGS. 14 and 15 show a second embodiment of a non-linear transformation circuit 10 and its input-output characteristic. The circuit shown in FIG. 14 is composed of a conventional broken line approximation circuit composed of an operational amplifier OA, a resistance R and diode D connected as is shown in the drawing, having an input-output characteristic as is shown in FIG. 15. Consequently, the input signal to the input terminal 24 is non-linearly transformed by means of the broken line approximation circuit and delivered from the output terminal 25. Now, with this circuit, the output is inverted, so the output of this circuit is preferably inverted by an inverting circuit not shown.

Of the two embodiments of the non-linear transformation circuit 10, the squaring circuit in FIG. 12 produces the effect of the absolute value conversion besides that of the non-linear transformation, due to the squaring characteristics of the circuit 21. In consequence, if the squaring circuit 21 is used as a non-linear transformation circuit 10, the absolute value conversion circuit 9 becomes unnecessary. Besides, the non-linear transformation circuit 10 may be in the form of a high power circuit such as third, fourth power circuits and so on can be used. If an even number power circuit is adopted, not only the non-linear transformation effect, but also the absolute value conversion effect can be obtained. In that case, the absolute value conversion circuit 9 is not necessary.

FIGS. 16 and 17 respectively show an example of the integration circuit 11 and the sample hold circuit 12 and how both of the circuits operate under the control of the control circuit 14. In FIG. 16, the integration circuit 11 is constructed so that the negative feed back circuit between the output terminal and the negative input terminal of the operational amplifier 27 includes a circuit composed of an integration capacitor 28 and an integrated value clearing switch S2. The latter may, for example, be in the form of an FET analog switch controlled by the control signal $\phi12$ (FIG. 17(d)) from the control circuit 14. The capacitor 28 and the switch S2 are connected in parallel, while an input terminal 26 supplied with the output of the non-linear transformation circuit 10 is connected to the negative input terminal of the operational amplifier 27 through the resistance R. An input control switch S1 composed of an electric switch such as an FET analog switch is controlled by the control signal $\phi11$ (FIG. 17(c)) from the control circuit 14. The positive input terminal of the operational amplifier 27 is grounded through the resistance R.

The sample hold circuit 12 is, as shown, composed of a buffer amplifier 30 for delivering the impedance transformed hold value of the capacitor 29. The hold capacitor 29 is supplied with the output of the integration circuit 11 through an input control switch S3 composed of an electronic switch such as an FET analog switch. The latter is controlled by a control signal $\phi13$ (FIG. 17(e)) supplied from the control circuit 14, in such a manner that the output of the buffer amplifier 30 is applied to the display device 13.

The control signal to be delivered from the control circuit 14 to the switches S1 and S2 of the integration circuit 12 operates as follows. It is assumed that the image sensor 4 has, for example, 256 sensor elements and the signals start being read out from the first bit as soon as the shift pulse $\phi SH$ (FIG. 17(a)) is delivered from the control circuit 14. Hence, only the signals from the 11th bit to the 250th bit are treated as effective for the image sharpness, while the signals from the 1st bit to the 10th bit and from the 251st bit to the 256th bit are disregarded as unnecessary. (In consequence, 240 bits from the 11th bit to the 250th bit represent the effective measuring range—a range corresponding to A in FIG. 17(b)).

The control signal $\phi12$ (FIG. 17(d)) to the integrated value clearing switch S2 of the integrating circuit 11 is high while the signals from the 1st bit to the 10th bit are being read out during reading out of the output of the image sensor, and otherwise low. The control signal $\phi11$ (FIG. 17(c)) to the input control switch S1 is high while the signals from the 11th bit to the 250th bit are being read out, and otherwise low. The control signal $\phi13$ (FIG. 17(e)) to the input control switch S3 of the sample hold circuit 12 is high while the signals from the 251st bit to the 256th bit are being read out, and otherwise low. In consequence the level of the control signal $\phi12$ is high, while the signals from the 1st bit to the 10th bit are being read out during reading out of the output of the image sensor. Hence, the switch S2 is closed so that, as shown in FIG. 17(f), the integrated value of the capacitor 28 in the integration circuit 11 is cleared. Then, the level of the control signal $\phi11$ is high while the signals from the 11th bit to the 250th bit are being read out and while the switch S2 is open. The switch S1 is thus closed and as shown in FIG. 17(f), the output (FIG. 17(b)) of the non-linear transformation circuit 10 supplied through the input terminal 26 is integrated by the capacitor 28 from the 11th to the 250th bit. Thereafter, the level of the control signal $\phi13$ is high while the signals from the 251st bit to the 256th bit are being read out so that the switch S3 is closed while switches S1 and S2 are open. As shown in FIG. 17(g), the output (the integrated value of the capacitor) of the integration circuit 11 is held by means of the capacitor 29 of the sample hold circuit.

The aforementioned operation is repeated as long as the readout of the image sensor is repeated by the repeated output of the shift pulse $\phi SH$ delivered from the control circuit 14 to the image sensor 4. The hold value of the capacitor 29 of the sample hold circuit is applied to the display device 13 through the buffer amplifier 30 so that the image sharpness on the light sensing plane of the image sensor 4 is displayed by the display device 13.

The frequency of the repeated output of the shift pulse $\phi SH$ delivered from the control circuit 14 to the image sensor 4 is fixed in the present embodiment. Hence, the frequency, namely the time T between the rising edge of a shift pulse $\phi SH$ and the falling edge of the next shift pulse $\phi SH$ corresponds to the integration time to be set on the image sensor 4 as shown in FIG. 17(a). It goes without saying that the time T should at least be longer than the T1 necessary for one readout of the signals of all sensor elements of the image sensor 4.

Figure 18:
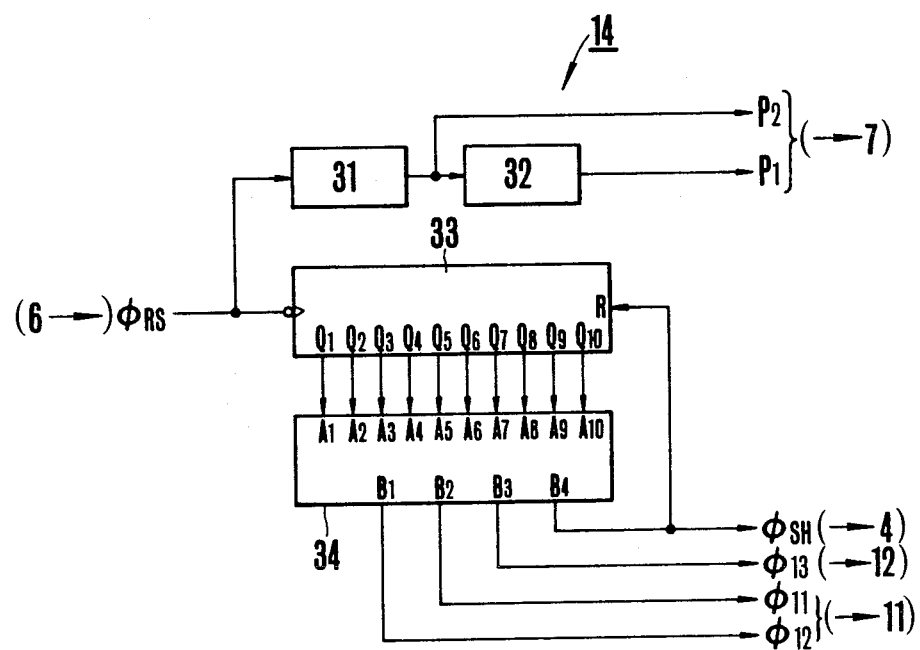

FIG. 18 shows an embodiment of the control circuit 14. In the drawing, conventional wave shaping or waveform reforming circuit 31 reforms or shapes the reset pulse $\phi$RS (FIG. 9(a)) from the sensor driver 6 into the necessary waveform. A half period delay circuit 32 delays the output pulse from the waveform reforming circuit 31 by half a period and produces the hold pulse P1 (FIG. 9(c)) to the sample hold circuit $18_1$ (FIG. 8) in the first step of the 1-bit delay circuit 16 in the n-bit delay circuit 7 shown in FIG. 7. The waveform reforming circuit 31 produces the hold pulse P2 (FIG. 9(e)) to the sample hold circuit $18_2$ (FIG. 8) in the second step. A ten bit rising up synchronization type binary counter 33 counts the reset pulses $\phi$RS and is supplied with the inverted pulses of the reset pulse $\phi$RS.

A ROM (Read Only Memory) 34 produces the control signals $\phi11$, $\phi12$ (FIG. 17(c) (d)) to the integration circuit 11, the control signal $\phi13$ (FIG. 17(e)) to the sample hold circuit 12, and the shift pulse $\phi$SH (FIG. 17(e)) to the image sensor. The memory is preset so that a signal whose level is high only during the "1"–"10" count of the counter 33 appears at a terminal B1, a signal whose level is high only during the "11"–"250" count appears at an output terminal B2, a signal whose level is high only during the "251"–"256" count appears at an output terminal B3 and a signal whose level is high only during a count such as "1000" appears at an output B4. In consequence, the output at B1 of the ROM34 serves as the control signal $\phi12$ to the integration value clearing switch S2 of the integration circuit 11, the output at B2 serves as the control signal $\phi11$ to the input control switch S1, the output at B3 is the control signal $\phi13$ to the control switch S3 of the sample hold circuit 12 and the output at B4 serves as the shift pulse $\phi$SH to the image sensor 4.

As is evident from the above, the shift pulse $\phi$SH is the one whose level is high between the rising edge of a reset pulse $\phi$RS and that of the next reset pulse $\phi$RS. Thus, the pulse to pulse time of the reset pulse $\phi$RS is, for example, 10 $\mu$sec., the integrating time T (FIG. 17(a)) set at the image sensor 4 is 10 m sec. (10 $\mu$sec. $\times$ 1000 = 10 m sec.) The output at B4, namely, the shift pulse $\phi$SH of the ROM 34 is, on the other hand, delivered to the reset terminal R of the counter 33 so that the counter 33 is reset by the output at B4.

Figure 19:
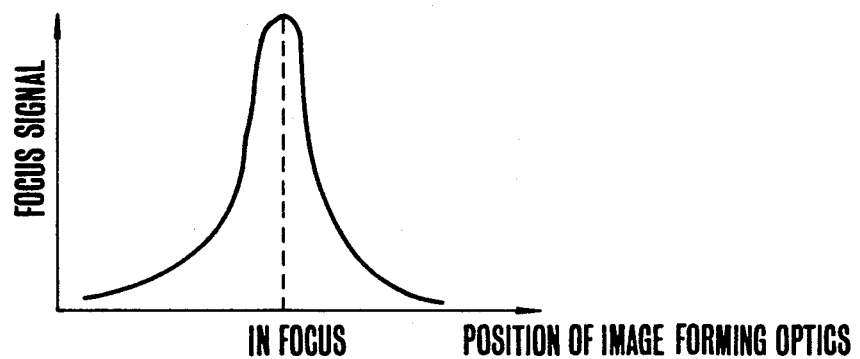
FIGS. 19 and 20 respectively show a signal waveform of the focus signal and that for showing the aspect of the variation of the focus signal in accordance with the aperture ratio of the image-forming optical system in case of the first embodiment.

In the aforementioned embodiment, it can be seen that the larger the spatial variation of the brightness distribution of the image formed by the image-forming optical system 1 on the light sensing plane of the image sensor 4, the larger is the output of the sample hold circuit 12, namely, the signal representing the image sharpness (hereinafter briefly called Focus signal). As shown in FIG. 19, the focus signal is largest when the image of the object is correctly formed on the predetermined focal plane by the image-forming optical system. This occurs when the image-forming optical system focuses on the object. As long as the image-forming optical system is out of focus, whether it is focused before or behind the intended image plane, the focus signal is significantly decreased so that the imaging condition of the image-forming optical system is clearly and with remarkable sensitivity detected.

Figure 20:
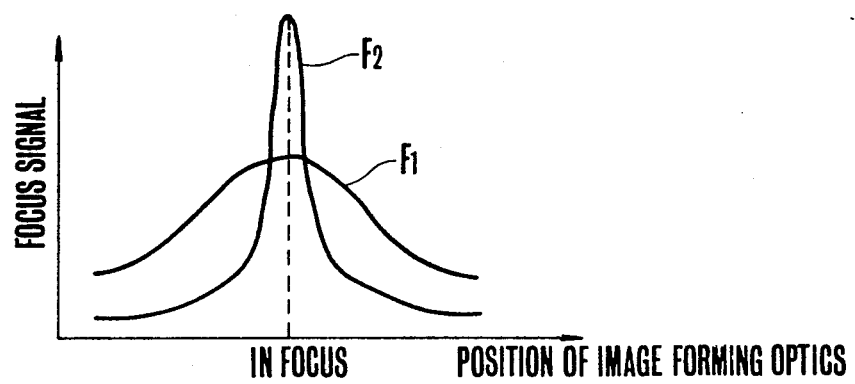

FIG. 20 shows the variation in the focus signal in accordance with the aperture ratio of the image-forming optical system. When the aperture ratio of the image-forming optical system is small, the focus signal assumes a smooth curve as is shown by curve F1, while when the aperture ratio of the image-forming optical system is large, the focus signal assumes a sharp curve as is shown by curve F2. However, in an image-forming optical system with a small aperture ratio, the depth of field is large in comparison with an image-forming optical system with a large aperture ratio. Hence, even if the detectability of the imaging condition is decreased, such decrease is automatically compensated for.

Thus, the embodiment shown in FIG. 5 is very effective as a focus detecting device for an optical instrument such as a camera. With the present invention, even when the contrast of the object is low, the difference between an in-focus signal and an out-of-focus signal can be made large by inverting the non-linearity of the non-linear transformation circuit 10 so as to obtain a very high detection accuracy of the in-focus condition. Further, not only the difference between the signal of the in-focus state and that of the out-of-focus state can be made remarkably large because the signal of the variation of each image element is integrated or added over the whole measuring range (corresponding to the range A in FIG. 17(b)) even when the output of the non-linear transformation circuit 10, but also a stabilized focus signal comparatively poor in noise can be obtained due to the effect for eliminating the higher harmonies by means of the integrating circuit even when there exists noises in the input signals to the integrating circuit 11. In this way, in the present embodiment, the stress is put on the amount corresponding to the variation of the brightness of each image element of the image formed with the image-forming optical system. This amount is integrated over the whole measuring range so as to obtain very precise detection of the imaging condition.

On the other hand, in the embodiment shown in FIG. 5, only the sharpness of the image is detected. The in-focus condition can be detected but it is impossible to decide whether it is a before or behind focus when the image is out-of-focus. Further, when the object is in motion relative to the optical instrument such as a camera equipped with the above system, other images may enter into the measuring field so that the focus signal may vary even under the same sharpness. Further, the focus signal may fluctuate even for the same object, when the brightness varies.

Figure 21:
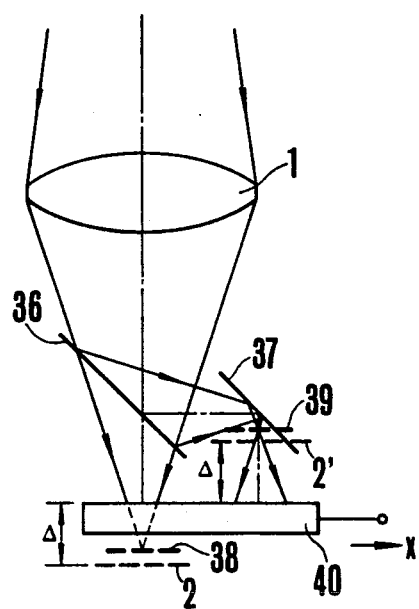

FIG. 21 illustrates an embodiment which improves the above shortcoming and particularly shows the optical arrangement thereof. Here, the light beam passing through the image-forming optical system 1 is divided into two parts by the half mirror 36. The light beam through the mirror 36 strikes the left half range of the image sensor 40 whose light sensing plane lies before the predetermined focal plane 2 of the optical system 1 by a determined distance $\Delta$. On the other hand, the light beam reflected by the half mirror 36 is also reflected by the totally reflecting mirror 37 which is parallel to the half mirror 36 and strikes the right half range of the image sensor 40. The totally reflecting mirror 37 is positioned so that the light sensing plane of the image sensor 40 is a predetermined distance $\Delta$ behind a plane 2' conjugate with the predetermined focal plane 2. In consequence, in accordance with the present embodiment, the image formed by the optical system 1 is sensed with the left half range of the image sensor 40 a distance $\Delta$ before the predetermined focal plane, while on the other hand, the image formed with the image forming optical system 1 is sensed with the right half range at the position behind the predetermined focal plane 2 (=2') by the distance Δ. The image of the predetermined object is formed on planes 38 and 39 by means of the image-forming optical system. The image-forming plane is before the predetermined focal plane 2=2'), namely, it is a before focus.

Figure 22A:
FIGS. 22(a) to 22(c) are waveforms showing the brightness distribution of the images in respective imaging conditions of the arrangement shown in FIG. 21.
Figure 22B:
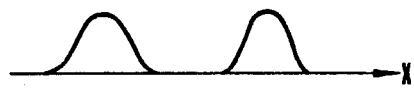
Figure 22C:
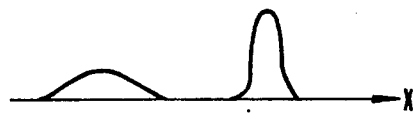

Now, let us suppose that the object has the pattern as in FIG. 22(a) which shows the brightness distribution of the image on the image sensor 40 in the above-mentioned image-forming state. The image-forming plane 38 of the light that has passed through the half mirror 36 is closer to the light sensing plane of the image sensor 40 than is the image-forming plane 39 of the reflected light. Hence, the image on the left half range of the light sensing plane of the image sensor 40 is sharper than the image on the right half range formed by the reflected light. FIG. 22(b) shows the case where the image-forming plane of the optical system 1 coincides with the predetermined focal plane 2 (=2') so that the image-forming planes are respectively before and behind the light sensing plane of the image sensor by the distance Δ. Therefore, the brightness distribution of the images on the right and the left half range of the image sensor 40 are equal to each other. FIG. 22(c), in contrast to FIG. 22(a), shows the image-forming plane of the image formed by the reflected light closer to the light sensing part of the image sensor 40 than is the image-forming plane of the light having passed through the mirror 36. This results in the brightness distribution of the image on the right half range of the light sensing plane of the image sensor 40 being sharper than that of the image of the light beam through the half mirror 36, on the left half range.

FIG. 23 is an example of a device in which the image formed by the image-forming optical system 1 is sensed by means of the first and the second light sensing parts substantially arranged before and behind a predetermined focal plane so that not only whether the image is in-focus or out-of-focus but also whether the image forms a before or after focus can be detected.

In FIG. 23, the light beam through the image-forming optical system 1 is divided into two beams by the half mirror 36. The light beam through the half mirror is reflected by the totally reflecting mirror 37 so that it strikes the left half range or portion of the image sensor 40, while the beam reflected by the mirror 37 strikes the right half range. Now, let us suppose that the imaging condition of the image-forming optical system 1 is as is shown in FIG. 22 focused ahead of the predetermined focusing plane, namely, it is a before focus. The light distribution on the light sensing plane of the image sensor 40 is then as shown in FIG. 24(a). The broken line in the drawing shows the brightness distribution when the reflecting index and the permeability index of the half mirror 36 are equal to each other. The full line shows the brightness distribution when the reflecting index is not equal to the permeability index. Such a disparity is unavoidable in an actual half mirror, so that the present embodiment provides electrical compensation for this disparity.

In FIG. 23, the reset pulse $\phi RS$ and the transfer clock pulses $\phi 1$, $\phi 2$, $\phi 3$ and $\phi 4$ are delivered by the sensor driver 6 to the image sensor 40, while the slight pulse $\phi SH$ is delivered by the control circuit 51 to the image sensor 40, so that the image sensor 40 produces a scanning signal for the brightness distribution of the image on the light sensing plane as is shown in FIG. 24(b). Here, the broken line shows the case when the reflecting index and the permeable index of the half mirror 36 are equal to each other in the same way as in FIG. 24(a). The reason why the signal is shifted upwards is that a dark current occurs in the light sensing part of the image sensor as already explained. The dark current can be eliminated by a dark current compensation circuit 43 so that a signal as shown in FIG. 24(c) can be obtained. FIG. 24(c) also shows the signal in a broken line for the case when the reflecting index and the permeability index of the half mirror 36 are equal to each other.

Figure 25:
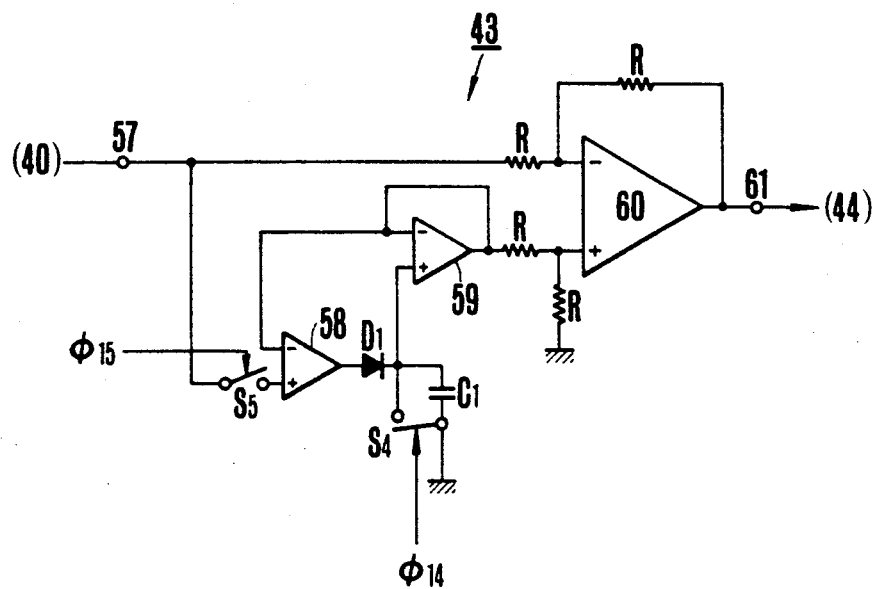

The construction of the dark current compensation circuit 43 appears in FIG. 25. Here, the output signal from the image sensor 40 is delivered to an input terminal 57. A clear switch S4 is in the form of an electronic switch such as an FET analog switch and has its on or off state controlled by control signals from operational amplifiers 58 and 59. The switch S4, a diode D1, a capacitor circuit C1, a control circuit 51 and an input control switch S5 form a peak hold circuit. The output of the peak hold circuit is delivered to the positive input terminal of a differential amplifier circuit composed of an operational amplifier 60 and a resistance R, while the signal from the input terminal 57 is delivered to the negative input terminal of the differential amplifier circuit.

The image sensor 40 in the present embodiment has 512 sensor elements, and the sensor elements of the first 12 bits from the first to the 12th bit is treated, for example, with Al vapor deposition in such a manner that no light reaches the sensor elements. When the output of the image sensors are read out, a control signal $\phi 14$ (FIG. 26(c)) whose level is high only while the signals from the first bit to the 8th bit are being read out and otherwise zero is applied by the control circuit 51 to the clear switch S4. This occurs in such a manner that the clear switch S4 is closed while the level of the control signal $\phi 14$ is high and thus, the stored value of the capacitor C1 is cleared. Then, a control signal $\phi 15$ (FIG. 26(d)) whose level is high only while the signals from the 9th bit to the 10th bit are being read out and otherwise zero is applied by the control circuit 51 to the input control switch S5 in such a manner that the input control switch S5 is closed while the control signal $\phi 15$ is high. Hence, the signals from the 9th to the 10th bit, namely the dark current signal from the light shaded two sensor elements, are stored in the capacitor C1. (FIG. 26(e)). The value stored in the capacitor C1 is applied by the operational amplifier 59 to the positive input terminal of the differential amplifier circuit composed of the operational amplifier 60 and the resistance connected as shown in the drawing, while the signal from the input terminal 57 is applied to the negative input terminal of the differential amplifier circuit. The output of the operational amplifier 59, namely, the dark current component is now detected from the signals at the input terminal 57 after the 11th bit in such a manner that a dark current compensated signal (FIG. 24(c)) as shown in FIG. 26(f) is obtained from the output terminal 61 for the input signal (FIG. 24(b)) as is shown in FIG. 26(b), to the input terminal 57. Now, with this circuit, the output is an inverted signal, so it is necessary to invert the output of this circuit by means of an inverting circuit (not shown).

Figure 27:
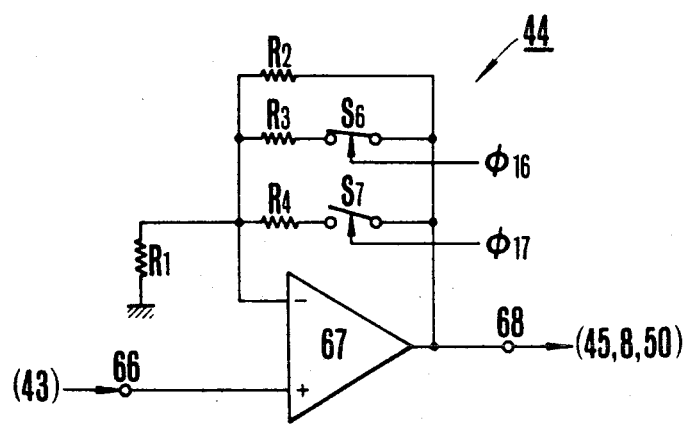

The dark current compensated signal in FIG. 24(c) produced from the dark current compensation circuit 43 is then applied to the variable gain amplifier circuit 44 in order to eliminate the disparity between the first and the second images due to the disparity between the reflecting index and the permeability index of the half mirror 36 and so as to be converted into a signal as is shown in FIG. 24(d). A concrete example of the gain variable amplifier circuit 44 is shown in FIG. 27. Here, the input resistance R1 is connected to the negative input terminal, while the feed back resistances R2, R3 and R4 are connected between the output terminal and the negative input terminal, of an operational amplifier 67. Of the feed back resistances R2–R4, the resistances R2 and R4 are respectively arranged to operate or not to operate in accordance with whether switches S6 and S7 are opened or closed. These switches are composed of electronic switches such as FET analog switches whose opening and closing are controlled by the control signal from the control circuit 51. Thus, the gain of the amplifier circuit is variable in accordance with the state of the switches S6 and S7.

In the present embodiment, the output signals of the 200 bit sensor elements from the 33rd bit to the 232 bit (corresponding to the range A of FIG. 28(b)) of the image sensor 40 are used as signals for the first image. The signals of the 200 bit sensor elements from the 293rd bit to the 492nd bit (corresponding to the range B of FIG. 28(b)) are used as signals for the second image. Therefore, the signals from the 1st bit to the 8th bit, the 11th bit to the 32nd bit, the 233rd bit to the 292nd bit and the 493rd bit to the 512th bit are treated as unnecessary signals. In consequence, a control signal $\phi 16$ (FIG. 28(c)) whose level is high only while the signals from the 33rd bit to the 232nd bit are being read out of the image sensor and otherwise zero is applied by the control circuit 51 to the switch S6, while a control signal $\phi 17$ (FIG. 28(d)) whose level is high only while the signals from the 293rd bit to the 492nd bit are being read out and otherwise zero is applied by the control circuit to the switch S7.

FIG. 28(b) shows the signals produced by the dark current compensation circuit and representing the first and the second images when an image is formed correctly on the predetermined focal plane 2 by the image-forming optical system 1, namely when the image is in-focus. Although, it could be expected that the signals for the first and the second images are equal to each other in case the reflecting index and the permeability index of the half mirror 36 are completely equal to each other, the signals produced are a little different from each other as shown in FIG. 28(b). This is so because, in practice, a disparity exists between the reflecting index and the permeability index of the half mirror 36, and therefore, a small disparity between the two images occurs.

When the aforementioned image signals are applied to the input terminal 66 of the variable gain amplifier circuit 44, control signals as shown in FIG. 28(c) and (d) are applied by the control circuit 51 to the switches S6 and S7. Thus, the signal corresponding to the first image is amplified during connection of the resistance R3 due to closing of the switch S6. The signal of the second image is amplified during connection of the resistance R4 due to the closing of the switch S7. The values of resistors R2, R3, and R4 are chosen in advance, relative to resistors R1, such that the signals appearing at the output terminal 68 and representing the first and the second images are equal to each other and the disparity between the signals for the two images are improved so as to be able to detect the focus correctly. Namely, as shown in FIG. 28(e), the disparate signals shown by a broken line is converted into the corrected signals shown by the full line.

The output of the variable gain amplifier circuit 44 is, when the disparity between the two images has been eliminated in this way, delivered to the storage time evaluation circuit 50. The output signal of the circuit 50 is a storage time decreasing signal when the amount of light is too great or a storage time increasing signal when the amount of light is too small and is delivered to the control circuit 51. FIG. 29 shows the construction of the storage time evaluation circuit 50. In the drawing, a clear switch S9 and an input control switch S8 are each composed of an electronic switch such as an FET analog switch whose opening and closing are controlled by means of the control signal from the control circuit 50. The switches S8 and S9, the operational amplifiers 73 and 74, the diode D2, the capacitor C2 and the control circuit 51 form a peak hold circuit. A control signal $\phi 19$ (FIG. 30(d)) whose level is high only while the signals from the first bit to the 32nd bit are being read out of the image sensor and otherwise low is applied by the control circuit 51 to the clear switch S9. A control signal $\phi 18$ (FIG. 30(c))—namely, $\phi 18 = \phi 16 + \phi 17$ (FIG. 28(c) (d)) whose level is high only while the signals from the 33rd bit to the 232nd bit and the 293rd bit to the 492nd bit are being read out and otherwise low is applied by the control circuit 51 to the input control switch S8. This is done in such a manner that the peak values of the signals for the first and the second images out of the output signals (FIG. 30(b)) from the variable gain amplifier circuit 44 is held in the condenser C2 (FIG. 30(e)).

An input control switch S10 is composed of an electronic switch such as an FET analog switch whose opening and closing are controlled by the control signal from the control circuit 51. A capacitor C3, a buffer amplifier 75 and the switch S10 are connected as shown in the drawing and form a sample and hold circuit. A control signal $\phi 20$ (FIG. 30(f)) whose level is high only while the signals from the 493rd bit to the 512th bit are being read out of the image sensor and otherwise low is delivered by the control circuit 51 to the input control switch S10 such that the output of the operational amplifier 74 is stored in the capacitor C3 (FIG. 30(e)).

A first comparator 76 has a positive input terminal which is supplied with the output of a buffer amplifier 75 and a negative input terminal which is supplied by a standard voltage Vref.1 set at a variable resistance 78. A second comparator 77 has a negative input terminal which is supplied by the output of the buffer amplifier 75 and has a positive input terminal which is supplied by a standard voltage Vref.2 (<Vref.1) set at a variable resistance 79. When Vref.2≦75 output≦Vref.1, the level of the both outputs from the output terminals is low while when 75 output≦Vref.1 the output from the output terminal 81 remains low while the output from the output terminal 80 is high. When 75 output≦Vref.2 the output from the output terminal 80 remains low while the output from the output terminal 81 is high.

The logic output from such a wind comparator is delivered to the control circuit 51 which decreases the charge storage time T of the image sensor 40 when the output from the output terminal 80 is high and increases the time T when the output terminal 81 is high so as to control the charge storage time T in such a manner that the relation "Vref.2≦75 output≦Vref.1" can always be kept. The charge storage time T is changed by varying the timing at which the shift pulse φSH (FIG. 30(a)) is applied to the image sensor 40.

The output of the variable gain amplifier circuit 44 is delivered to the storage time evaluation circuit 50, directly to the negative input terminal of the differential amplifier circuit 8 and at the same time to the positive input terminal of the differential amplifier circuit 8 through a variable bit delay circuit 45. The variable bit delay circuit can easily be constructd in accordance with FIGS. 7 to 9. However, in the present embodiment, the fluctuation of the focus signal due to the aperture ratio of the optical system explained with respect to FIG. 20 is eliminated or reduced as much as possible by changing the number of the delay bits in accordance with the largest aperture ratio of the image-forming optical system 1. If the aperture ratio is large, the sharpness varies comparatively suddenly so that the number of the delay bits is decreased. On the other hand, if the aperture ratio is small, the fluctuation of the focus signal is tried to be eliminated by increasing the number of delay bits.

FIG. 31 shows an example of the construction of the variable bit delay circuit 45. The purpose of the variable bit delay circuit 45 is to improve the operation by stabilizing the focus signal when the lenses of different totally opened aperture ratios are used in view of the fact that almost all of the present single lens reflex camera carries out the totally opened light measurement. In FIG. 31, when the output signal from the variable gain amplifier circuit 44, shown in FIG. 24(d), is applied to the input terminal 82, this input signal is delayed by the 1-bit delay circuits 16 explained in connection with FIGS. 8 and 9. A delay signal corresponding to the totally opened aperture ratio of the then image-forming optical system 1 shown in FIG. 24 is selected by means of a switch circuit (or select circuit) 83. The latter selects the number of the delay bits in accordance with the information signal then applied to the input terminal 46 corresponding to the totally opened aperture ratio of the image-forming optical system 1. The selected delay signal is delivered to the differential amplifier circuit 8 together with the non-delayed signal (FIG. 24(d)) so that a signal such as shown in FIG. 24(f) appears at the output terminal 84.

FIGS. 32(b), 32(c) and 32(d) shown an enlargement of the portion shown in a circle of FIG. 32(a) to illustrate the output difference (FIG. 24(f)) between the delay signal and the non-delay signal. FIG. 32(b) shows the enlargement of a part of FIG. 32(a), FIG. 32(c) shows the output of the differential amplifier circuit 8 for a 1-bit delay and FIG. 32(d) shows the output for a 3-bit delay. From the comparison between FIG. 32(c) and (d), it can be understood that the output signal of the differential amplifier circuit 8 is varied by varying the number of the delay bits.

Figures 33, 34:
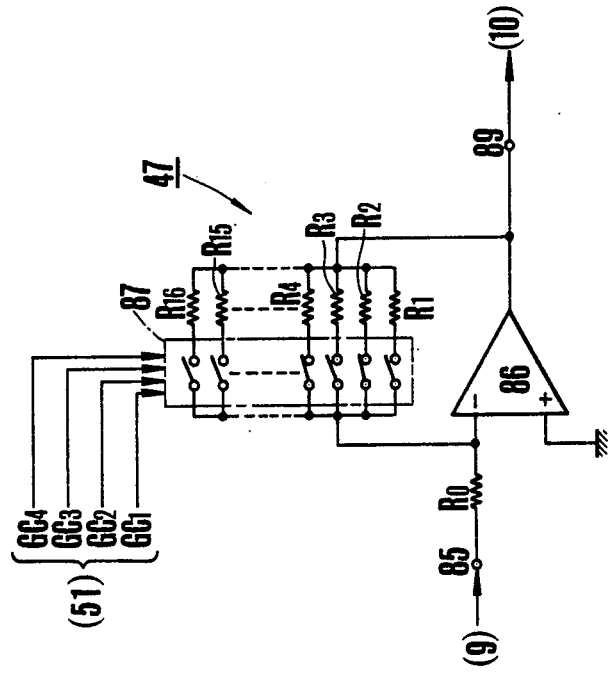

FIG. 33 shows examples of the reciprocals of the totally opened aperture values, namely F Nos. of image-forming optical system 1 and the corresponding numbers n of the delay bits. As shown, the smaller the F No., namely the larger the totally opened aperture, the smaller is the number of the delay bits set. In the present case, the switch circuit selects the delay signal. For this purpose, it is sufficient that the switch 83 be electrically or mechanically controlled such that a proper delay signal can be selected each time in accordance with the maximum-aperture F No. by using the conventional totally-opened compensation pin of the photographic lens. (As is well known, the length of the pin differs in accordance with F No. of the lens).

Again in FIG. 23, the output (FIG. 24(f)) of the differential amplifier circuit 8 is delivered to the absolute value conversion circuit 9 to be converted into an absolute value as is shown in FIG. 24(g) and then to the second gain variable amplifier circuit 47 whose gain is controlled by the control circuit 51 in accordance with the output of the integration circuit (48) to be explained, the signal level is controlled correspondingly.

The amplifier circuit 47 is shown in FIG. 34. Here, an operational amplifier 48 has a grounded positive input terminal. In the feed back circuit between the output terminal and the negative input terminal, a circuit composed of a conventional 16 bit analog multiplexer 87 and resistances R1-R16 connected to each terminal of the multiplexer and connected in parallel to each other is provided in such a manner that the signal delivered from the absolute value conversion circuit 9 to the input terminal 85 is given to the negative input terminal through the input resistance Ro. In the above construction, when the 4 bit gain control signals GC1-GC4 are delivered from the control circuit 51 to the multiplexer 87 in accordance with the signal from the integration circuit (48), the analog switches in the multiplexer 87 are closed or opened correspondingly so as to control the connection of the feed back resistances R1-R16. This is done to control the gain of the circuit 47 such that a signal whose level is properly controlled appears at the output terminal 89.

The output of the variable gain amplifier circuit 47 is delivered to the non-linear transformation circuit 10 so as to be non-linearly transformed. The output of the non-linear transformation circuit is delivered to the integration circuit 48. Hence, as is shown in FIG. 24(i), the signals are added in the measuring range A of the first image and then the signals are deducted from the added value in the measuring range B of the second image so that which of the first image or the second image is sharper than the other determine the sign of the final integration value Ve. Namely, if the first image is sharper than the second image the final integration value Ve is positive, while if the second image is sharper than the first the final integration value Ve is negative. When both of the images have the same sharpness, i.e., when the image is correctly formed on the predetermined focal plane by the image-forming optical system, the final integration value Ve is 0. In this way, it can clearly be judged whether the image formed by means of the image-forming optical system 1 is focused before, behind or in focus with reference to the predetermined focal plane. That is, it is done on the basis of the sign of the output of the integration circuit 48 or whether the output is zero. The signal processing for the image sharpness detection is carried out in accordance with the basic method mentioned in accordance with FIG. 5 so that the image sharpness detectability is extremely high.

In FIG. 23, a display circuit 49 produces an alarm to indicate that it is difficult or impossible to detect whether it is a before focus, behind focus or in focus image.

FIG. 35 shows details of an example of the integration circuit 48 and the display circuit 49. Here, an input terminal 91 receives a signal the magnitude of whose signal level was emphasized by the non-linear transformation circuit 10 as is shown in FIG. 36(b). Electronic switches S11 and S12 such as FET analog switches are closed or opened by the control signals $\phi16$, $\phi17$ (FIG. 36(c), (d)—corresponding to FIGS. 28(c), (d)) from the control circuit 51. The switches S11 and S12 operate so that, as shown in FIG. 36(e) in the measuring range A of the first image, the signal is delivered directly to an integration circuit composed of an operational amplifier 96, a capacitor C3, a clear analog switch S13 and a resistance R connected to each other as is shown in the drawing. In the measuring range B of the second image, the signal is delivered to the integration circuit after it has been inverted by an inverting amplifier circuit composed of an operational amplifier 92 and a resistance R connected to each other as shown in the drawing. Hence, along with the closing and the opening of the switch S13 by the control signal $\phi19$ (FIG. 36(f)—corresponding to FIG. 30(d)) from the control circuit 51 the integration is carried out as shown in FIG. 36(h). The integration result is held in a capacitor C4 along with the closing and the opening of the analog switch S14 by the control signal $\phi20$ (FIG. 36(g)—corresponding to FIG. 30(f)) from the control circuit 51. FIG. 36(i) shows the above operation. The hold output is then delivered to the positive input terminal of a comparator 101 in the display circuit 49 as well as the negative input terminal of a comparator 102. The hold voltage is presumed to be Ve.

The integration circuit is also composed of switches S15, S16, an operational amplifier 93, a capacitor C5 and a resistance R connected to each other as is shown in the drawing. These members integrate the signals for the first image and those for the second image separately as shown in FIG. 36(l) when a control signal $\phi18$ (FIG. 36(j)—corresponding to FIG. 30(c)) is delivered from the control circuit 51 to the analog switch S15 and a control signal $\phi21$ (FIG. 36(k)) whose level is high only while the signals from the first bit to the 32nd bit and from the 233rd bit to the 292nd bit are being read out at the time of reading out the output of the image sensor is high and an otherwise low is delivered to the analog switch S16. The peak hold circuit composed of operational amplifiers 94 and 95, a diode D3, a capacitor C6 and an analog switch S17 connected to each other as shown in the drawing, holds the peak value of the then output (FIG. 36(l)) of the operational amplifier 93 in the capacitor C6 when a control $\phi19$ (FIG. 36(f)) is delivered from the control circuit 51 to an analog switch S17 (FIG. 36(l)). The sample hold in the capacitor C4 along with the closing and the opening of the analog switch S14 by the control signal $\phi20$ (FIG. 36(g)—corresponding to FIG. 30(f)) from the control circuit 51. FIG. 36(i) shows the above operation. The hold output is then delivered to the positive input terminal of a comparator 101 in the display circuit 49 as well as the negative input terminal of a comparator 102. The hold voltage is presumed to be Ve.

The integration circuit is also composed of switches S15, S16, an operational amplifier 93, a capacitor C5 and a resistance R connected to each other as is shown in the drawing. These members integrate the signals for the first image and those for the second image separately as shown in FIG. 36(l) when a control signal of $\phi18$ (FIG. 36(j)—corresponding to FIG. 30(c)) is delivered from the control circuit 51 to the analog switch S15 and a control signal $\phi21$ (FIG. 36(k)) whose level is high only while the signals from the first bit to the 32nd bit and from the 233rd bit to the 292nd bit are being read out at the time of reading out the output of the image sensir is high and an otherwise low is delivered to the analog switch S16. The peak hold circuit composed of the operational amplifiers 94 and 94, a diode D3, a condenser C6 and an analog switch S17 connected to each other as shown in the drawing, holds the peak value of the then output (FIG. 36(l)) of the operational amplifier 93 in the capacitor C6 when a control $\phi19$ (FIG. 36(f)) is delivered from the control circuit 51 to an analog switch S17 (FIG. 36(l)). The sample hold circuit, composed of the analog switch S18, the capacitor C7 and the buffer amplifier 97 connected to each other as shown in the drawing, holds the existing output of the operational amplifier 95 in capacitor C7 when the control signal $\phi20$ (FIG. 36(g)) is delivered from the control circuit 57 to the analog switch S18. (FIG. 36(n)). Now, let us suppose that the hold voltage is $V_T$. Voltage $V_T$ is divided by the variable resistance 98. The latter is controlled by the external signals such as the totally opened aperture ratio of the image-forming optical system, or the aperture value for the light measurement, or the indication as to whether the diaphragm is opened or closed or as to whether the flash is used. The divided voltage is then delivered as a reference voltage to the negative input terminal of the comparator 101 in the display circuit 49 and at the same time inverted by means of the inverting amplifier circuit composed of the operational amplifier 99 and the resistance R connected thereto as is shown in the drawing. The output of amplifier 99 is delivered to the positive input terminal of the comparator 102 as a reference voltage.

Now, let us suppose the voltage dividing ratio is D. If $|Ve| < -V_T/D$, the level of both of the outputs of the comparators 101 and 102 is low, so that the level of the existing output of the NOR gate 103 is high. On the other hand, if $Ve < -V_T/D$, only the level of the output of the comparator 102 is high. In case $Ve < V_T/D$, only the level of the output of the comparator 101 is high. As is clear from the above explanation, a pair of the comparators 101 and 102 operating in accordance with the above conditions operate as a so-called wind comparator. Thus, in accordance with the state of the outputs of the comparators 101 and 102, the level of any output of the OR gates 104, 105 and 106 is high, in accordance with which any of the LEDs (light emitting diodes) 107a, 107b or 107c lights up. Consequently, whether the image is in focus, focused before or behind the reference can be judged from the sign of the output voltage Ve at the capacitor C4 as explained. The value of the variable resistance 98 is set in accordance with the utilization condition at the time so as to vary the voltage dividing ratio D accordingly and so that the value of the reference voltages for the comparators 101 and 102 also varies. Consequently, if it is foreseen that the aperture value is large (the diaphragm opening is small) due to photographic conditions such as the set aperture value or flash photography, even if the focusing accuracy is somewhat low, in practice, there is a wider range of tendency for obtaining sharpness in the picture to be photographed. Hence, by selecting the in-focus range larger the focus can be found out to be more stable. On the other hand, in case the diaphragm has to be totally opened for a dark object, it is possible to adjust the focusing of the photographic lens within the range of the then small depth of field by selecting a smaller in-focus range. In this way it is possible to produce a camera whose focus adjusting can be done easily in accordance with the existing photographic situation. Hereby, LED 107 is for displaying the in-focus state, LED 107a is for displaying the behind focus and LED 107b is for displaying the before focus.

Where the object is very dim or the contrast very low, it is often difficult to detect the image sharpness. It is then necessary to present an alarm to the photographer. Further, it is then necessary to always control the value of the output of the buffer amplifier 97, namely the hold voltage of the capacitor C7 so it is constant in order to be able to detect the sharpness easily. This is explained below. In the integrating circuit 48, the hold voltage $V_T$ in the capacitor C7 is delivered to the positive input terminal of the comparator 111 and the negative input terminal of the comparator 112. The voltage $V_T$ is compared with the reference voltages Vref.3 and Vref.4 set by means of the variable resistances 109 and 110 (Vref.4 < Vref.3). If $V_T$ is outside of the range of the set voltages Vref.4—Vref.3, a judgment is made that the image signal is inconvenient for the sharpness detection. This is done so that if $V_T$ < Vref.3 $V_T$ is judged to be too large a high level signal is delivered from the comparator 111, while in case $V_T$ < Vref.4 $V_T$ is judged so small a high level signal is delivered from the comparator 112. These signals are applied to the control circuit 51 through the output terminals 113 and 114. In accordance with the signals from the output terminals 113 and 114, the control circuit 51 controls the gain of the gain variable amplifier circuit in such a manner that the level of $V_T$ is always proper. In this case in order that the whole system assumes the best and a stabilized gain state, it is possible to modify the condition of the change of $V_T$ with the evaluation result of the storage time from the storage time evaluation circuit 50. Hence, in case the comparator 111 or 112 delivers a signal that $V_T$ is too large or too small or the storage time evaluation circuit 50 delivers a storage time change instruction, the control circuit 51 delivers a high level signal to all of the OR gates 104, 105 and 106 of the display circuit 49 through the input terminal 56 in such a manner that all of LEDs 107a-107c are lit up so as to give to the photographer an alarm that focus detection has not yet been completed.

Figure 37:
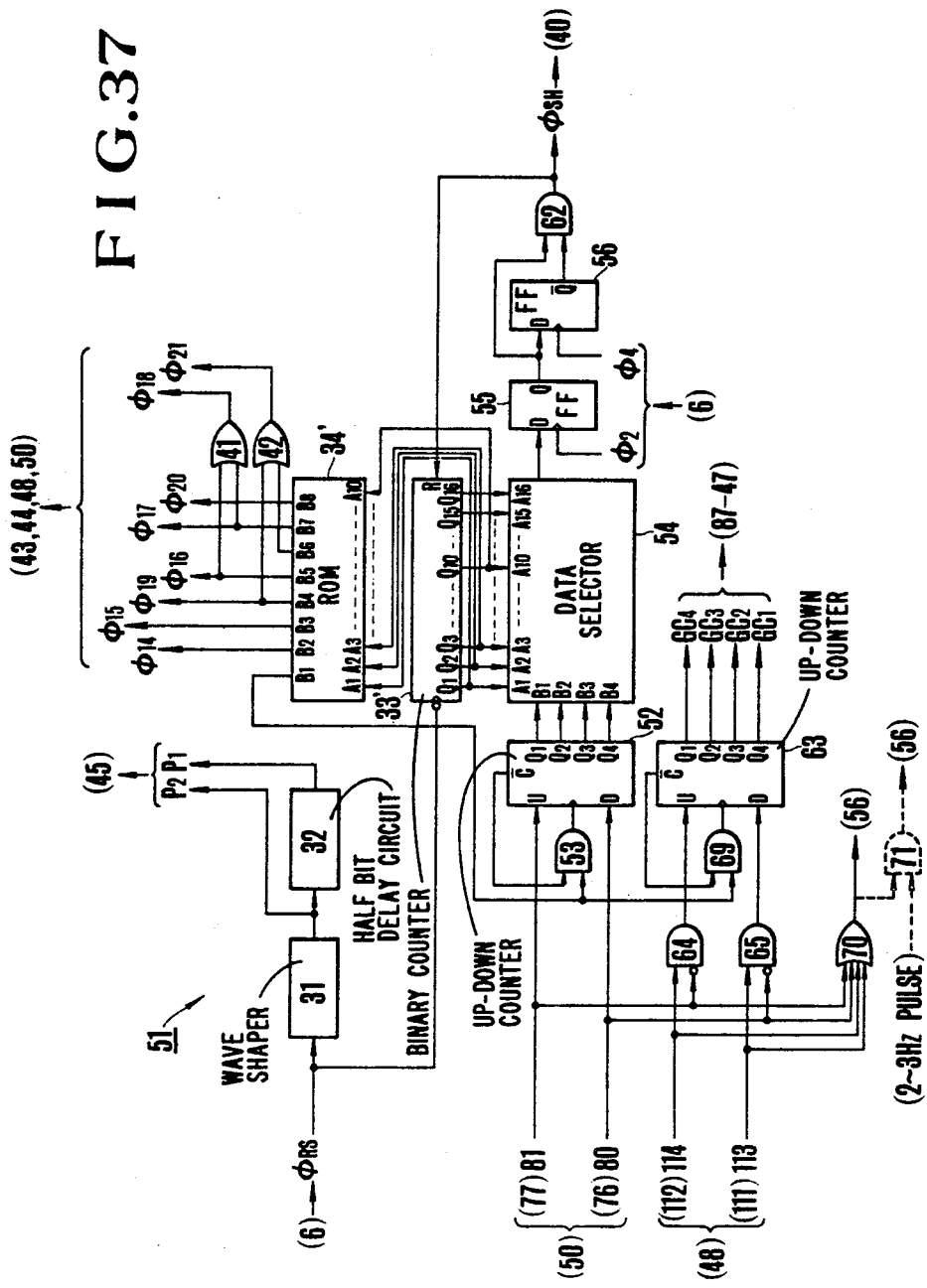

Lastly, details of the construction of the control circuit 51 appear in FIG. 37. Here, a waveform reforming circuit 31 and a half bit delay circuit 32 correspond to those in FIG. 18. In FIG. 37 the output of the half bit delay circuit 32 is delivered to the variable bit delay circuit as hold pulse P1, while the output of the waveform reforming circuit 31 is delivered to the circuit 45 as hold pulse P2.

A 16 bit binary counter 33' of the rising edge synchronization type serves for counting the reset pulses $\phi$RS from the sensor driver 6 and a ROM 34' is supplied with the outputs Q1-Q10 from the counter 33' so as to produce the control signals $\phi$14-$\phi$21 from the dark current compensation circuit 43, the variable gain amplifier circuit 44, the integration circuit 48 and the storage time evaluation circuit 50. The memory is set in advance in such a manner than an output terminal B2 delivers a signal whose level is high only during the "1"-"8" counts by the counter 33'. An output terminal B3 goes high only during the "9"-"10" counts, an output terminal B4 goes high only during "1"-"32" counts, and an output terminal B5 goes high only during the "33"-"232" counts. An output terminal B6 produces a signal whose level is high only during the "233"-"292" counts, an output terminal B7 a signal whose level is high only during the "293"-"492" counts, an output terminal B8 a signal whose level is high only during "493"-"512" counts and the output terminal B1 a signal whose level is high only during the "512" count. In consequence, the B2 output is the control signal $\phi$14, the B3 output the control signal $\phi$15, the B4 output the control signal $\phi$19, the B5 output the control signal $\phi$16, the B7 output the control signal $\phi$17 and the B8 output the control signal $\phi$20. The output of the OR gate 41, which delivers the logic sum of the B5 output and the B7 output, is the control signal $\phi$18, and the output of the OR gate 42 which delivers the logic sum of the B4 output and the B6 output is the signal $\phi$21.

A four bit binary up down counter 52 of the rising edge synchronization type serves for changing the storage time. Its up count mode terminal V is supplied with the output (whose high level is the storage time increasing instruction) (shown in FIG. 29) of the comparator 77 of the storage time evaluation circuit 20. Its down count mode terminal D is supplied with the output of the comparator 76 (whose high level is the storage time decreasing instruction) (shown in FIG. 29). Its clock input terminal is supplied with the output of the AND gate 53 which produces a logic product of the output $\overline{C}$ (carry bar) of the counter 52 with the output B1 of ROM 34'. Consequently, it is possible for the counter 52 to count up only when the content is other than "1111", namely "15" and to count down only when the content is other than "0000", namely "0". Hence, the count in this case is carried out in synchronism with the termination of the read out the output of the image sensor, because the B1 output of ROM 34' is delivered to the AND gate 53. In this case, the "15" count of the up and down counter 52 represents the longest storage time, while the "0" count represents the shortest storage time.

A data selector 54 sets the change storage time T of the image sensor 40 by selecting either of the outputs Q1-Q16 of the counter 33' in accordance with the 4 bit output of the up down counter 52. A D type Flip Flop 55 whose D input terminal is supplied with the output of the data selector 54 is triggered by means of the clock pulse $\phi$2 transferred from the sensor driver 6. A D type Flip Flop 56 whose D input terminal is supplied by the Flip Flop 55 is triggered by the clock pulse $\phi$4 transferred from the sensor driver 6. An AND gate 62 produces the logic product of the Q output of the Flip Flop 55 and the $\overline{Q}$ output of the Flip Flop 56, which output is delivered to the image sensor 40 as shift pulse $\phi$SH. Consequently, the shift pulse $\phi$SH is produced in synchronism with the transferred clock pulse $\phi$4 next to the last based upon either one of the outputs Q1-Q16 of the counter 33' selected by the selector 54 in accordance with the up down counter 52. As is clear from the above construction, by fixing the time shown as T1 in FIG. 36(a) and controlling the time shown as T2 in 16 steps from 10 $\mu$sec. as shortest upwards in the manner of geometric progression, the storage time T(=T1+T2) of the image sensor 40 is controlled in 16 steps from 5.2 $\mu$sec. as shortest upwards.

The output of the AND gate 62 is delivered to the reset terminal R of the counter 33' so that the counter 33' is reset by the shift pulse $\phi$SH delivered from the AND gate 62. A 4 bit binary up down counter of the falling edge synchronization type serves for changing the gain. Its up count mode terminanl U is supplied with the output of the AND gate 64 for producing a logic product of the output (whose high level shows that $V_T$ is too small) of the comparator 112 (FIG. 35) of the integration circuit 48 and the inverted signal of the output of the comparator 77 of the charge storage time evaluation circuit 50. Its down count mode terminal D is supplied with the output of the AND gate 65 for producing a logic product of the output (whose high level shows that $V_T$ is too large) of the comparator 111 (FIG. 35) with the inverted signal of the output of the comparator 76 of the charge storage time evaluation circuit 50. Its clock input terminal is supplied with the output of the AND gate 64 for producing a logic product $\bar{C}$ (carry bar) output of the counter 63 and the B1 output of ROM 34'. Consequently, it is possible for the counter 63 to count up when the content is other than "1111", namely "15" counts, to count down when the content is "0000", namley "0". The count up/count down mode signal is delivered through the AND gates 64 and 65 so that in case the outputs of the comparators 76 and 77 of the storage time evaluation circuit 50 are low, namely no change instruction for the storage time is delivered, the count is changed in accordance with the output of the comparators 111 and 112 of the integration circuit 48. Further, the change of the count in this case is carried out in synchronism with the termination of the read out of the output of the image sensor when the B1 output of ROM 34' is delivered to the AND gate 69. The four bit output of the up down counter 63 is delivered to the analog multiplexer 87 (FIG. 34) of the variable gain amplifier circuit 47 as gain control signal GC1-GC4 and, in consequence, the gain of the variable gain amplifier circuit 47 is controlled in 16 steps in accordance with the 4 bit binary output of the counter 63. In this case the "0" count of the counter 63 is treated as the lowest gain instruction, while the "15" count is treated as the highest gain instruction.

An OR gate 70 produces a logic sum of all of the outputs of the comparators 76 and 77 of the integration circuit 48 and the comparators 111 and 112. The output of the OR gate 70, which is high when any one of the outputs of the four comparators 76, 77, 111 and 112 is high, is delivered to the OR gates 104-106 of the display circuit 49 through the input terminal 56 shown in FIG. 35. This occurs in such a manner that in case the storage time T of the image sensor 40 is changed or the gain of the variable gain amplifier circuit 47 is changed all of LEDs 107a-107c are lit up so as to produce an alarm indicating that the focus detection has not yet been completed. The alarm is eliminated when all of the outputs of the four comparators 76, 77, 111 and 112 are low, namely, the storage time of the image sensor as well as the gain of the variable gain amplifier circuit 47 are proper. This alarm can also be displayed by using the structure shown in broken line in FIG. 37 lower left. Here, an AND gate 71 delivers 2-3 Hz pulses to the input terminal 56 only when the output of the OR gate 70. The output of the AND gate 71 is delivered to the OR gate 104-106 of the display circuit 49 through the input terminal 56 so as to make LEDs 107a-107c flicker at 2-3 Hz.

The embodiment of the device shown in FIG. 23, provides the excellent in-focus detection accuracy and sensing ability of the embodiment shown in FIG. 5, and not only makes it possible to discriminate between in-focus, front focus and rear focus conditions of the image-forming optical system, but also to detect the focus even for a moving object, or one whose brightness is varying with high reliability by evaluating the sharpness of the two images. Moreover, the optimum focus detection is obtained in any given situation by automatically controlling the gains of the various portions of the system in accordance with the brightness and contrast of the object.

Figure 38:
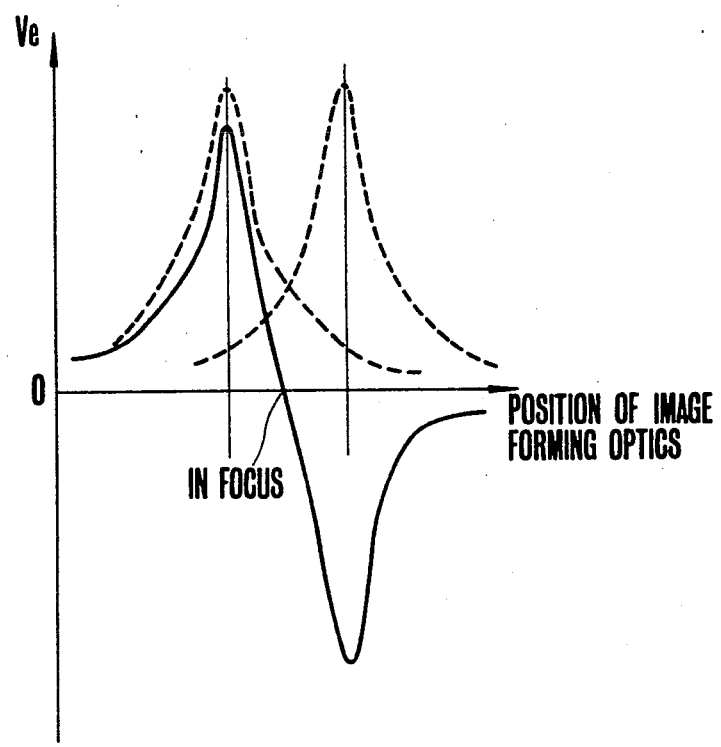
Figure 39:
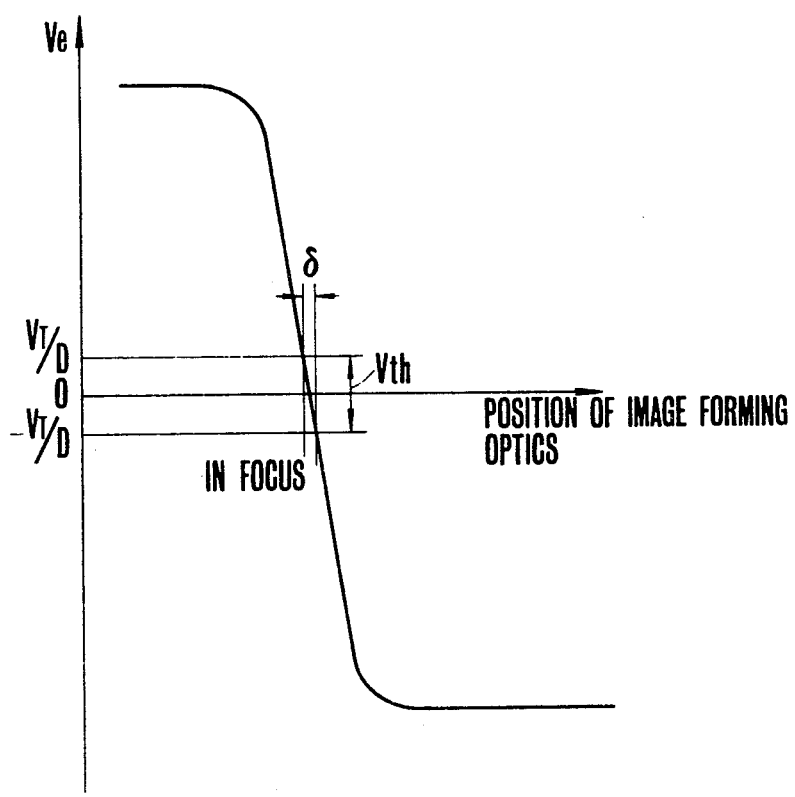

FIG. 38 shows the variation of the voltage Ve with the position of the image-forming optical system in the neighbourhood of the in-focus position provided that the gains of the various portions of the system are maintained constant. As shown, the sign of the voltage Ve is inverted rapidly at the focus, so that the in-focus condition can be detected with very high accuracy. When out-to-focus, discrimination of whether the front or rear focus is effected is possible with high reliability. FIG. 39 shows how the voltage Ve varies with the position of the image-forming optical system provided that the gains of the various portions of the system optimized. In this figure, Vth is a range defined by the reference voltage $\pm V_T/D$ for the comparators 101, 102 in the display circuit 49 shown in FIG. 35. The width, δ, of adjustment in position of the image-forming optical system corresponding to this range represents the in-focus detection accuracy of the device in the present embodiment.

Another embodiment of the present invention is similar to the above-described embodiment in that the first and second light receiving portions are arranged in front and rear of the predetermined focal plane of the image-forming optical system. It differs therefrom in that evaluating the sharpness of the image received in the individual light-receiving portions by comparison involves converting each of the image signals from the above-described first and second light-receiving portions non-linearly, then forming output difference signals from the photoelectric transducer elements (sensor elements) in the individual light receiving portions paired up in spatial correspondence with each other, and then successively accumulating the output signals to produce signals from discrimination of the in-focus, front and rear focuses.

Figure 40:
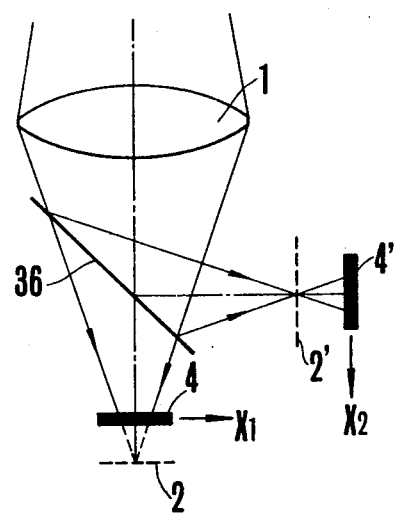
Figure 41:
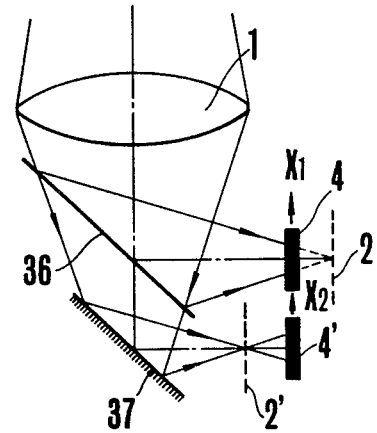

FIGS. 40, 41 and 42 show two practical examples of arrangements of image sensors in the instant embodiment, and three different examples of illuminating distribution of the images on the same sensors. As shown in FIG. 40, a bundle of light rays passing through the image-forming optical system 1 is split by a half-mirror 36 into two parts which form images of an object (not shown) on image sensors 4, 4' arranged in front and rear of a predetermined focal plane 2)=2') to be spaced by equal distances to each other. The example shown in FIG. 41 arranges the two image sensors 4, 4' in the same plane. In this case, by providing a total reflection mirror 37, an equivalent arrangement to that shown in FIG. 40 is made possible. In this example, the sensors 4 and 4' are shown as separate image sensors, but it is possible to use a single image sensor having first and second light receiving portions for the sensor 4 and 4', for example, line sensor having a light receiving surface laid in the paper plane. With this the optical position adjustment is made easier than in the example shown in FIG. 40.

Figure 42A:
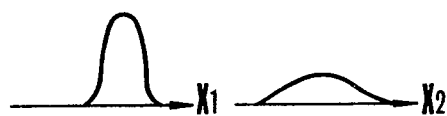
FIGS. 42(a)–42(c) show the brightness distributions of the images in the arrangements shown in FIGS. 40 and 41, in respective imaging condition.
Figure 42B:
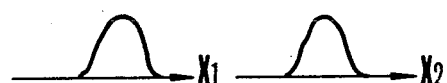
Figure 42C:
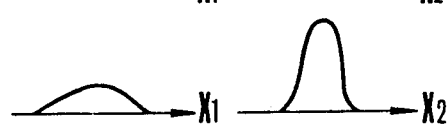

With the arrangements of FIGS. 40 and 41, suppose that the object is a pattern shown in FIG. 2(a), if the image-forming optical system 1 is in the front focus condition, a distribution of illumination of the images such as shown in FIG. 42(a) will take place, if in the in-focus condition, it is as shown in FIG. 42(b), and if in the rear focus condition, it is as shown in FIG. 42(c). In FIGS. 40 to 42(c), x1 and x2 indicate the direction of signal read-out, that is, the scanning direction of the images.

Figure 43:
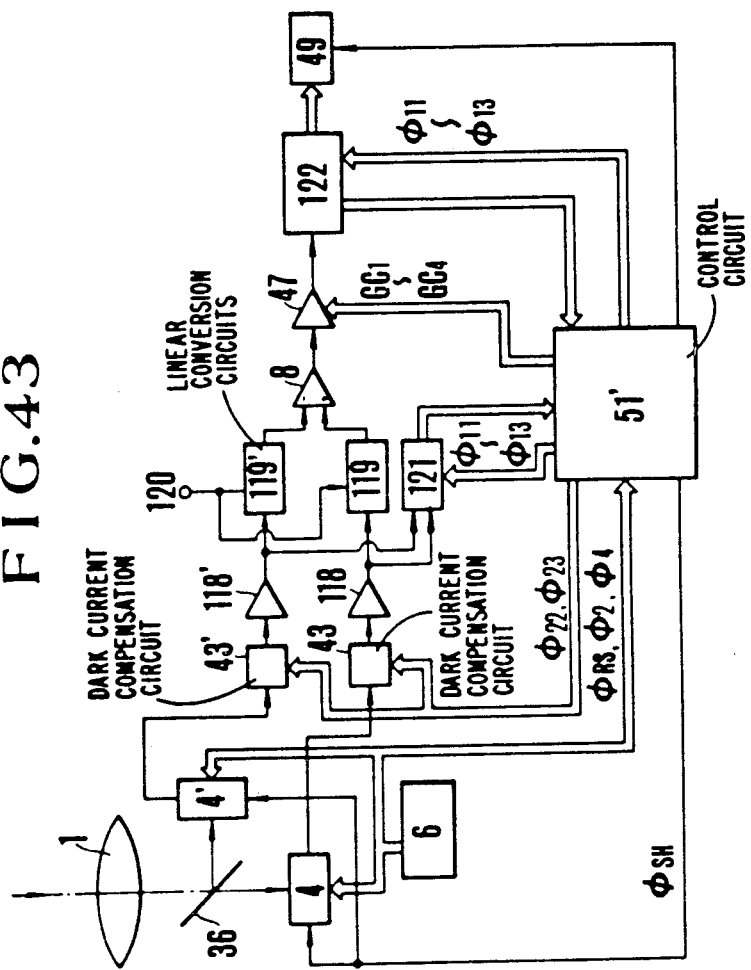
FIG. 43 shows a block diagram of the electrical circuit system of the third embodiment.

Next, FIG. 43 shows the arrangement of the various parts of this embodiment of the device. In the figure, the bundle of light rays passing through the image-forming optical system 1 is split by the half-mirror 36 into two parts which strike the image sensors 4 and 4' arranged on the opposite side of the predetermined focal plane at equal distances to each other therefrom. The image sensors 4 and 4' receive the reset pulse $\phi RS$ and transfer clock pulses $\phi 1-\phi 4$ as mentioned, and also a shift pulse $\phi SH$ from a control circuit 51'. Therefore, on the assumption that the illumination distribution of the images on the image sensors 4 and 4' at this time as shown in FIG. 44(a), then the time-sequential image signals produced from the image sensors 4, 4' become as shown on FIG. 44(b). (It is noted that the scanning directions are indicated by x1, and x2 in FIG. 44(a)). In this case, since the signals of the two images are simultaneously read out from the two image sensors 4 and 4', these signals are illustrated in the figure as superimposed upon another. This corresponds to the example of the arrangement of FIG. 40. However, it may hold in the example of the arrangement of FIG. 41 particularly using the single image sensor (that is, the arrangement shown in FIG. 21), provided that the light receiving portion is divided into two regions with the intervening region constructed in the form of an additional tap for sensing the signal so that the signals of the two images can be detected simultaneously.

The signals of the two images are converted by respective dark current compensating circuits 43, 43' (each of which has a similar construction to that shown in FIG. 25) to signals free from the dark current components as shown in FIG. 44(c). It is to be noted that the operation of these circuits 43, 43' is controlled by control signals $\phi 22$, $\phi 23$ from the control circuit 51' in a manner which will be described later. Then, these signals are then processed through amplifier circuits 118, 118' whose gains are preadjusted independently of each other in accordance with the deviation of the reflectivity and percent transmittance of the half-mirror 36 from the ideal design values to remove their unbalance. The signals are then applied to non-linear conversion circuits 119, 119' of the same construction. These produce output signals as shown in FIG. 44(d). The concurrent two signals are applied to a difference amplifier circuit 8 where they are converted to a time-sequential signal of the difference therebetween as shown in FIG. 44(e).

Figures 45, 46:
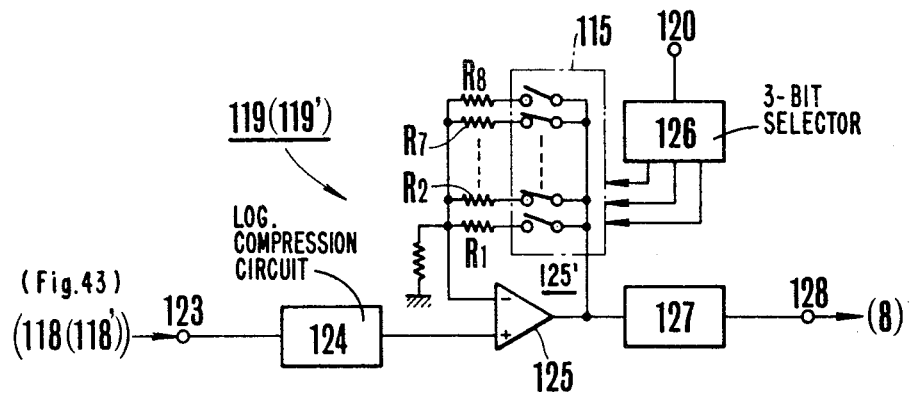
FIG. 45 shows a non-linear transformation circuit in the circuit system shown in FIG. 43, in a concrete way.
FIG. 46 shows an example of the relation of the non-linear transformation characteristic value $\gamma$ of the non-linear transformation circuit shown in FIG. 45.

Though the function of the non-linear conversion circuits 118, 119' is the same as that mentioned, the instant embodiment is characterized in that the non-linear conversion factor is made variable with the full open aperture ratio of the image-forming optical system. In this way, the sharpness detection characteristics are varied. Details of the circuits 119, 119' (which have the same construction) is shown in FIG. 45. In the figure, the image signal from the amplifier circuit 118 (118') enters at an input terminal 123 and proceeds to a known logarithmic compression circuit 124. The output of the circuit 124 is amplified by a variable gain amplifier circuit 125'. The latter includes an 8-bit analog multiplexer connected in the feedback network of an operational amplifier 125 and having analog switches 115 turned ON and OFF by a 3-bit selector 126. This last circuit responds to receipt of the information signal representative of the full open aperture ratio of the image-forming optical system 1 at an input terminal 120 so that the mu-factor of the operational amplifier 125 assumes a corresponding value, as resistors R1 to R8 are suitably selected as the feedback resistance of the operational amplifier 125.

Further, after the output of amplifier 125 has been expanded by a known logarithmic elongation, i.e., expander, circuit 127, it exits from the output terminal 128. This permits the non-linear conversion characteristics to be varied in correspondence with the characteristics of the image-forming optical system. Thus, the variation due to the variation of the characteristics of the optical system is suppressed to as low a level as possible to stabilize the detection of sharpness.

FIG. 46 shows an example of the variation of the non-linear conversion characteristic value, $\gamma$, with the F-number F No. (the reciprocal number of the full open aperture ratio) of the image-forming optical system. As the F No. becomes smaller, the $\gamma$ is made smaller, and conversely as the F No. becomes larger, the $\gamma$ is made larger. Hence, a stronger non-linear conversion is applied to the image signal to sharpen the focus signal.

Figure 47:
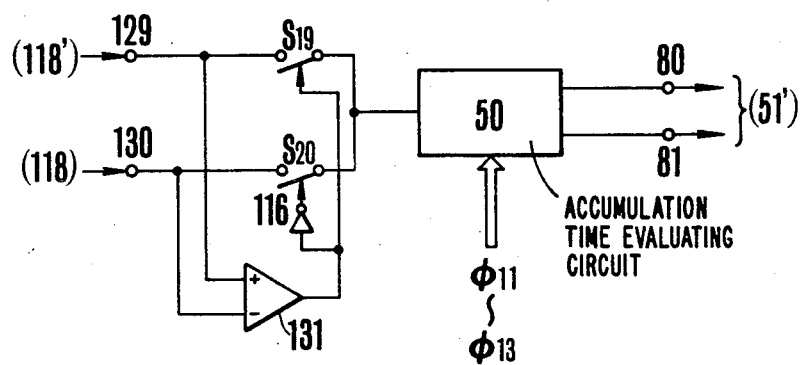
FIG. 47 shows a portion of an integration time evaluation circuit in the circuit system shown in FIG. 43 differs from the integration time evaluation circuit shown in FIG. 29 in the circuit system shown in FIG. 23 in a concrete way.
Figure 48:
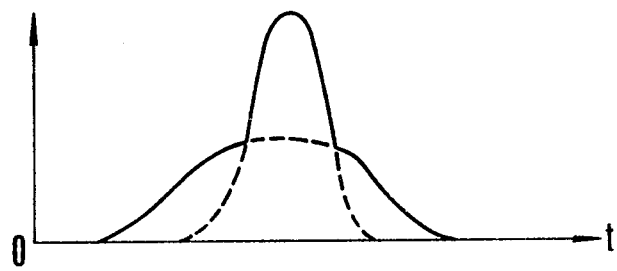
FIG. 48 shows waveforms for showing the operation of the integration time evaluation circuit shown in FIG. 47.

In FIG. 43, the outputs of the amplifier circuits 118, 118' are also applied to an accumulation time evaluating circuit 121. The construction and arrangement of the circuit components of the accumulation time evaluating circuit 121 in the instant embodiment is shown in FIG. 47. In this figure, a comparator 131 responsive to the outputs of the amplifier circuits 118 and 118' appearing at input terminals 129 and 130 respectively, and an inverter 116 responsive to the output of of the comparator 131 control the ON and OFF operation of analog switches S19 and S20 so that, of these two concurrent inputs, the one which has a higher level is always selected. In other words, as shown by solid line curves in FIG. 48, the higher one of the signals of the two images is always applied to an accumulation time evaluation circuit 50 having a construction similar to that shown in FIG. 29. This circuit functions in a similar manner to that described above. When the accumulation time is too short with production of a signal of small magnitude, a command signal for elongation of the accumulation time is produced at an output terminal 81. Conversely, when the accumulation time is too long with production of a signal of large magnitude, an accumulation time shortening command signal is produced at an output terminal 80. These signals are applied to the control circuit 51'.

The output signal of the difference amplifier circuit S, after being modified to a suitable level by a variable gain amplifier circuit 47 whose gain is controlled by control signals GC1–GC4 from the control circuit 51', is applied to an integrating circuit 122. The output signal of the integrating circuit 122 is shown in FIG. 44(f) where the final integration value Ve is used to indicate the condition of focus adjustment. A display circuit 49 is of smaller construction and function to the circuit 49 of the circuit in the embodiment shown in FIG. 23. The practical construction and arrangement of the above-described integrating circuit 122 and display circuit 49 are shown in FIG. 49, where those of the elements which are denoted by the same reference characters as in FIG. 35 have similar functions to those described in connection with FIG. 35.

Figure 49:
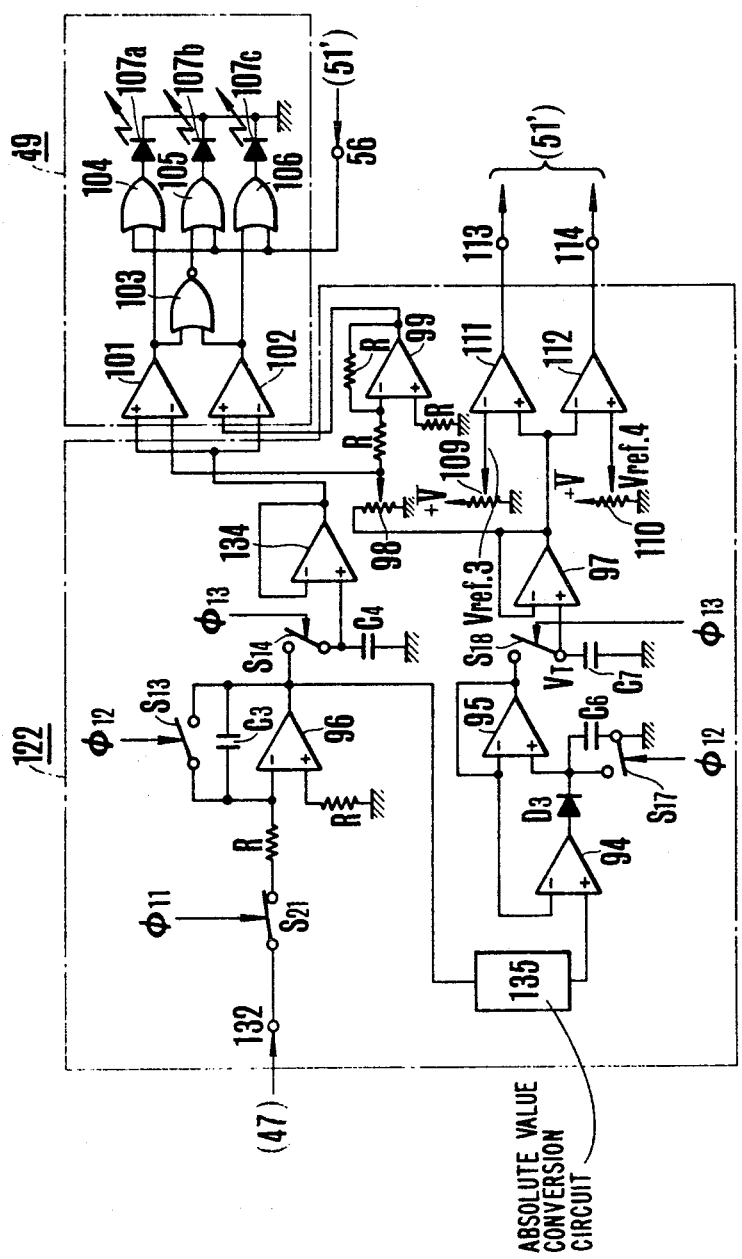
FIG. 49 shows an integrating circuit and a display circuit in the circuit system shown in FIG. 43, in a concrete way.
Figure 50:
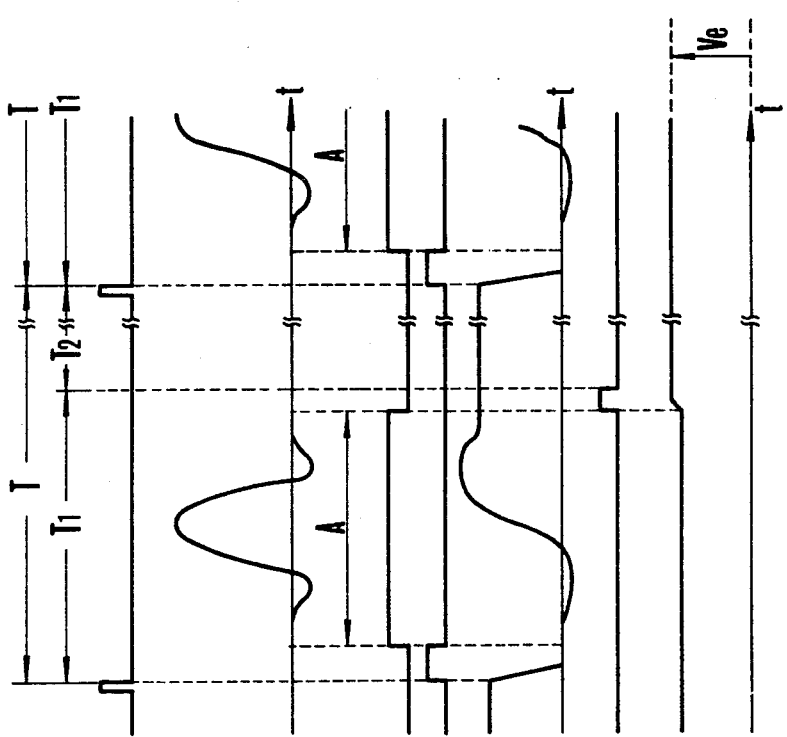

In FIG. 49, the output of the variable gain amplifier circuit 47, for example, as shown in FIG. 50(b), enters an input terminal 132 and is integrated by the integrating circuit. The latter comprises an input control analog switch S21 whose ON and OFF operation is controlled by the control signals $\phi 11$ (FIG. 50(c))—this is the same as that shown in FIG. 17(c) 17(d)), a clear analog switch S13 whose ON and OFF operation is controlled by the control signal $\phi 12$ (FIG. 50(d)—this is the same as that shown in FIG. 17(d)), a resistor R, a capacitor C3 and an operational amplifier 96 as far as the signal in the only range of measurement indicated by A in FIG. 50(a) is concerned. The result is shown in FIG. 50(e). And, this integrated value is sample-held in a capacitor C4 through an analog switch S14 whose ON and OFF operation is controlled by the control signal $\phi 13$ (FIG. 50(f)—this is the same as that shown in FIG. 17(e)), as shown in FIG. 50(g). Then, this held value is produced through a buffer amplifier 134. It is to be noted that the held value occurring at this time appears as a Ve shown in FIG. 44(f).

The integrated output from the operational amplifier 96, on the other hand, after having been converted to an absolute value signal by an absolute value conversion circuit 135 (which may be of a construction such as shown in FIG. 10) is applied to a peak hold circuit. The latter is composed of operational amplifiers 94, 95, a diode D3, a capacitor C6 and a clear analog switch S17 whose ON and OFF operation is controlled by the control signal $\phi 12$ from the control circuit 51'. Then, the peak value held at this time is sample-held in a capacitor C7 through an analog switch S18 whose ON and OFF operation is controlled by the control signal $\phi 13$ from the control circuit 51'. The hold value of capacitor C7 occurring at this time is represented by $V_T$ mentioned in connection with FIG. 35, and this is applied further through a buffer amplifier 97. The remaining circuit portions have the same construction and arrangement, and the same functions as those described in connection with FIG. 35, and therefore, their explanation is omitted.

The control circuit 51' in the instant embodiment can be constructed by very slight modification of the control circuit 50 which appears in FIG. 23 and whose details are shown in FIG. 37, that is, merely by altering the content of the ROM 34'. Therefore, the detailed illustration of the construction of this control circuit 51' is omitted, and explanation is given only of the memory content of the ROM 34'. At first, let us assume that the image sensors 4, 4' used in the instant embodiment each have, for example, 256 bits information, that is, 256 sensor elements as in the embodiment shown in FIG. 5, while six, for example, of them from the first to the sixth bit are shielded from light to obtain a dark current signal. In this case, the memory content of the ROM 34' is preset such that when the outputs of the image sensors are read out based on the count output of the counter 33', a signal which is high only when the 1st–6th bit signals are read out, and is otherwise maintained low, is produced as the control signal $\phi 22$. A signal which is high only when the signals for the 7th and 8th bits are read out, and is otherwise maintained low, issues as the control signal $\phi 23$, a signal which is high only when the signals for 1st–10th bits are read out and is otherwise low, issues as the control signal $\phi 12$, and a signal which goes high only during the time the signals for the 11th–250th bits are read out and is otherwise low, forms the control signal $\phi 11$. A signal which goes high only during the time the signals for the 251st–256th bits are read out and is otherwise low, is produced by the ROM 34' as the control signal $\phi 13$, and a signal which is high only when the signal for the 256th bit is read out and is otherwise low, issues as the trigger pulse for the AND gates 53 and 69 in FIG. 37. As mentioned, the control signals $\phi 11$–$\phi 13$ are fed to the integration circuit 122, while the control signal $\phi 22$ is fed to the clear analog switch S5 (FIG. 25) in the dark current compensation circuits 43 and 43', and the control signal $\phi 23$ to the input control analog switch S5 (FIG. 25). The control signals $\phi 11$–$\phi 13$ are, on the other hand, fed to the analog switches S8–S10 (FIG. 29) in the circuit of FIG. 47 of the accumulation time evaluating circuit 121. This contrasts with the embodiment of FIG. 23 where the control signals $\phi 18$–$\phi 20$ are fed to these switches.

The control circuit 51' of the instant embodiment does not require the waveform shaping circuit 31 shown in FIG. 37 and a half-bit delay circuit 32. As in the embodiment of FIG. 23 in the instant embodiment, the time indicated by T2 in FIG. 50(a) is controlled geometrically in 16 steps, beginning with zero seconds at the minimum, so that the accumulation time T of the image sensors 4 and 4' is controlled in 16 steps. Again, in this case, the T1 is fixed corresponding to the time necessary to read out the outputs of the image sensors 4, 4'.

As the above, what is different between the embodiment described in particular connection with FIG. 43 and the embodiment described in particular connection with FIG. 23 is that in the embodiment of FIG. 43, the first and second signals of images are first subjected to non-linear conversion, and after that, a difference is taken between the output signals from each pair of sensor elements whose positions correspond to each other in the two light receiving portions. When this difference is integrated to obtain a final integrated value Ve, the resulting sign is used to discriminate between the in-focus, front and rear focus conditions of the image-forming optical system. This embodiment shown in FIG. 43, when applied to a camera as in the above described embodiment, is also able to always set the optimum conditions depending upon the situation in which the camera is used, so that it is possible to achieve a very highly accurate in-focus detection as shown in FIGS. 38 and 39.

The focus detecting device according to the present invention and described above as part of a focus detecting system for an objective lens in optical instruments such as cameras will be explained, for example, in a singal lens reflex camera. But it is to be understood that the device of the present invention is applicable to other types of cameras.

Figure 51:
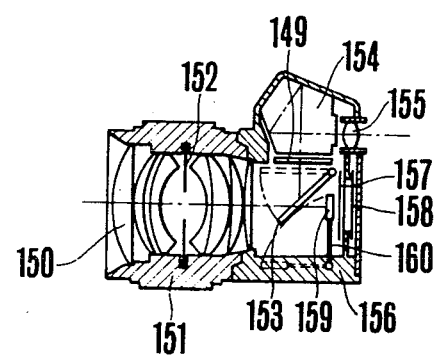
FIG. 51 shows outline of the construction of the camera.

FIG. 51 shows the focus detecting device of the invention incorporated in a commonly available single lens reflex camera. In the figure, an objective lens 150 is mounted in a barrel 151 together with a diaphragm 152. Light from an object (not shown) being photographed enters the objective lens 150 and passes to a quick return mirror 153 therethrough, and after reflection therefrom, through a focusing screen 149, a penta prism 154, and an eye-piece 155, reaches an eye of the operation (not shown). The operation is thus able to sight the object, to focus, and to adjust the exposure factors. When an exposure is to be made by actuating a shutter 157, the quick return mirror 153 is flipped upward by means known in the art to clear up the image forming light path to a photographic film 158. A camera housing 156 accommodates the above-described parts and is capable of shielding out the ambient disturbing light. A focus detecting device 159 in the form of a unit (hereinafter abbreviated as AF unit 159) is arranged to be retracted from the image forming light path as shown by dashed lines by a support member 153 which is rotatably mounted on the camera housing 156 in response to the upward movement of the quick return mirror 153. During the focusing operation of the objective lens 150, the AF unit 159 lies in the exposure light path as shown by solid lines in the figure. Since the quick return mirror 153 assumes an inclined position in the exposure light path as shown by solid lines in the figure, the mirror 153 must be half-mirrored to a suitable percent transmittance in part or as a whole. Therefore, the light reflected from the quick return mirror 153 is directed to the finder system, while the transmitted light is directed to the light receiving surface of the image sensors in the AF unit 159. This is to permit the sharpness of the object image to be detected and to inform the operator of whether the objective lens 150 is in focus or not by display means such as LEDs (not shown).

When the shutter is released, that is, when an exposure is initiated, the AF unit 159 and the quick return mirror 153 are simultaneously moved away from the exposure light path. Then, when the exposure is terminated and the quick return mirror 153 returns to the initial position, the AF unit 159 also is again brought into the exposure light path in response thereto.

Figure 52:
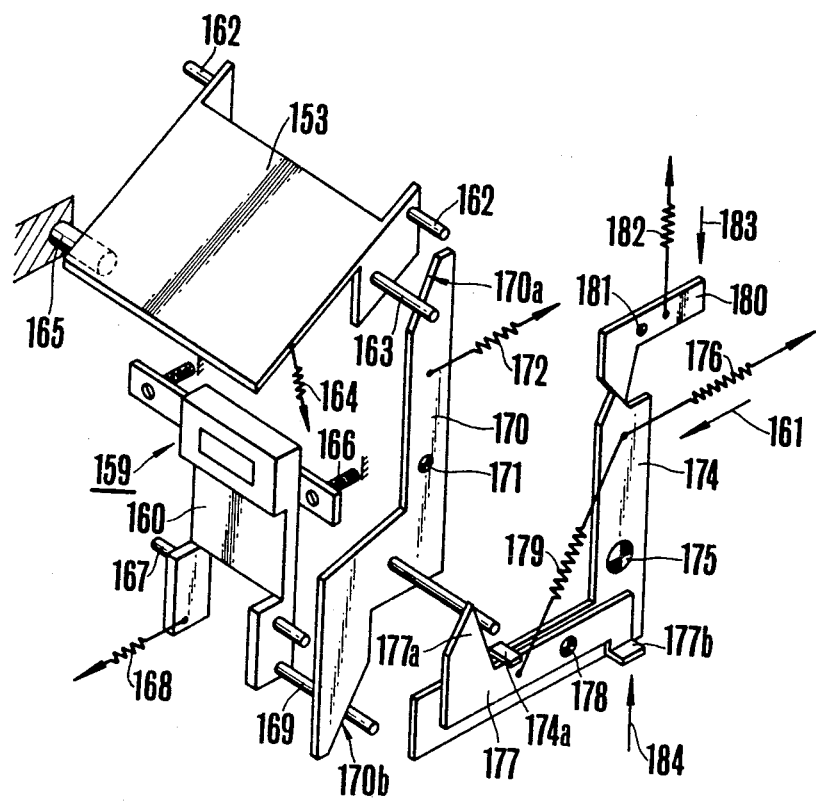

A mechanism for achieving such cooperative relation of the quick return mirror 153 and AF unit 159 is shown in FIG. 52. In this figure, a camera charge mechanism known in the art and whose illustration is omitted here, applies a force to an L-shape lever 174 in the direction indicated by an arrow 161. The lever 174 is turned counterclockwise about a shaft 175 against the force of a spring 176. And, in the terminal end position of rotation thereof, a latching member 180 rotatably mounted on a shaft 181 engages with the end portion of the lever 174 as shown in the figure under the action of a spring 182, and, therefore, the lever 174 is latched in this position against the spring 176. Also, at this time, a hook member 177 pivoted at a pin 178 on the lever 174, because of its linkage with the lever 174 so as to be restrained by a bent-off portion 174a thereof as a stopper with the help of a spring 179 is turned in unison with the lever 174. Therefore, its end or hooked portion 177a is shifted counterclockwise so that a drive lever 170 pivoted at a shaft 171 is released from latching engagement at its pin 173 therewith, and then turned about the shaft 171 by the action of the spring 172.

When the drive lever 170 is turned clockwise as viewed in the figure, a pin 163 fixedly provided on the quick return mirror 153 is made displaceable in response to the clockwise movement of a slant portion 170a formed in an end portion of said drive lever 170. Thus, the mirror 153 is turned about a stationary shaft 162 by the force of a spring 164 until it abuts against a stopper 156 and is set in an inclined state of 45°. On the other hand, a slant surface 170b formed in the tail end of the drive lever 170 engages a pin 169 fixedly mounted on a support member 160 of the AF unit 159 so that the clockwise rotation of the lever 170 at this time causes the support member 160 to turn clockwise about a shaft 167 in response to a spring 168. The AF unit 159 is thus positioned in the exposure light path. Fine adjusting screws 166 hold the light receiving portion of said AF unit 159 in an optically accurate position at a predetermined focal plane (that is, film plane) of the objective lens 150 in the state that the AF unit 159 is positioned in the exposure light path.

After the focus adjustment of the objective lens 150 by utilizing the output of the AF unit 159 in such state has been completed, when the shutter is released, a force of direction indicated by an arrow 183 is applied to the latching member 180 by a release member (not shown), so that the latching member 180 is turned about the shaft 181 clockwise against the spring 182 to disengage the lever 174 therefrom. Therefore, the lever 174 is turned clockwise by the action of the spring 176. At this time, the hook member 177 on said lever 174 is turned in unison with the lever 174, causing the drive lever 170 to be turned counterclockwise about the shaft 171 against the spring 172 by depressing its pin 173 by the hooked portion 177a of the hook member 177, and therefore, causing the quick return mirror 153 to be turned clockwise about the shaft 162 against the spring 164 by depressing its pin 163 with the slant surface 170a of the drive lever 170. On the other hand, the support member 160 is turned in the counterclockwise direction about the shaft 167 against the spring 168 by its pin 169 depressed by the slant surface 170b of the tail end of said lever 170. Thus, the quick return mirror 153 and the AF unit 159 are both taken out of the exposure light path. After that, the shutter 157 is released to expose the film 158. And when the exposure of the film 158 has been completed, for example, by the concurrent running down movement of the rear curtain of the focal plane shutter, a signal is formed, that is, a shutter closing signal which actuates a mechanism (not shown) to apply a force of the direction indicated by the arrow 184 in the figure to the bent-off portion 177b of the tail end of the hook member 177. Thus, said hook member is turned about the shaft 178 in the counterclockwise direction against the spring 179. Therefore, the drive lever 170 is disengaged at its pin 173 from the depression by the hooked portion 177a of the hook member 177 and then turned clockwise by the action of the spring 172. Thus, as has already been mentioned, the quick return mirror 153 and the AF unit 159 are both positioned in the exposure light path. After that, when the camera is charged again, by applying a force in a direction indicated by the arrow 161 to the lever 174, said lever 174 is turned counterclockwise against the spring 176, and in the terminal end position of its rotation is latched by the latching member 180. The camera is now set in the above-described charge completed position.

Figure 53:
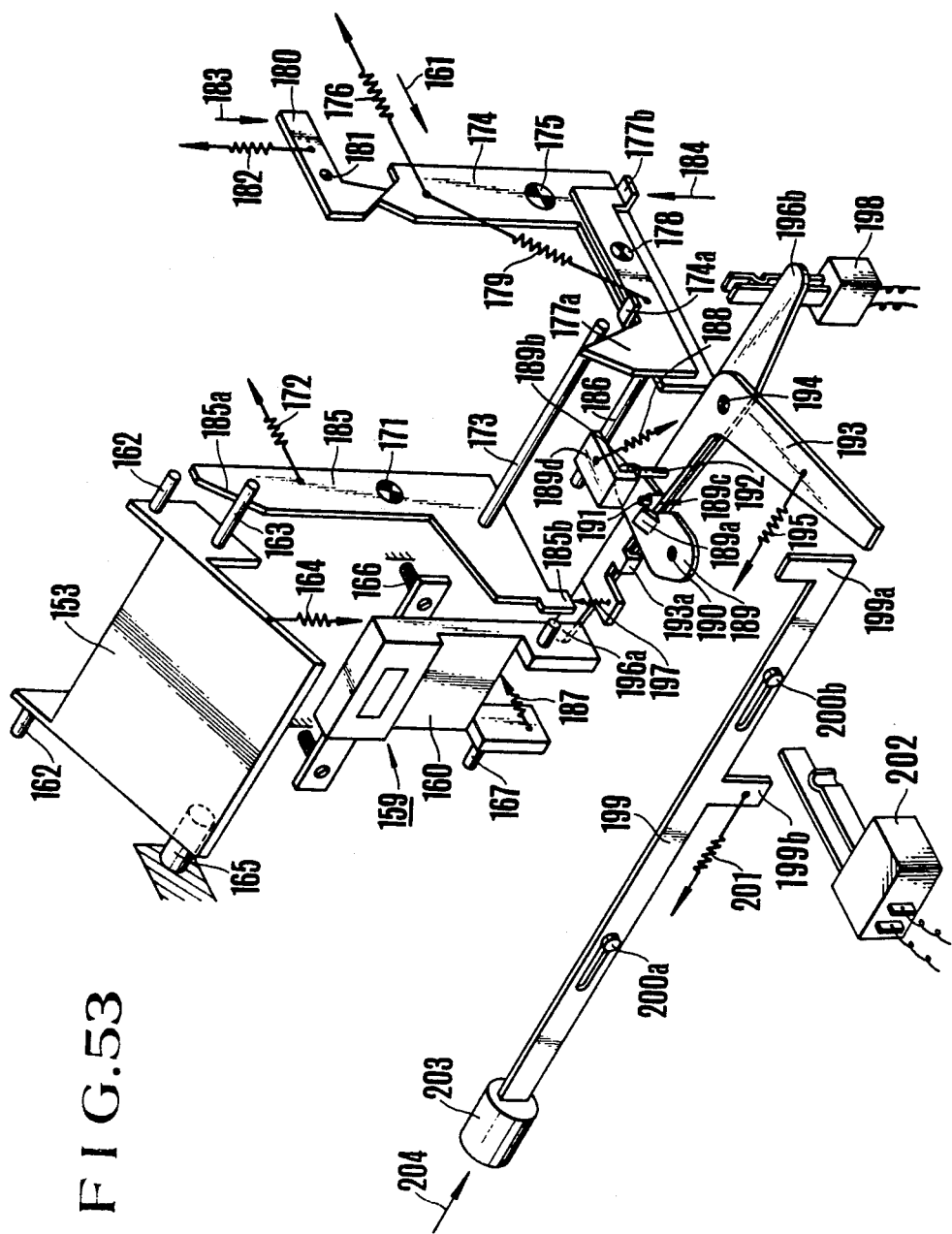

The foregoing description concerns cooperation of the quick return mirror 153 and AF unit 159. In general, however, instead of using the AF unit 159, it is desirable to use an ordinary optical in-focus detecting means (focusing screen 149) such as a micro-prism in focusing the objective lens 150. For the already mentioned reason, there is a need to use the ordinary optical focusing means when the focusing by the AF unit 159 is difficult to perform. An example of a mechanism capable of holding or retracting the AF unit 159 in or form the exposure light path according to the invention of the user, and of automatically effecting the retraction when the film is exposed in order to avoid faulty operation is shown in FIG. 53. The elements denoted by the same reference characters in FIGS. 52 and 53 have the same construction and function, and therefore, their explanation is omitted with respect to FIG. 53. In this figure, the mechanism is shown already charged with the quick return mirror 153 held inclined at 45°, in the exposure light path.

The AF unit 159 is also set in the exposure light path in response to depression of the button 203 in the direction indicated by an arrow 204 and through a mechanism to be described. In the charged or energized state illustrated, where a release pin 186 fixedly mounted on the end of the lever 174 is dropped down, a latching member 189 pivoted at a shaft 190 to swing up and down is shifted downwardly of a spring 188 pulling toward the right hand lower corner. At this time, a first drive lever 193 pivoted at a shaft 194 is held in the illustrated position by its pin 191 engaging a cutout portion 189c of the latching member 189 so that it is turned counterclockwise to the illustrated position against a spring 195 by sliding movement of a slide plate 199 caused by the depression of the button 203. At this time, a second drive lever 196 pivoted at the shaft 194 and connected to said first drive lever 193 by a spring 197 also is turned with the first drive lever in the same direction and to the illustrated position. The second drive lever 196 in the illustrated angular position presses at its end 196a against the leg portion of the AF unit support member 160 so that the support member 160 is turned clockwise about a shaft 167 against a spring 187 to position the AF unit 159 in the exposure light path. The tail end 196b of lever 196 throws an electrical power source switch 198 for the AF unit. Otherwise, there is no difference from the example shown in FIG. 52.

With such a mechanism, after completion of the focus adjustment of the objective lens 150 utilizing the output of the AF unit 159, when the camera is released, the lever 174 is released from its latching engagement with the latching member 180 and then turned clockwise by the spring 176. And, at this time, the hook member 177 is turned to follow it through the spring 179, causing the drive lever 185 to be turned counterclockwise about the shaft 161 against the spring 172 through the pin 173, and, therefore, causing the quick return mirror 153 to be moved out of the exposure light path against the force of the spring 164 as the pin 163 is depressed by the slant surface 185a of the said drive lever 185 at the end thereof.

Clockwise rotation of the lever 174 also moves the release pin 186 upwards, which in turn lifts the extension 189d and the latching member 189 upward against the force of the spring 188. Therefore, the first drive lever 193 is released from the latching engagement of its pin 191, and then turned clockwise by the spring 195. And, at this time, the second drive lever 196 is pushed in the same direction as the first drive lever 193 by the bent-off portion 193a. Therefore, the end 196a of the lever 196 releases the support member 160 so that the support member 160 now turns counterclockwise in response to the action of the spring 187. The latter retracts the AF unit 159 from the exposure light path.

The movement of the second drive lever 196 also causes the switch 198 to open, and, therefore to render the AF unit 159 inoperative. It is to be noted that in the turned position of the first drive lever 193, the latching member 189 is turned slightly clockwise until it abuts against the stopper pin 192 on said first drive lever 193, and, at this time, the pin 191 on the first drive lever 193 is positioned to engage the tapered right hand side end of the above-described latching member 189.

After that, the shutter 157 is released to expose the film 158. When this exposure is terminated, the concurrent shutter closing signal is formed, and the hook member 177 is pressed in the direction of the arrow 84 at the bent-off portion 177b of the tail end thereof so as to turn it counterclockwise. Therefore, the drive lever 185 is turned clockwise by the spring 172 as the hooked portion 177a of said hook member 177 is disengaged from the pin 173. The spring 164 then returns the quick return mirror 153 to the exposure light path.

When the camera is recharged or re-energized, a force of the direction indicated by the arrow 161 turns the lever 174 counterclockwise against the force of the spring 176, and at the terminal end of movement, the lever 174 is latched by the latching member 180. Such counterclockwise movement of the lever 174 causes the release pin 186 to move downwards, and, therefore, the spring 188 shifts the latching member 189 downwards into engagement with the stopper pin 192. At this time, the pin 191 on the first drive lever 193 is brought into engagement with said latching member 189 at the right hand side end surface 189b.

It is to be noted here that unlike the mechanism of FIG. 52, this example of mechanism allows the AF unit 159 to remain retracted from the exposure light path even when the quick return mirror 153 is returned to the exposure light path. In this state, when the button is depressed to the right by the photographer, the slide plate 199 slides to the right guided by guide pins 200a, 200b against the force of a spring 201. The right end 199a of said slide plate 199 then pushes the first drive lever 193 and turns it counterclockwise and, while following it, the second drive lever 196 is turned in the same direction. During this time, the end 196a of the second drive lever 196 while engaging one of the leg portions of the support member 160 of the AF unit 159 returns the AF unit 159 into the exposure light path against the force of the spring 187. Also, at this time, the pin 191 on the first drive lever 193 pushes the latching member 189 at the right hand side surface 189b as the first drive lever 193 is turned counterclockwise, while moving slightly counterclockwise against the force of the spring 188 to align with the cutout portion 189c of the said latching member 189. Then, the latching member 189 is slightly turned in the clockwise direction by the action of the spring 188, so that the pin 191 is latched by the cutout portion 189c. Thus, the levers 193 and 196 are latched as shown in the figure. After that, even when the button 203 is released, the AF unit 159 remains positioned in the exposure light path.

On the other hand, it is possible to move away the AF unit along from the exposure light path manually. In this case, the operator needs to depress the button 203 more deeply than in the above. Since the slide plate 199 is moved to the right a longer distance than in the above, the first drive lever is turned counterclockwise from the illustrated position to the counterclockwise direction. This brings the pin 191 on said first drive lever 193 into engagement with the tapered ramp portion 189a provided in continuance to the latching cutout portion 189c to lift up said latching member 189 against the spring 188. Since this cases said latching member 189 to be slightly turned in the clockwise direction until it is restrained by the stopper pin 192, the above-described pin 191 moves underneath the latching member 189. And, in this state, when the button 203 is released, the levers 193, 196 are turned clockwise by the spring 195 to release the pressure on the leg of the support member 160. Hence, the support member 160 is turned counterclockwise by the spring 187, and, therefore, the AF unit 159 is retracted from the exposure light path.

At this time, the switch 198 is opened. When the retraction of the AF unit 159 from the exposure light path has been completed, the pin 191 on the first drive lever 193 is positioned to be engageable with the latching member 189 at the right hand side end 189b. Therefore, when the button 203 is again depressed during this condition, as has been described, the AF unit 159 is again positioned in the exposure light path. At this time, the levers 193 and 196 are latched by the latching member 189 as shown in the figure. It is to be noted that a projected portion 185b formed in a portion of the drive lever 185 functions upon engagement with the second drive lever 196 to inhibit movement of the second drive lever 196 during the exposure time in order that the AF unit 159 is prevented from being positioned on the exposure light path when the button 203 is accidentally depressed during a long time exposure.

According to the structure shown in FIG. 53, when the AF unit 159 is made to stand up in the photographic optical path by the depression of the button 203, this AF unit 159 does not retract from the photographic optical path even if the camera is released, so that it is desirable to prohibit camera release. For this purpose, for example, a switch 202 which is closed by a projected part 199b, of the slide plate 199 at the time of the depression of the button 203 may be provided so as to prevent the push-down of the camera release button by an electromagnet (not shown) and its additional mechanism so far as the switch 202 is closed.

Figure 54:
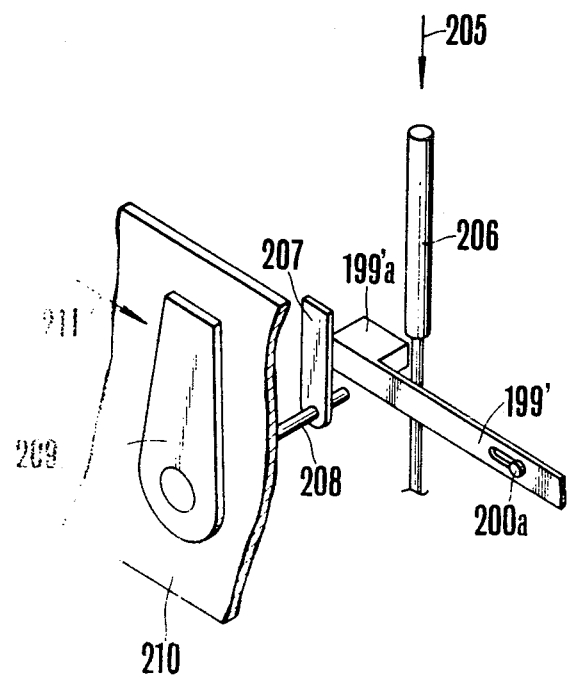
FIGS. 52, 53 and 54 respectively show an example of the important part applicable to the camera in perspective view.

FIG. 54 shows an example of modification of the mechanism of FIG. 53, wherein the slide plate 199 operates with a self-timer lever known in the art, and faulty operation is prevent in the depressed and released states of the release button.

In FIG. 54, a slide plate 199' corresponds to the slide plate 199 of FIG. 53. The slide plate 199' at one end thereof. When a self-timer lever 209 provided on the camera body 210 is turned in a direction indicated by an arrow 221 to move the slide plate 199' to the right through the shaft 208 and arm 207, that is, when the AF unit is in use, the depression of the release button 206 in a direction indicated by an arrow 205 is hindered by the projected portion 199'a. Conversely, when the exposure is being made with the release button 206 depressed, the projected portion 199'a cannot be moved to the right by the depressed release button 206, and therefore, rotation of the self-timer lever 209 is inhibited, so that the above-described faulty operation is prevented.

Mention has already been made of the variation of focus signal with the relative aperture of the image-forming optical system. In order to minimize the range of variation, the circuit parameter of the focus detecting device may be controlled by use of a signal corresponding to the aperture ratio of the objective lens used in the camera. In the following, consideration is given to a method of forming the signal representative of the aperture ratio of the objective lens to control the circuit parameter and a method of controlling the sensitivity of a focus condition display means such as a galvanometer by taking into account the maximum possible aperture of the used objective lens and the number of aperture stops closed down.

Figure 55:
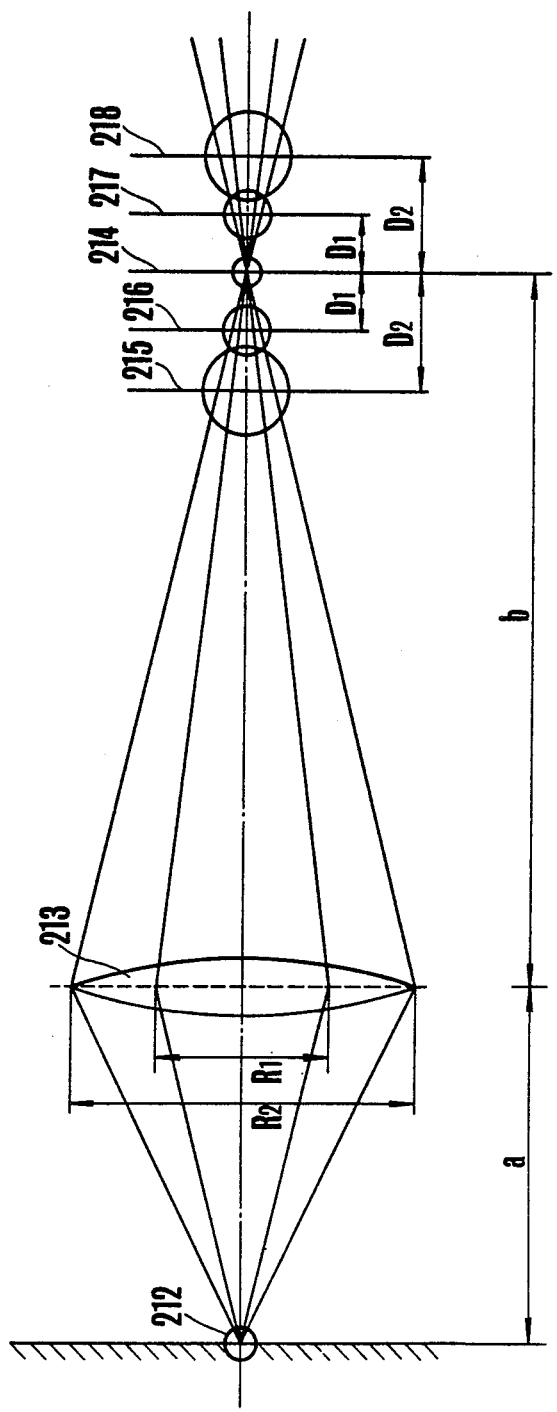
FIG. 55 shows a sketch for showing the relation of the imaging condition of the optical system to the image out of focus.

FIG. 55 is a diagram of geometry considered to quantitatively explain the general relationship of the image sharpness and the aperture ratio of the image-forming optical system at the fully open aperture. In the figure, an object 212 at a distance, a, from a lens 213 having a focal length, f, is focused at a position satisfying the following formula:

$$\frac{1}{f} = \frac{1}{a} + \frac{1}{b} \quad (1)$$

where b is the distance from the lens to the image position 214. In this case, the spatial frequency of the object is multiplied by a factor of b/a, for the image magnification rate is b/a. Here, the spatial frequency reduced due to the blurring of the image at a plane 215, 216, 217, 218 near the focal plane 214, is proportional to the diameter R of the exit pupil of the lens 213 and D/b where D is the distance from each of the planes 215, 216, 217, and 218 to the focal plane 214. That is, the reduction of spatial frequency at a point spaced from the focal plane 214 by a certain distance is proportional to the R/b, namely, the aperture ratio of the lens provided that the amount of movement of the lens is small. For this reason, where the image blur, or the spatial frequency is indirectly measured either at the focal plane, or at the vicinity thereof, to detect the distance between the image plane and the predetermined focal plane, its sharpness detecting ability is proportional to the aperture ratio of the objective lens at the fully open aperture. On the other hand, the D allowed for the acceptable sharpness of photographs is inversely proportional to the aperture ratio. On this account, therefore, as has been mentioned above, the sharpness detecting ability must be adjusted in accordance with the aperture ratio of the objective lens to always obtain an appropriate focus detecting performance when the device is applied to a practical instrument such as a camera, as is theoretically suggested.

Figure 56:
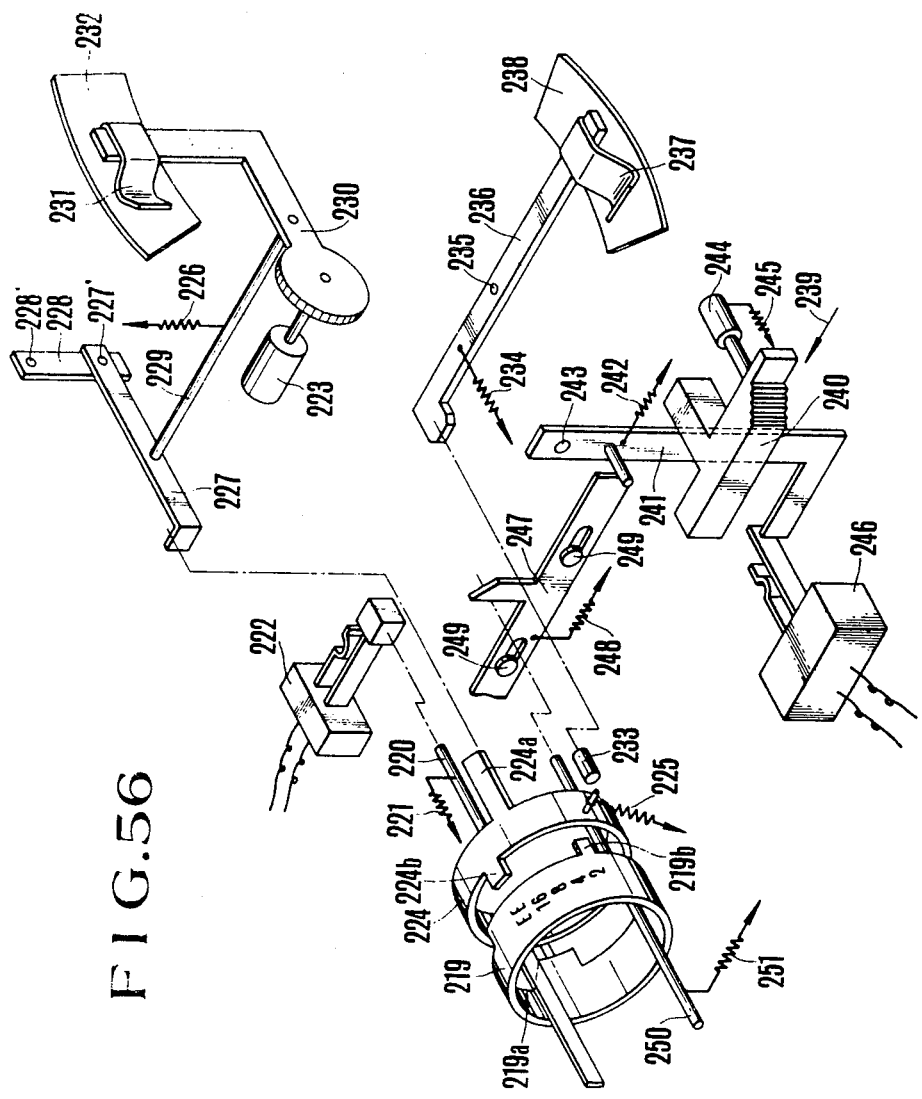
FIG. 56 shows a construction of the exposure control system of the camera system including the photographing lens in perspective view.

FIG. 56 shows an example of a practical mechanism for performing such an adjustment. At first, in the diaphragm priority EE mode where the diaphragm value is selected by the diaphragm ring provided on the lens barrel to set the manual exposure mode, and the EE exposure is effected with the set value of diaphragm, the user operates a diaphragm ring 219 to set the diaphragm value. In this state, an EE signal pin 220 is moved to the left by a cam portion 219a formed in said ring 219 responding to the action of a spring 221 as shown in the figure. On the camera, the concurrent OFF of an EE signal switch 222 indicates that the lens is in the manual diaphragm setting state, and to render a diaphragm signal control power source 223 inoperative. Then, the diaphragm signal ring 224 of the lens is turned clockwise by a spring 225 and stops at a point where a projection 219b of the diaphragm ring 219 abuts against a projection 224b of the diaphragm signal ring 224. The diaphragm value set at that time is then transmitted as a number of diaphragm stops closed down from the maximum diaphragm aperture of the objective lens by the projection 224a to the camera body. In the camera body, this set diaphragm value is received by a diaphragm signal lever 227 contacting the projection 224a of the diaphragm signal ring 224 in response to the action of a weak spring 226. This diaphragm value information is converted to a movement of a brush-carrying lever 230 through a link mechanism 227, 227', 228, 228', 229 provided in the camera body. Concurrent variation in position of a diaphragm signal brush 231 mounted on the lever 230 relative to a resistance substrate 232 converts the movement to an electrical signal representative of the number of diaphragm stops closed down from the maximum possible diaphragm aperture.

The maximum possible diaphragm aperture of the objective lens is defined by the length of a full open diaphragm value signal pin 233 in the objective lens mount, and is transmitted to a full open diaphragm aperture signal lever 236 biased by a spring 234 for counterclockwise rotation about a shaft 235 in the camera body. And, the concurrent variation of position of a brush 237 carried on the lever 236 on the resistance substrate 238 is converted to an electrical signal representative of the maximum aperture ratio. This signal is applied to the device of the embodiment shown in FIGS. 23 and 43 to thereby obtain the above-described effect.

In the diaphragm closed down mode, the maximum aperture ratio becomes the set aperture ratio. The diaphragm is closed down by depressing a diaphragm closing down control button in the direction indicated by an arrow 239. A diaphragm closing down link 241 is thus turned clockwise about a shaft 243 against a spring 242, and a locking member 244 is projected by the force of a spring 245 to lock the button 240 at this position. The clockwise rotation of the diaphragm closing down link 241 turns on a switch 246 for detecting the diaphragm closed down state, and, on the other hand, slides a diaphragm closing down lever 247 along a guide pin 249 to the left as viewed in the figure against a spring 248 as in the automatic diaphragm. Movement of the diaphragm closing down lever 247 to the left drives an automatic diaphragm lever 250 on the objective lens side to move by a spring 251, thereby the diaphragm is closed down.

In other EE modes, such as shutter priority EE, program EE, dial input diaphragm priority, and strobe EE modes, when the diaphragm setting ring 219 on the lens side is set to an EE mode, the number of diaphragm stops closed down, or the diaphragm value obtained by an AE mechanism known in the art is converted to the number of diaphragm stops closed down by the above-described maximum aperture ratio transmitting mechanism, and then processed by a servo system formed from a diaphragm signal control power source 223, lever 230, brush 231, and resistance substrate 232 to indicate and control the number of diaphragm stops closed down for the objective lens through a diaphragm signal ring 224 of the objective lens.

Figure 57:
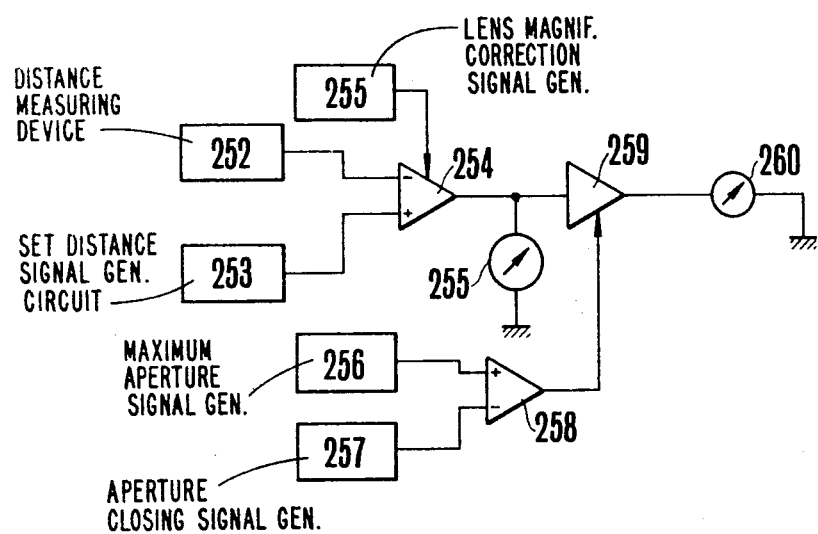
FIGS. 57 and 58 show block diagrams of two examples of the circuit system for obtaining the most suitable focus signal in accordance with the aperture ratio, the preset aperture value and so on of the photographing lens.
Figure 58:
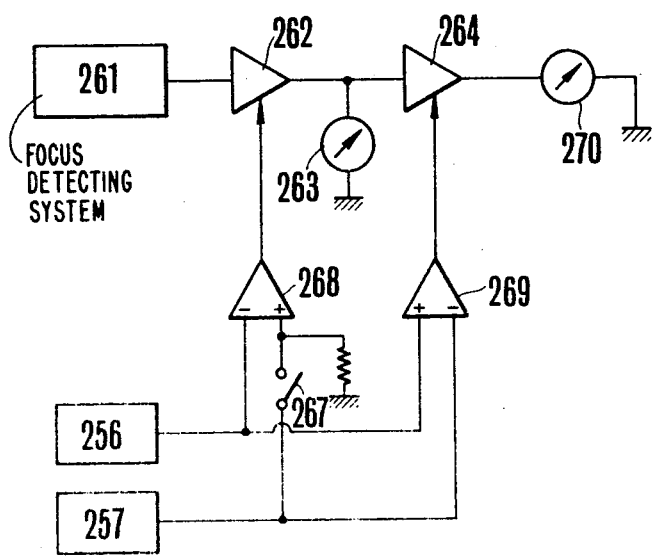

The above mechanism produces signals of the maximum aperture ratio and the number of diaphragm stops closed down so that the circuit parameters of the focus detecting device of the present invention can be controlled. FIGS. 57 and 58 show a system for controlling the operation of the camera with the information signal related to the above-described characteristics of the objective lens from the focus detecting device of the present invention, or a device of this kind for producing a general focus signal. In particular, in FIG. 57, there is shown an example of a system for controlling the output from a distance measuring device 252 of the general external distance measuring type. An object distance signal generated from the device 252 is compared with the output of an objective lens set distance signal generating circuit 253 by a difference amplifier 254, and then the correction of the longitudinal magnification is carried out by an objective lens longitudinal magnification correction signal generating circuit 255. Thus, the difference between the image plane and the predetermined focal plane is displayed by a meter M 255.

The output of an objective lens maximum aperture ratio signal generating circuit 256 and an aperture stop number signal generating circuit 257 in the comparable form are both applied to a difference amplifier 258. The output of the amplifier 258 represents the aperture ratio of the lens at the time of exposure. This signal is used in controlling the gain of the amplifier 259 to correct the in-focus detection accuracy before the amount of correction of the lens is displayed by the display meter 260. Instead of using the meter in displaying this, it is of course possible to use an LED, liquid crystal, or the like in analog or digital form.

FIG. 59 shows another example of the system using a focus detecting device of the TTL type such as the device of the present invention. The output of a TTL in-focus detecting system 261 is amplified by an amplifier 262. The gain of the amplifier 262 is controlled by the signal of the maximum aperture ratio signal generating circuit 256 when the light measurement is performed at the full open aperture. When the aperture is closed down, a diaphragm closing control switch 267 is closed to apply the output of the diaphragm closing down number signal generating circuit 257 to a difference amplifier 268 which then produces a signal representative of the number of diaphragm stops actually closed down. By this signal, the gain is controlled. And, the output of the amplifier 262 is applied to a meter 263 which displays the difference between the actual image plane and the predetermined focal plane. A difference amplifier 269 produces a signal corresponding to the output difference of the circuits 256 and 257, namely, the aperture ratio of the objective lens. This signal is applied to an amplifier 264 to control its gain so that the amount of blur of the image at the predetermined focal plane is finally displayed by the meter 270.

Another embodiment of the present invention appears in FIG. 59. This embodiment differs from the foregoing embodiments in that, as the time-sequential image scanning signal from the image sensor is treated to detect an illumination change between every two adjacent, or contiguous image elements, the foregoing embodiment utilizes the (bit) delay circuit and difference amplifier circuit in combination, the embodiment of FIG. 59 utilizes a circuit for extracting a relatively large portion of change from the signal, that is, for example, a high pass filter circuit or the like. The circuitry is thus further simplified.

In FIG. 59, an image-forming optical system 301 is movably supported by a member (not shown), having an optical axis 302. This optical system 301 is adjustable in position in a direction indicated by an arrow. At a short distance behind the predetermined focal plane of the above-described image-forming optical system (hereinafter abbreviated as optics) is arranged an image sensor 303. This image sensor 303, for example, a CCPD (tradename) available from Reticon Corp. in U.S.A. has an anti-blooming gate for preventing saturation of charged stored on the individual photoelectric transducing elements. The anti-blooming gate (to which a predetermined bias voltage is usually applied for the purpose of preventing the saturation) is fed with a pulse signal (hereinafter referred to as ICG) which turns this gate completely on to clear up the charge on the individual photoelectric transducing elements. Therefore, it is to be noted here that the time interval from the falling edge of the clear pulse ICG to the falling edge of a shaft pulse SH defines the so-called accumulation time. All the pulses $\phi 1$-$\phi 4$, RS, ICG except the shift pulse SH are supplied from a controller 304.

An image signal from the image sensor 303 includes a noise or bias due to the dark current produced in the sensor 303. Shielding part of the photo-electric transducing elements makes it possible to obtain a dark current signal from the shielded region. Responsive to this dark current signal, a dark current compensation circuit 305 removes the dark current component, so that the output of the dark current compensation circuit 305 represents a correct distribution of illumination of the image as shown in FIG. 60(a). In FIG. 60, the solid and dashed line curves show signals occurring when the image sharpness is high and low respectively. This signal is applied to a brightness evaluating circuit 306 which controls the accumulation in accordance with the brightness level of the object, and of which the details will be described later.

Figure 61:
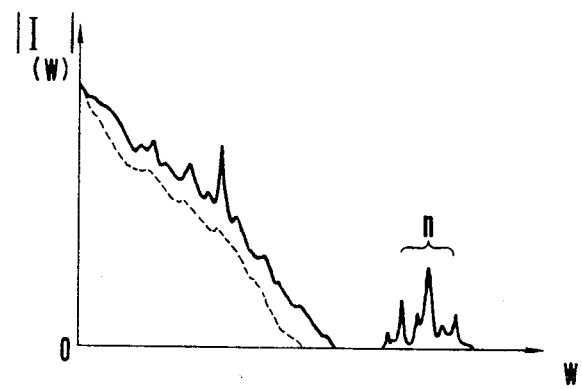

The output of the dark current compensating circuit 305, on the other hand, is applied through a high pass filter circuit 307 to a low pass filter circuit 308 which produces a signal as shown in FIG. 60(b). The high pass filter circuit 307 functions to extract the high frequency component (that is, the component of relatively large variation) from the image signal, while the low pass filter circuit 308 functions to inhibit the clock noise and the like of the image sensor 303 having the frequencies higher than that of the above-described high frequency component. In general, when the sharpness of the image is high, the high frequency component in the image signal is high. As the sharpness is decreased, that component is damped, as shown in FIG. 61 where the abscissa is in angular frequency, ω, and the ordinate is in rate, and the spectra shown by the solid and dashed lines are found when the sharpness is high and low respectively. A partial spectrum indicated by n in the figure represents the above mentioned component due to the noise. Of the above, what is here understood is that the high frequency component in the image signal which varies with the sharpness of the image is extracted by the use of a band pass filter circuit consisting of the high pass filter circuit 307 and, if necessary, the low pass filter circuit 308 in combination. The sum of such components is varied with variation of the spectrum of FIG. 61 so that if the signal of FIG. 60(b) is integrated over the entire light receiving region of the image sensor 303, the negative and positive parts of the signal are cancelled out.

In order to improve the detection accuracy, the output of the low pass filter circuit 308 is supplied to a squaring circuit 309 by which the signal is absolutized and non-linearly transformed. The squared output is shown in FIG. 60(c). The output of the square circuit 309 is integrated by an integrating circuit 310 which produces an output as shown in FIG. 60(d). In this figure, the integrated value over the entire light receiving area of the image sensor 303 is indicated by Vs.

Figure 62:
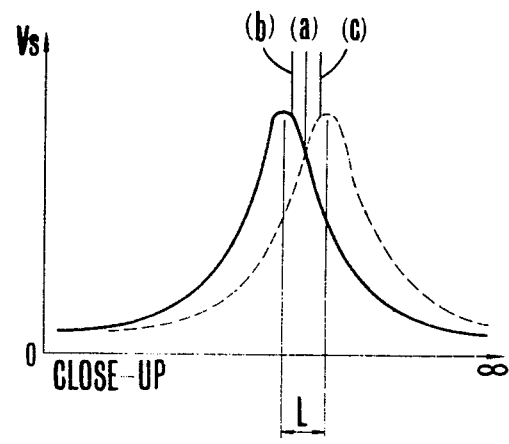

An optical path length varying member 312 such as a glass plate is arranged to go in and out the light path between the optical systems 301 and the image sensor 303 by a drive means 311. Here, as for the magnitude of Vs, the solid line curve in FIG. 60(a) shows a relatively high image sharpness, and the dashed line curve shows a relatively low image sharpness. Thus, the higher the image sharpness, the larger the magnitude of Vs. Therefore, as shown by a solid line curve in FIG. 62 where the abscissa represents the amount of axial movement of the optics, and the ordinate represents Vs, the signal forms a peak when the sharpest image is obtained. Since the above-mentioned solid curve corresponds to a condition that the optical path length varying member 312 lies in the optical path, when this member 312 is retracted therefrom, the optical path length is varied by L, with the resultant signal being shown by a dashed line curve in FIG. 62. The above-described drive means 311 is constructed so that the optical path length varying member 132 goes in and out the light path between the optical systems 301 and the image sensor 303 in predetermined time relationship.

Figure 63A:
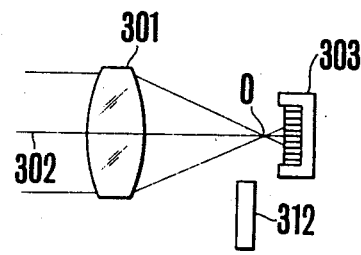
Figure 63B:
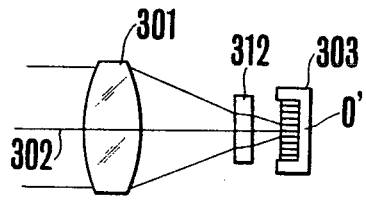
Figure 63C:
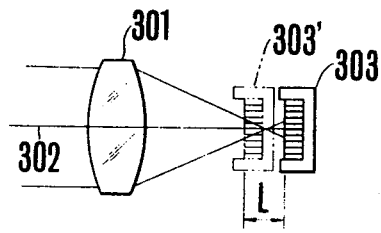

FIG. 63 shows the effect of the optical path length varying member 312. In FIG. 63(a), an image of the object is formed at a point 0 with the optical path length varying member 312 retracted from the light path. FIG. 63(b) shows a case where the optical path length varying member 312 lies in the image-forming light path. In this case, the image is shifted from the point 0 to a new point 0' by a distance equal to $$\left(1 - \frac{1}{n}\right) t$$

where n is the index of refraction of the material from which the optical path length varying member 312 is made, and t is the thickness of the member 312. That is, formed on the image sensor 303 is an image of different sharpness depending upon whether or not the optical path length varying member is in the light path. In other words, the presence of the optical path length varying member 312 in the image-forming light path effects an equivalent result to that when the image sensor 303 is moved to a position shown by dashed line curves in FIG. 63(c) without the use of the optical path length varying member 312, provided that the movement of the image sensor 303 is $$L = t\left(1 - \frac{1}{n}\right).$$

If the image sensor 303 is positioned in the rear of the predetermined focal plane of the optical systems 301 at a distance of L/2, therefore, the formation of the sharpest image on the predetermined focal plane P will result in the coincidence of the sharpnesses of two images, one of which is formed on the image sensor 303 when in no use of the optical path length varying member 312, and another which is formed when the member 312 is inserted into the light path, or at the equivalent position of the sensor 303 without the use of the member 312.

Figure 64A:
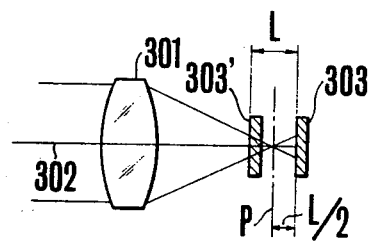
Figure 64B:
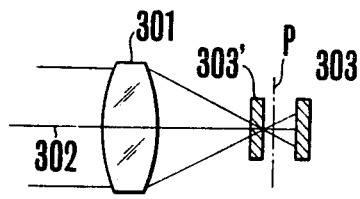

If the sharpest image is formed at a plane ahead of the predetermined focal plane P as shown in FIG. 64(b), the image at the equivalent position 303' is sharper than that at the actual position of the sensor 303. Conversely, when the sharpest image is formed in the rear of the predetermined focal plane P, the image at the solid line position of the image sensor 303 becomes sharper than that at the equivalent position 303'. This relationship is explained on the curves Vs in FIG. 62. Here, the vertical lines (a), (b) and (c) represent the three different positions of the optical systems corresponding to FIGS. 63(a), (b) and (c) respectively. In comparing the sharpnesses of successive images on the image sensor 303 as the optical path length varying member 312 goes in and out of the light path, in other words, the magnitudes of Vs. Therefore, detecting of the coincidence of the values Vs indicates that the image is correctly formed on the predetermined focal plane P. When the both values Vs differ from each other, the sharpest image is formed in the front or rear of the predetermined focal plane depending upon which Vs is larger. Accordingly, the setting of the predetermined focal plane P at the film plane in the camera or the like, or at an optically equivalent position thereto makes it possible to adjust the focus of the optical systems.

The following describes a method of comparing such values Vs' and supplying the result to display the focus condition of the optical system in the camera, or to automatically adjust the focusing of that optical system. In FIG. 59, sample-hold circuits 313 and 314 hold the output of the integration circuit 310 for a predetermined time. The sample-hold circuit 313 holds the Vs occurring, for example, when the optical path length varying member 312 is present in the light path, while the other sample-hold circuit 314 holds the Vs occurring when that member 312 is absent from the light path. Sample-hold circuits 313' and 314' sample hold the outputs of the sample-hold circuits 313 and 314 in the same timed relationship. The held values in these sample-hold circuits 313' and 314' are referred to as Vs1 and Vs2 respectively. The application of the value Vs to the sample-hold circuits 313 and 314 is controlled by a controller 304 in response to the presence and absence of the optical path length varying member 312.

Operational amplifiers 315 and 316 receptive of the Vs1, Vs2 perform subtracting and adding operations to produce outputs representative of Vs1−Vs2 and Vs1+Vs2 respectively. A focus condition signal generating circuit 317 processes the output signals from the operational amplifiers 315 and 316 to produce a control signal capable of discriminating in-focus, front and rear focus conditions, the details of which will be described later. Indicator elements 318 such as LEDs indicate which focus condition is prevalent. Indicating elements 318 may be in the form of liquid crystal, electrochromy, or LED seven-segment display elements. The above-described focus condition signal may be otherwise utilized to facilitate the realization of a so-called automatic focusing device. The controller 304 responsive to the signal from the drive means 311 for the optical path length varying member 312 for producing various control signals, namely, drive signals ($\phi1-\phi4$, RS, ICG) for the image sensor 303, control signals for the dark current compensation circuit 305, control signals for the brightness evaluating circuit 306, reset and input control signals for the integration circuit 310 and input control signals for the sample-hold circuits 313, 314, 313', 314'.

Letting the time interval in which the optical path length varying member 312 enters the light path, then stays therein for a predetermined time, then moves away therefrom, and then enters again constitute one cycle, the integration circuit 310 is reset every one half cycle for its integrated value. The sample-hold circuit 313 is set in the first half of each cycle to hold the first output of the integration circuit 310, while the sample-hold circuit 314 is set in the second half of the cycle to the second output of the integration circuit 310. At a time when the duration of each cycle is terminated, the concurrently held values of the sample-hold circuits 313, 314 are transferred to the respective sample-hold circuits 313' and 314', and their held values Vs1, Vs2 are both supplied to the operational amplifiers 315 and 316. Then, they are simultaneously reset at a time when the focus condition signal generating circuit 317 produces the focus condition signal.

Figure 65:
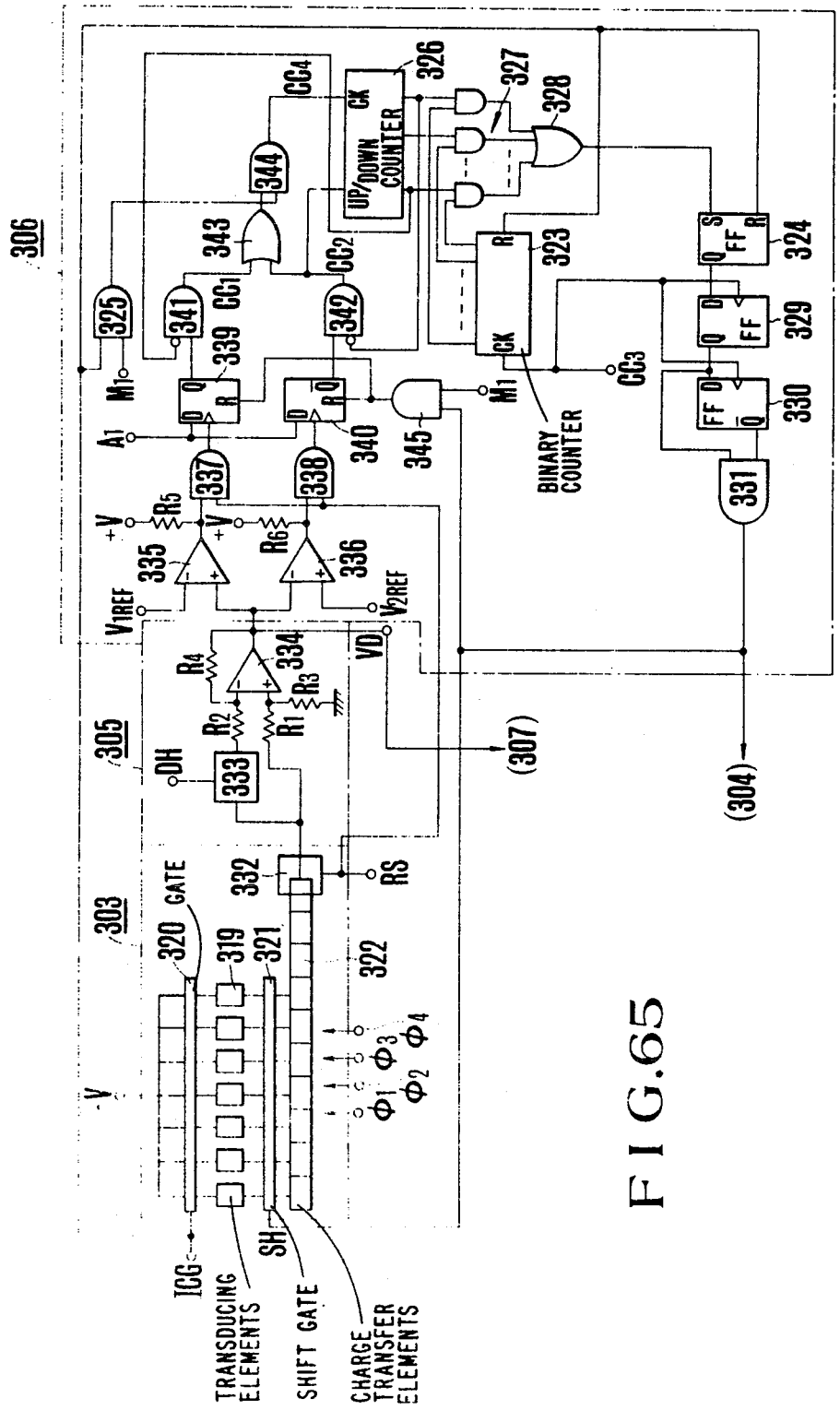

FIG. 65 shows details of an arrangement of the image sensor 303, dark current compensation circuit 305 and brightness evaluating circuit 306, which are also shown in FIG. 59, and FIGS. 66(a) to 66(l) are timing diagrams of the outputs occurring in the various circuit portions of FIG. 65. In FIG. 65, a dashed line block 303 represents the image sensor. A PN junction light receiving region 319 is composed of a group of independent photoelectric transducing elements, the number of which is n (though shown in the figure as seven for the purpose of clarity) and which are lined up. An unnecessary charge discharging gate 120 (i.e., anti-blooming gate) removes the unnecessary charge generated in the above-described PN junction region 319. When the gate 320 is supplied with the clear pulse ICG (FIG. 66(c)) from the controller 304, it is opened to discharge the unnecessary charge. A shift gate 321 serves for transferring the charge stored in the PN junction region to a region 322 composed of charge transfer elements such as CCD, or BBD in response to the shift pulse SH.

Figure 66:
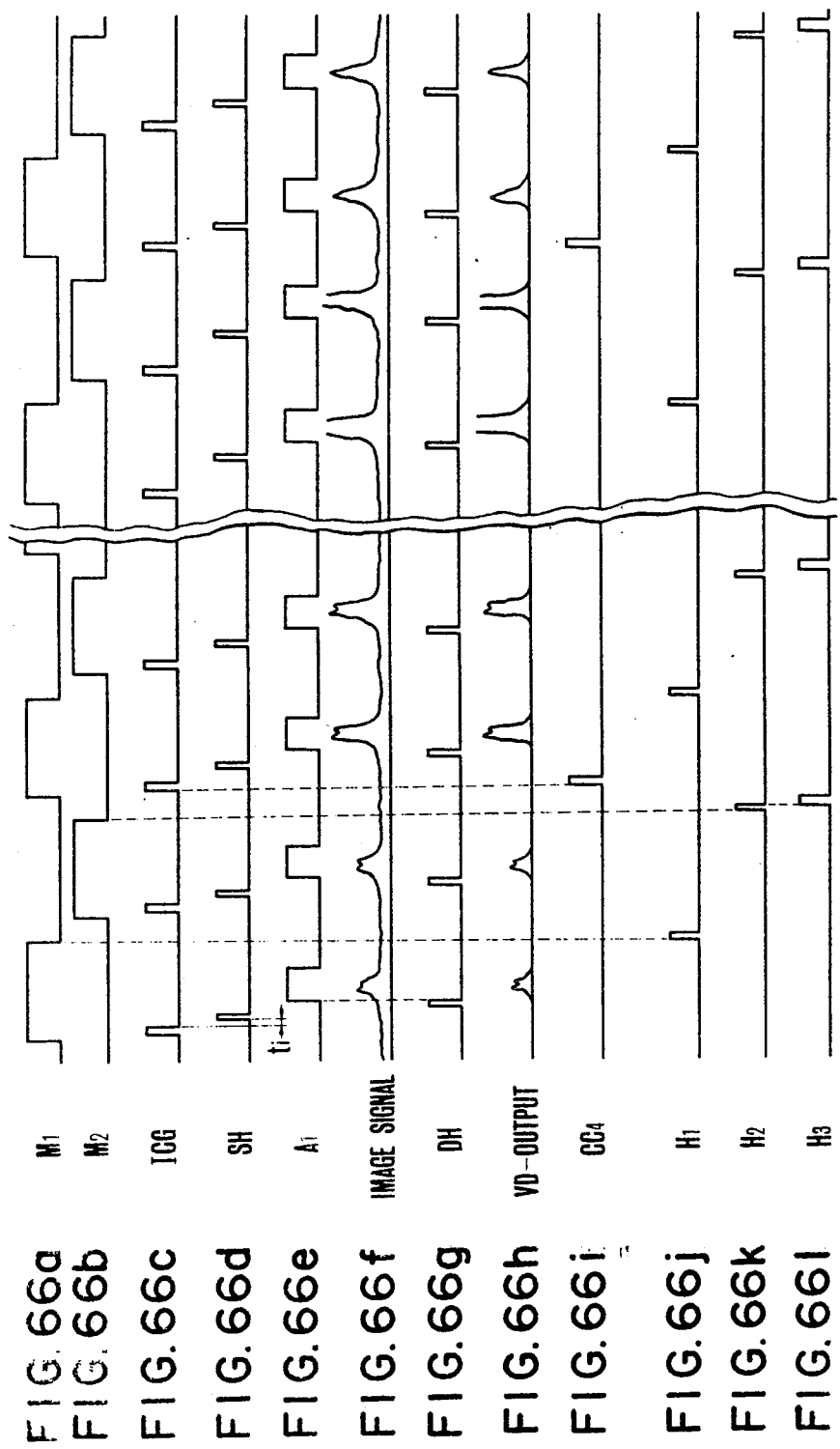

In the instant embodiment, as explained, the image signal must be read out in synchronism with the entrance and retraction of the optical path length varying member 312 into and from the light path. Hence, the controller 304 is required to produce not only actuation command signals M1, M2 (FIGS. 66(a), (b)) for the optical light path length varying member 312 but also to slightly delay the pulse ICG from the signals M1, M2, as shown in FIG. 66(c). The signal M1 is adapted, for example, to move the optical path length varying member 312 into the light path, and the signal M2 to retract that member 312 from the light path. When the pulse ICG is produced, as shown in FIG. 65, a binary counter 323 is reset by the pulse ICG, and a set-reset flip-flop 324 is reset. This pulse ICG is also applied to an AND gate 325 at one input thereof. Thus, the circuitry is set to the initial state. A binary UP-DOWN counter 326 has a decade decoder and is set in an initial state where the accumulation time is at a minimum when a main switch (not shown) of the circuitry is closed to start the operation of the circuitry.

In operation from this initial state, the binary counter 323 starts to count in response to a pulse CC2. A second pulse CC2 is produced from the controller 304 in the one half of the minimum accumulation time of the system. Therefore, when the binary counter 323 has counted n pulses CC3, a time equal to n/2 times the minimum accumulation time from the occurrence of the pulse ICG has passed. In this state, the UP-DOWN counter 326 produces the minimum accumulation time command, and one of the inputs of a leftmost AND gate in the AND gate group 327 as viewed in the figure goes high. At this time, when the least significant bit (the rightmost terminal) of the binary counter 323 produces a high, that is, when one pulse CC3 is fed, the above-identified AND gate is gated on to send a set pulse from an OR gate 328 to the set-reset flip-flop 324, and the flip-flop 324 then changes its Q output to a high level which is applied to a D type flip-flop 329 at the D input thereof. In synchronism with the supply of the subsequent pulse CC3 to the D type flip-flop 329, the Q output of the D type flip-flop 329 is changed to high. By the further subsequent pulse CC3, the Q of the D type flip-flop 330 is changed to low, so that the AND gate 331 remains high for only one period of the pulse CC3.

The above procedure is followed by the production of a pulse from the AND gate 331 which is fed to the shift gate 321 of the image sensor 303, causing the charge stored on the PN junction region 319 to be transferred to the transfer region 322. Hence, the pulse produced from the AND gate 331 serves as the shift pulse SH (FIG. 66(d)).

As is evident from the foregoing, since charge is accumulated on the PN junction region 319 of the image sensor during the time beginning with the application of the clear pulse ICG to the unnecessary charge discarding gate 320 and terminating at the application of the shift pulse SH to the shift gate 321, the time interval between these two pulses represents the accumulatiom time. In FIG. 66(d), this accumulation time is indicated by Ti. The charge on the transfer region 322 is then transferred to the right in sequence as viewed in the figure by the transfer clock pulses $\phi 1$, $\phi 2$, $\phi 3$ and $\phi 4$ and after having passed through the output gate 332, goes out as the image signal. The output gate 332 receives the reset pulse RS each time the charge for one image element is transferred. Hence, a capacitor (not shown) for converting the charge to a voltage is discharged to be ready for charging the next element charge. The image signal produced in such manner is shown in FIG. 66(f).

FIG. 66(e) illustrates pulses A1 corresponding to the view-fields to be measured. The pulses A1 are produced from the controller 304 in correspondence to the period in which the signal for the image in the view-field is read out. The image output is, on the other hand, applied to a voltage divider of resistors R1, R3 whose output is supplied not only to an amplifier 334 at a positive input terminal therefor but also to a sample-hold circuit 333. The sample-hold circuit 333 sample-holds that of the signals which is produced when a pulse DH occurring in timed relationship with the output of the gate 332 representative of the dark current compensation factor, for example, the signal from the light-shielded region of the PN junction. Since the light-shielded PN junction region for the dark current compensation is provided in the rightmost position as viewed in the figure, its signal appears just after the charge transfer starts. The output of the sample-hold circuit 333 is supplied through a resistor R2 to the amplifier 334 at the other or negative input thereof. Hence, the difference amplifier circuit of the resistors R1, R2, R3, R4 and amplifier 334 produces an output at a terminal VD in the form that subtracts the dark current component from the subsequent image signal (FIG. 66(f)). This output is shown in FIG. 66(h). The signal is supplied to the filter circuit 307 and the brightness evaluating circuit 306 which is described below in detail. Thus, the signal processing already mentioned proceeds.

The brightness evaluating circuit 306 includes comparators 335 and 336 forming a so-called window comparator, with the comparator 335 being fed at its negative input terminal with a reference voltage $V1_{REF}$ and with the comparator 336 being fed at its positive input terminal with a reference voltage $V2_{REF}$. In the instant embodiment, the $V1_{REF}$ corresponds to the upper limit of the image signal level, and the $V2_{REF}$ to the lower limit thereof. Resistors R5 and R6 connected between an electrical power source V and the respective outputs of comparators 335 and 336 to maintain the outputs of these comparators at a constant level range. AND gates 337 and 338 are arranged so that the reset pulse RS and the output signals of the individual comparators 335 and 336 are received. With such an arrangement, when the image signal level is lower than the $V2_{REF}$, the AND gate 338 produces pulses in timed relationship with the reset pulses RS, while when higher than the $V1_{REF}$, the pulses are produced from the AND gate 337 in timed relationship with the reset pulses RS. D type flip-flops 339 and 340 receive the outputs of AND gates 337 and 338 at their clock input terminals respectively and receive the view-field pulse A1 at their D inputs. This triggers the one of the flip-flops 339 and 340 which receives the output pulse from either of the AND gates 337 and 338 when the view-field pulse A is supplied, that is, when the view-field signal is read out.

The Q output of the D type flip-flop 339 is applied to one input of a gate 341 and the $\overline{Q}$ output of the D type flip-flop 340 is applied to one input of a gate 342. The gate 341 also receives the output appearing at the maximum accumulation time dependent terminal of the UP-DOWN counter 326 after having been inverted, and the gate 342 also receives the output appearing at the minimum accumulation time dependent terminal of the same after having been inverted. Therefore, only when the accumulation time value set in the UP-DOWN counter 326 exceeds the minimum or the maximum value, and the AND gates 341 and 342 receive the output of the D type flip-flop 339 or 340 do the gates 341 and 342 produce output pulses CC1, CC2 which are applied to an OR gate 343. An AND gate 325 receives the command signal M1 and the clear pulse ICG for producing an output which is applied to an AND gate 344. In such arrangement, when either one of the outputs of the AND gates 341 and 342 is high, one pulse CC4 (FIG. 66(i)) is applied to the UP-DOWN counter 326 through the OR gate 343 and AND gates 344.

The reason the output of the AND gate 325 is timed by the command signal ML and clear pulse ICG to feed the pulse CC4 to the UP-DOWN counter 326 is that when the command signals M1, M2 are produced each to one, that is, when one cycle is terminated, the completion of taking in the above-described image signals of two images must be followed by the comparison of the image sharpnesses.

As understandable from FIGS. 66(a) to 66(l), at the occurrence of the above-described timing operation, the readout of the immediately preceding two image signals has been completed, and, here, an accumulation time command for the next cycle is produced. On the other hand, when the AND gate 342 is selected to produce the pulse, the UP-DOWN counter 326 is set to the UP count mode. Otherwise it is set to the DOWN count mode. Thus, when the image signal level is smaller than the $V2_{REF}$, the UP-DOWN counter 326 is made to operate in the UP count mode and then counts one pulse from the AND gate 344 with the resultant accumulation time being elongated one unit. If the command is of the minimum or the maximum accumulation time the AND gates 341 and 342 produce no output, so that with the former command even when the image signal level is too high, the accumulation time is not shortened further, while with the latter even when the image signal level is too low, the accumulation time is no longer elongated. If the UP-DOWN counter 326 is set for an intermediate accumulation time, the binary counter 323 after having been reset by the clear pulse ICG counts a number of pulses CC3 dependent upon the accumulation time command from the UP-DOWN counter 326. This produces a high level output upon selection of the one of the output terminals which is assigned to that intermediate accumulation time along with the one of the AND gates in group 326 which is connected to that output terminal to receive the high level output. Hence, the shift pulse SH is produced. As a result, the specified accumulation time is realized. AN AND gate 34 response to the pulse SH and the command signal M1 serves for producing an output pulse by which the D type flip-flops 339 and 340 are reset to clear up the preceding result for every one cycle.

In the above, the circuitry of the invention has been explained with respect to the construction and arrangement of the various elements along with their functions and part of the operation thereof. The operation will next be explained with respect to FIGS. 66(a) to 66(l). As soon as the circuitry starts to operate, as mentioned, the minimum accumulation time command prevails so that the image signal is produced with the minimum accumulation time. Upon detection that the image signal level as is yet too low, the D type flip-flop 340 produces an output. Since the inverted input of the AND gate 342 from the UP-DOWN counter 326 is at this time high, the AND gate 344 produces a pulse CC4. At this time, the UP-DOWN counter 326 is in the UP count mode. Thus, the count is advanced one count so that a command for elongation of the accumulation time by one unit (for example, twice) occurs. Therefore, as shown in FIGS. 66(a) to 66(l), the next cycle operates with the elongated accumulation time. Hence, the image signal level is increased, as shown in the left half of that figure. Such a phenomenon occurs not only initially but also at any time when the image signal level is found to be too low. On the other hand, shown to the right half of these figures is a case where the image signal level is too high. In this latter case, the D type flip-flop 339 changes its output $\overline{Q}$ to high. And, since the UP-DOWN counter 326 is set in the DOWN count mode, a command for shortening the accumulation time one unit (for example, ½ times) is given in response to the pulse CC4. As a result, the image signal in the next cycle is controlled to an appropriate level.

Figure 67:
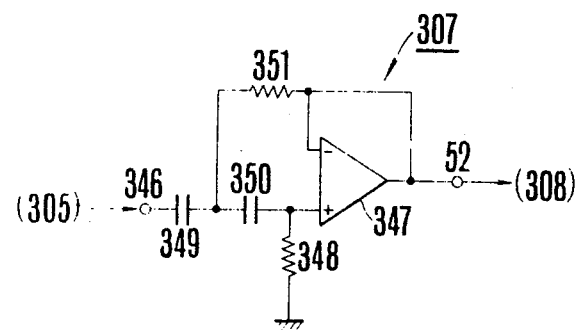

FIGS. 67 to 69(b) show examples of the construction of a filter circuit used in the instant embodiment with FIG. 67 showing a high pass filter 307 in the form of an active filter circuit comprising an amplifier 347, resistors 348 and 351 and condensers 349 and 350. Letting R denote the resistance value of the resistors 348 and 351, and C1 and C2 the value of the resistors 348 and 351, and C1 and C2 the capacitances of the capacitors 349 and 350 respectively, we have the cut-off angular frequency, $\omega o$, expressed as $$\omega o = \frac{\sqrt{2}}{RC_1} = \frac{1}{\sqrt{2}\ RC_2}$$

The damping characteristics of the filter is 12 dB/oct. The cut-off angular frequency, $\omega o$, is determined to be a suitable value by taking into account the spatial frequency of an image of an actual object. Member 346 is an input terminal, and 352 is an output terminal.

Figure 68:
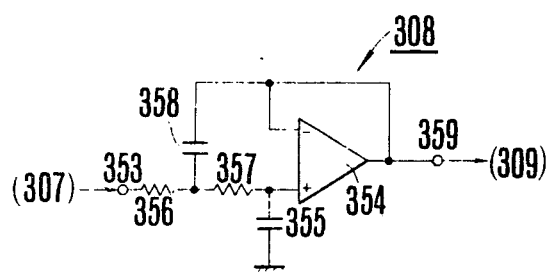

FIG. 68 shows a low pass filter circuit 308 comprising an amplifier 354, resistors 356 and 357, and capacitors 355 and 358, the arrangement of these parts being the same as in the high pass filter circuit of FIG. 67 except for the interchange of the resistors and capacitors. The formula relating the cut-off angular frequency, $\omega o$, to the resistance and the capacitance is the same as the above, and the damping factor also takes the same value. It is noted that the cut-off angular frequency, $\omega o$, is determined by taking into account the clock noise of the image sensor 303 and the like. Members 353 and 359 are input and output terminals respectively.

Figure 69A:
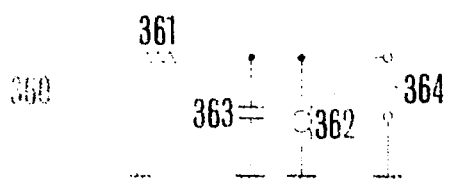
FIG. 69(a) shows a resonance circuit for extracting the high frequency component.

FIG. 60(a) shows a circuit for extracting the high frequency component from the image signal constructed in the form, not of a commonly accepted high pass filter, but of a resonance circuit. FIG. 69(a) includes input terminals 360 and output terminals 364. A resistor 361, a coil 362 and a condenser 363 are connected in series with each other and form a so-called series resonance circuit. The impedance Z of this circuit may be expressed by:

$$Z = \sqrt{R^2 + \left(\omega L - \frac{1}{\omega C}\right)^2}$$

When $\omega L = 1/\omega C$, resonance occurs. The resonance angular frequency, $\omega o$, is defined by $$\omega o = \frac{1}{\sqrt{LC}}.$$

Figure 69B:
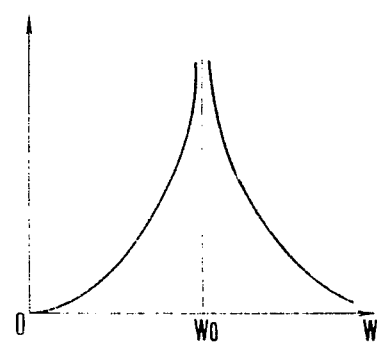
FIG. 69(b) shows a graph of the resonance angular frequency of the circuit in FIG. 69(a)

This characteristic is shown in FIG. 69(b). In the instant circuit, as the $\omega_o$ is adjusted to the neighbourhood of the upper limit of a range of spatial frequencies of the general object image, the higher the frequency, the more remarkably the various spatial frequency components are emphasized. This results in a very great advantage in the detection of the sharpness. The above-described example of filter circuit allows the gain to become constant when the cut-off angular frequency $\omega_o$ is exceeded. In comparison with the resonance circuit, therefore, there is some loss in the emphasis of the high frequency component. But, for example, by equalizing the cut-off frequencies of the high pass and low pass filter circuits to each other, it is made possible to produce an almost equivalent effect to that of the resonance circuit.

It is to be noted here that the squaring circuit 309 utilizes the construction of the one shown in FIG. 12. Also, the integration circuit 310 and the sample-hold circuits 313, 314, 313', 314' use the construction of those generally indicated at 11 and 12 in FIG. 16 respectively. Further, in this case, the integration circuit 310 is fed with the same signal as the control signal DH (FIG. 66(g)) for the dark current compensation circuit 305 as the clear signal, and with the same signal as the viewfield signal A1 (FIG. 66(c)) as the input control signal from the controller 304'. On the other hand, the sample-hold circuit 313 is fed with a sampling pulse H1 (FIG. 66(j)) based on the signal M1 (FIG. 66(a)) from the controller 304, the sample-hold circuit 314 with a sampling pulse H2 (FIG. 66(k)) on the basis of the signal M2 (FIG. 66(b)), and the sample-hold circuits 313' and 314' with a sampling pulse H3 (FIG. 66(l)) slightly delayed from the above-described sampling pulse H2.

Figure 70:
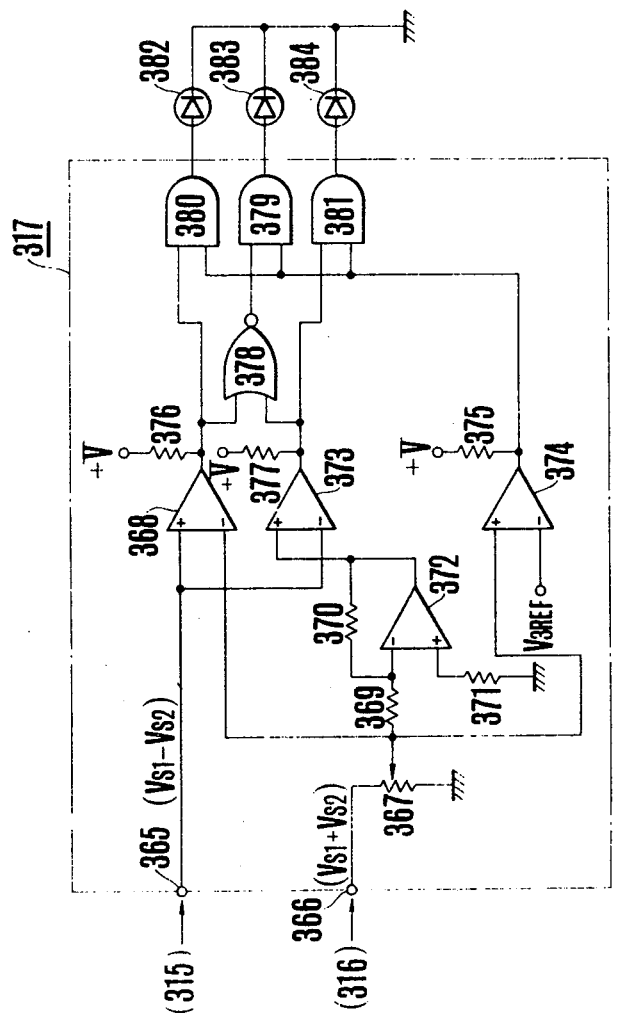

FIG. 70 shows an example of the construction of a focus condition signal generating circuit 317. Input terminals 365 and 366 are supplied with the outputs of the operational amplifiers 315 and 316 of FIG. 59, that is, the signals Vs1−Vs2 and Vs1+Vs2, respectively. The value Vs1+Vs2 is, on one hand, converted by a potentiometer 367 $\eta$(Vs1+Vs2), and, on the other hand, applied to a comparator 368 at its negative input terminal. In the comparator 368, the $\eta$(Vs1+Vs2) is compared with the value (Vs1−Vs2). The output of the potentiometer 367 is, on the other hand, applied to an inversion amplifier circuit comprising resistors 369, 370 and 371 and an amplifier 372, and after its sign is inverted, applied to a comparator 373 at its positive input terminal. In this comparator 373, the (Vs1−Vs2) is compared with −$\eta$(Vs1+Vs2). 374 is a comparator receiving a reference voltage V3$_{REF}$ for performing comparison with $\eta$(Vs1+Vs2). When this signal is lower than the $V3_{REF}$, its output is changed to the low level at which all AND gates to be described later are prevented from actuating respective LEDs. This produces a warning. On the other hand, when $\eta(Vs1+Vs2)<(Vs1-Vs2)$, the output of the comparator 368 is changed to a high, and at this time the output of the comparator 373 to a low. Conversely, when $(Vs1-Vs2)<-\eta(Vs1+Vs2)$, the output of the comparator 373 is changed to the high level, while the output of the comparator 368 is changed to the low level. In case where $-\eta(Vs1+Vs2)\leqq(Vs1-Vs2)\leqq\eta(Vs1+Vs2)$, the outputs of the comparators 368 and 373 both go low. At this time, therefore, the output of a NOR gate 378 is changed to high at which, upon combination with the condition that the output of the comparator 374 is high, that is, $\eta(Vs1+Vs2)>V3_{REF}$, the AND gate 379 changes its output to a high so that the LED 383 is lit up to indicate the in-focus condition. On the other hand, when either one of the comparators produces a high, the corresponding one of the AND gates 380 and 381 changes its output to the high level at which the LEDs 382 and 384 are selectively lit up to indicate whether a front, or rear focus condition exists, provided that the same prerequisite condition $\eta(Vs1+Vs2)>V3_{REF}$ is satisfied. On the other hand, when $\eta(Vs1+Vs2)\leqq V3_{REF}$, all the AND gates are gated off, and all the LEDs are distinguished to warn the operator.

Figure 71:
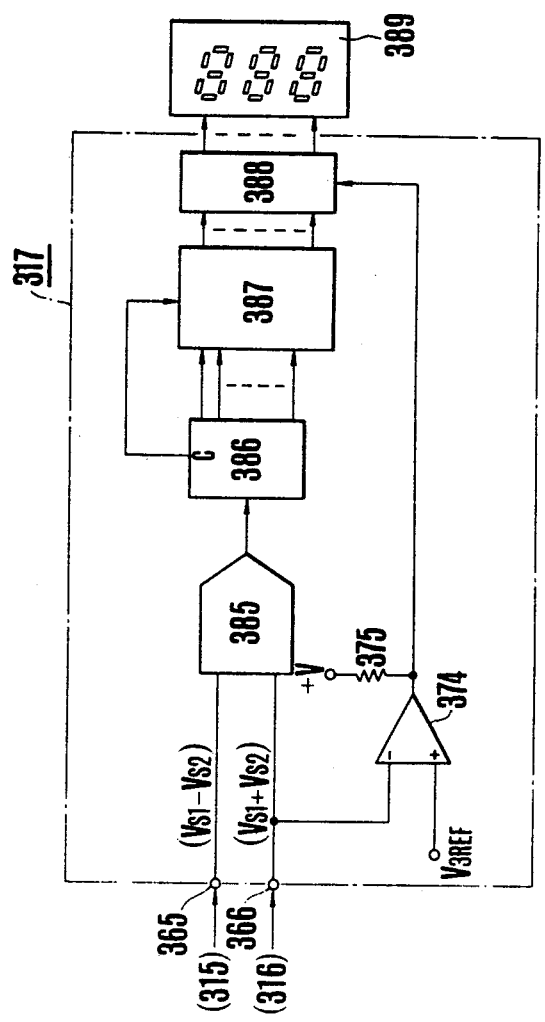

FIG. 71 shows another example of the focus condition signal generating circuit 317. A dividing circuit 385 receives the signals supplied from input terminals 365 and 366, that is, the values $(Vs1-Vs2)$ and $(Vs1+Vs2)$ for forming a signal of comparison therebetween. An A-D converter 386 receives the analog output of the dividing circuit 385 for producing a digital output signal. A decoder 387 serves for converting the output of said A-D converter 386 to a signal for controlling seven-segment display elements 389. A driver 388 drives the display elements 389 based on the output of said decoder 387. In this example, the display device 389 uses three figures as is required to display the output levels of $(Vs1-Vs2)/(Vs1+Vs2)$ with inclusion of the sign. The sign signal output terminal of the A-D converter 386 is connected to the decoder 387 upon occurrence of the sign signal to permit the decoder 387 to effect the presentation of the minus sign in the display. Further, when the output of the comparator 374 (the input to said comparator 374 is inverted as compared with that in FIG. 70) is high, that is, when the condition is not acceptable because the value $(Vs1+Vs2)$ is below the $V3_{REF}$, the driver is rendered inoperative to prevent all the seven-segment display elements 389 from being lit up. The set value of $V3_{REF}$ is not always equal to that shown in FIG. 70, but is required to be suited for directly evaluating the value $(Vs1+Vs2)$.

Figure 72:
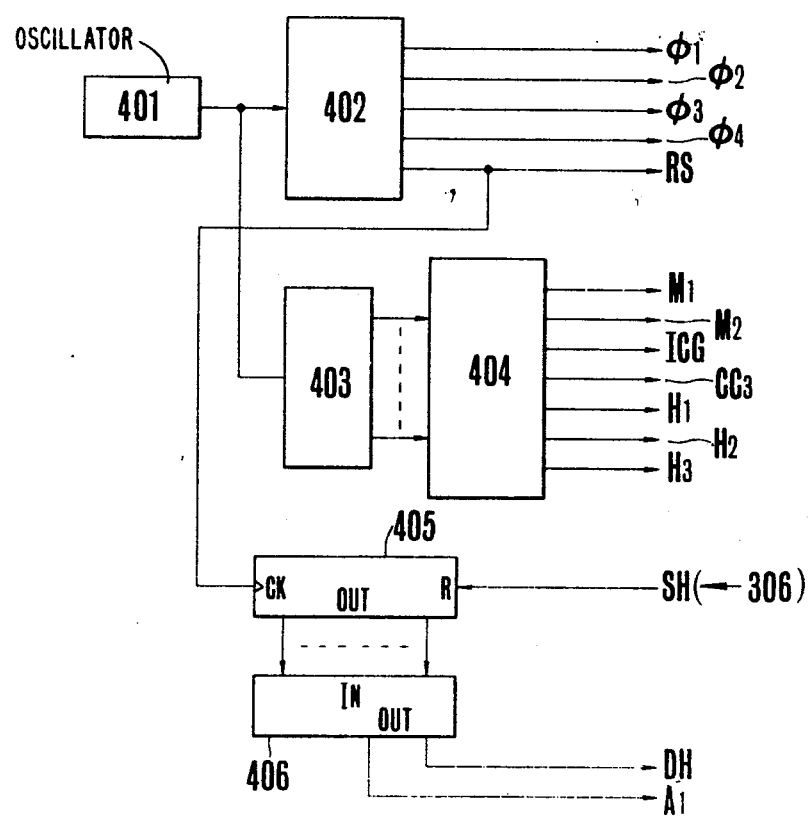

It is noted here that the above-described controller 304 is constructed as shown, for example, in FIG. 72. That is, in this figure, an oscillator 401 serves for producing standard clock pulses; a sensor driver 402 serves for producing transfer clock pulses $\phi1-\phi4$ and a reset pulse RS for the image sensor 400 based on the standard clock pulses from said oscillator 401. The circuit of FIG. 72 further includes a frequency dividing circuit 403 for dividing the frequency of standard clock pulses from the oscillator 401 to produce various timing pulses; a logic gate circuit 401 for producing the above-described described control signals M1, M2, ICG, CC3, H1, H2 and H3 based on the output pulses from said frequency dividing circuit 403; a binary counter 405 for counting the reset pulses RS produced from the above-described sensor driver 402, of which the content is cleared up by a shift pulse SH from a brightness evaluating circuit 306; and a ROM 406 whose memory content is preset so as to produce the control signal A1 and DH based on the output of said counter 405. Therefore, what is noted here is that the control signals $\phi1-\phi4$, RS, ICG, M1, M2, CC3 and H1-H3 produced are signals whose timings are individually fixedly predetermined, and, on the other hand, the control signals A1 and DH produced are signals whose timings are varied with the timing of the output of the shift pulse from the brightness evaluating circuit 306. In the instant embodiment, the accumulation time of the image sensor 4-0 is controlled within a range below a maximum value dependent upon the high level period of the control signal M1 or M2.

It is to be noted in connection with the foregoing description that the drive device 311 is constructed in the form of a stepping motor or an electromagnetic actuator arranged to move the optical path length varying member 312 into or out of the light path on the basis of the command signals M1, M2 from the controller 304. The high pass filter circuit 307 may be replaced by a resonance circuit such as shown in FIG. 69(a), or by any other suitable circuit such as a differentiating circuit, provided that those of the parts of the signal which vary over a relatively large extent can be extracted sufficiently.

Figure 73:
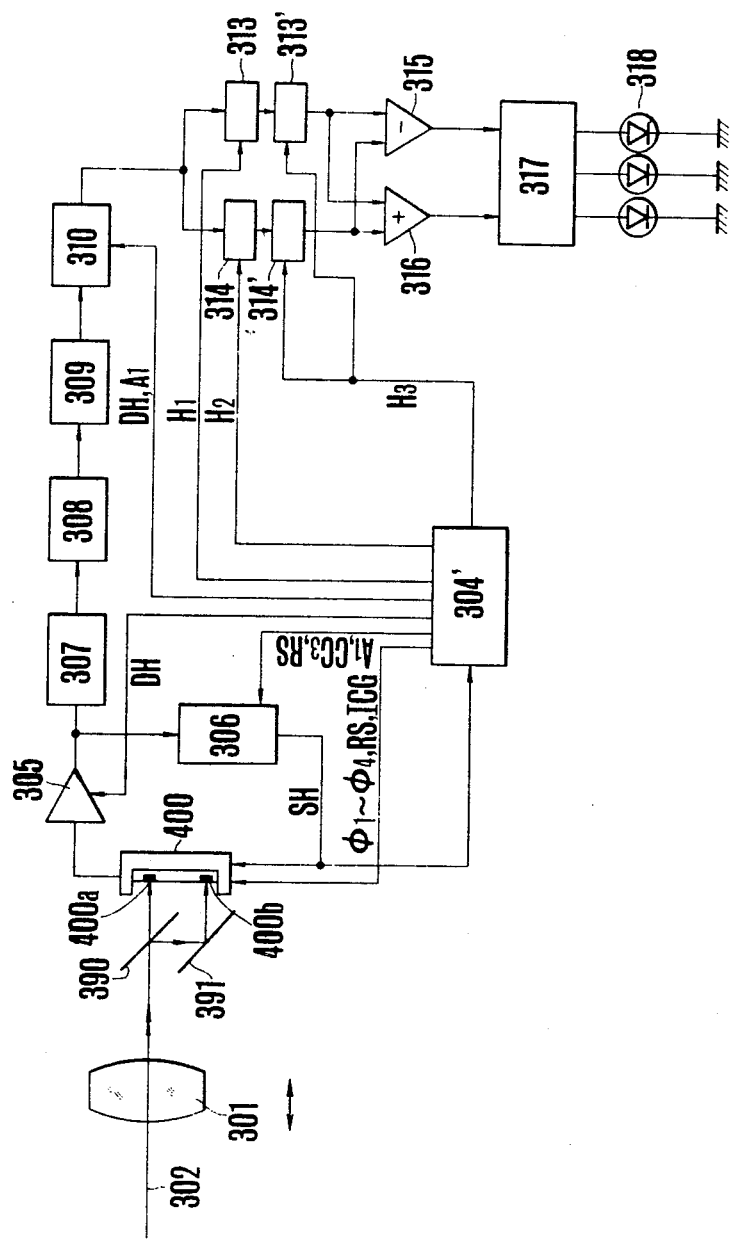
Figure 74:
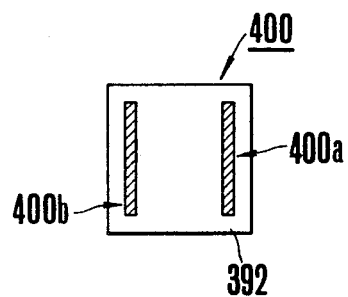

FIG. 73 shows another example of the image sensor adapted to allow for the omission of the optical path length varying member described in connection with FIG. 59 and to receive two images of the same object at a time after an optical path difference L has been imparted therebetween. The image sensor 400, unlike that shown in FIG. 59, is provided with first and second light receiving regions 400a and 400b in a common plane. These regions are elongated in a direction perpendicular to the paper. The sensor's top plane view is shown in FIG. 74. This is formed in a single chip 392. A half-mirror 390 is disposed on the optical axis 302 of the optical systems 301 to form an angle of 45°. A total reflection mirror 391 is arranged in parallel with the half-mirror 390. These mirrors 390 and 391 cooperate with each other to split an image-forming light beam from the optical system 301 into two parts which are directed to the respective light receiving regions 400a and 400b, thereby the two images are formed thereon. It is evident that these two images have the optical path difference L.

Figure 64C:
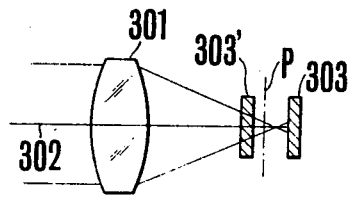

The image signals from the light receiving regions 400a and 400b are read out in a manner to be described, and then processed as described above to effect an equivalent result to that described in connection with FIG. 59. It is to be noted that as is evident from the explanation with reference to FIGS. 63 and 64, in this case, the predetermined focal plane of the optical system 301 must be positioned at a distance equal to ½ times the optical path difference L due to the half-mirror 390 and the total reflection mirror 391. In FIG. 73, a controller 304' has some portions which are different from those of the controller 304 shown in FIG. 59 in that the command for reading out the signal of the first light receiving region 400a is followed by the command for reading out the signal of the second light receiving region 400b, and that there is no need to produce the drive signal for an optical path length varying member. The brightness evaluating circuit 306 may be arranged to respond to one of the light receiving regions, for example, the region 400a, but, of course, required to control the accumulation time for both of the regions 400a and 400b.

Figure 75:
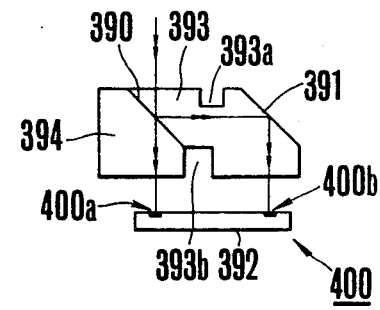

FIG. 75 shows an example of an image splitting optical system having the half-mirror 390 and the total reflection mirror 391 on a single structure. In this example, the half-mirror 390 and the total reflection mirror 391 are built by assembling two prisms 393 and 394. Cut-outs 393a and 393b serve for reducing the ghost, flare and the like. In this case, we have the optical path length difference L as defined by the following formula:

$$L = t/n$$

where t is the lateral separation between the light receiving regions, and n is the index of refraction of the material from which the prisms are made.

Figure 76:
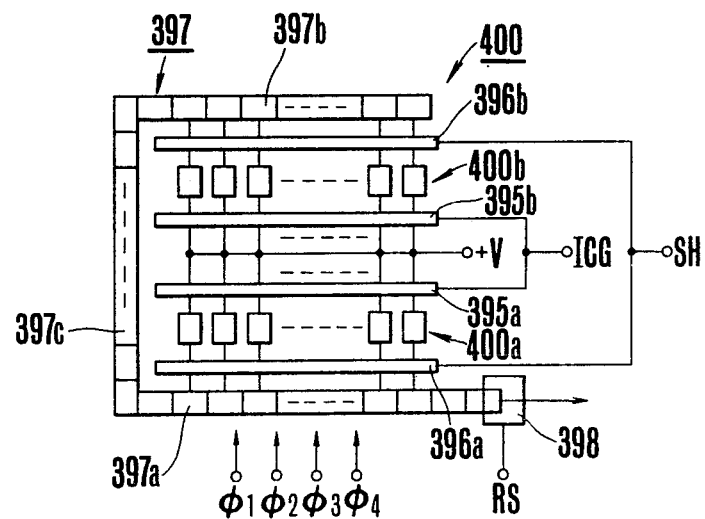

FIG. 76 shows an example of construction of the image sensor 400 suited for use in the system of FIG. 73. The sensor 400 includes unnecessary charge discarding gates 395a and 395b (that is, anti-blooming gates) which are rendered operative by the above-described clear pulse ICG, the first and second light receiving regions 400a and 400b, and shift gates 369a and 369b for shifting the charges stored on the light receiving regions 400a and 400b to a transfer region 397 in response to a shift pulse SH. The transfer region is similar to that shown in FIG. 65 in that analog shift registers are used in the construction, but as shown in the figure, the transfer region 397 is configured in the shape of a letter U with the down strokes 397a and 397b receiving the charges from the first and second light receiving regions 400a and 400b, and with the base 397c connecting the transfer portions 397a and 397b. An output portion 98 has an output which is supplied to a dark current compensating circuit 305.

In operating the image sensor of FIG. 76, when the unnecessary charge discarding gates 395a and 395b are opened by the clear pulse ICG to discard the unnecessary charge and the pulse ICG is changed to the low level, the charge for the signal is initiated to be accumulated. Then when the shift pulse SH is applied to the shift gates 396a and 396b, the signal charges from the light receiving regions 400a and 400b are shifted to the transfer region portions 397a and 397b. When the transfer pulses $\phi 1$, $\phi 2$, $\phi 3$ and $\phi 4$ are applied to the transfer region 397, signals are successively produced. At first, the charge from the first light receiving region 400a is taken out, then the charge from the second light receiving region 400b is taken out. The times at which these two signals are taken out deviate from each other by the transfer speed and the length of the interconnection region 397c connecting the transfer region portions 397a and 397b. Thus, this is taken into account in producing actuation commands for the circuit portions that follow from the controller 304'. This produces an equivalent functional result to that of the time sequential evaluation of the two image sharpnesses described in connection with FIG. 59.

What is claimed is:

1. A focus detecting device for detecting the focus of an image-forming optical system onto an object, comprising:
  (A) image scanning means arranged to receive an image of the object formed by said image-forming optical system to produce a scanned signal of the image, said scanned signal having a plurality of constituent parts; and
  (B) a circuit system for receiving said scanned image signal produced by said image scanning means and for detecting, on the basis of the image signal, the focusing condition of the optical system onto the object, said circuit system including:
    (B-1) variation detecting means for receiving said scanned image signal and for producing a variation signal indicative of variations between constituent parts of said signal;
    (B-2) non-linear transformation means for non-linearly transforming said variation signal produced from said variation detecting means; and
    (B-3) integrating means for integrating the non-linearly transformed signal by said non-linear transformation means, an output of said integration means being indicative of the focusing condition of the optical system onto the object; said variation detecting means including:
    (B-1a) a delay circuit for receiving said scanned signal produced from said image scanning means and for delaying said image signal; and
    (B-1b) a difference detecting circuit for producing said variation signal by detecting the difference between the image signal delayed by said delay circuit and the image signal not delayed;
  said circuit system further comprising:
    signal level adjusting means between said variation detecting means and said non-linear transformation means to adjust the level of an input signal to said non-linear transformation means; and
    control means electrically coupled to said integrating means and signal level adjusting means to control said signal level adjusting means based on the output of said integrating means.

2. A device according to claim 1, wherein said variation signal has a plurality of absolute value levels and said non-linear transformation means is constructed for changing each level of said variation signal produced by said variation detecting means to an extent that differs for each absolute value level of said variation signal.

3. A device according to claim 2, wherein said non-linear transformation means is constructed to amplify the variation signal so that the higher the absolute level of said variation signal, the more said variation signal is amplified.

4. The device according to claim 3, wherein said circuit system further comprises:
  absolute value converting means electrically coupled to said variation detecting means to convert said variation signal produced from said variation detecting means to an absolute value; and
  said non-linear transformation means electrically coupled to said absolute value converting means to subject the absolute value-converted signal by said absolute value converting means to non-linear transformation.

5. The device according to claim 4, wherein said non-linear transformation means is a so-called polygonal line approximating circuit.

6. The device according to claim 4, wherein said non-linear transformation means is a power circuit for raising the input signal to the (m+1)th power where m is a positive number, whereby said input signal is non-linearly transformed.

7. The device according to claim 3, wherein said non-linear transformation means is a power circuit for raising the input signal to the 2n-th power where n is a positive integer, whereby said input signal is non-linearly transformed and absolute value-converted.

8. The device according to claim 3, wherein the non-linear transform characteristic of said non-linear transformation means is arbitrarily variable; and the device further comprises: adjusting means electrically coupled to said non-linear transformation means to adjust the non-linear transform characteristic of said non-linear transformation means.

9. The device according to claim 8, wherein said adjusting means is arranged to adjust the non-linear transform characteristic of said non-linear transformation means in accordance with the aperture ratio of said optical system.

10. The device according to claim 1, wherein the amount of delay of the signal by said delay circuit is arbitrarily variable; and the device further comprises: adjusting means electrically coupled to said delay circuit to adjust the signal delay amount.

11. The device according to claim 10, wherein said adjusting means is arranged to adjust the signal delay amount of said delay circuit in accordance with the aperture ratio of said optical system.

12. The device according to claim 1, wherein said variation detecting means is arranged so that the time of each of the constituent parts of the signal from said image scanning means is arbitrarily variable; and the device further comprises:
time adjusting means electrically coupled to said variation detecting means to adjust the time of each of the constituent parts of the signal.

13. The device according to claim 12, wherein said optical system forms an aperture ratio and includes ratio indicating means for indicating the aperture ratio, and wherein said time adjusting means includes timer means coupled to the ratio indicating means to adjust the time of each of the constituent parts of variation to be detected in said image signal by said variation detecting means in accordance with the aperture ratio of said optical system.

14. The device according to claim 1, wherein said signal level adjusting means is a gain variable type amplifier circuit arranged to provide said variation signal produced from said variation detecting means to said non-linear transformation means after said variation signal has been amplified; and said control means is a gain control circuit for controlling the gain of said amplifier circuit based on the output of said integrating means.

15. The device according to one of claims 1-14, wherein said image scanning means is a signal integration type image scanning means; and said circuit system further comprises:
signal integration time control means for controlling a signal integration time of the image scanning means based on said scanned image signal produced from said image scanning means.

16. The device according to claim 15, wherein said signal integration time control means includes:
a peak detecting circuit for detecting the peak level of the scanned image signal produced from the image scanning means; and
a time control circuit for controlling said signal integration time of the image scanning means based on the peak level detected by said peak detecting circuit.

17. The device according to claim 1, wherein said non-linear transformation means is constructed to amplify the variation signal so that the higher the absolute level of said variation signal, the more said variation signal is amplified.

18. The device according to claim 17, wherein said circuit system further comprises:
absolute value converting means electrically coupled to said variation detecting means to convert said variation signal produced from said variation detecting means to an absolute value; and
said non-linear transformation means electrically coupled to said absolute value converting means to subject the absolute value-converted signal by said absolute value converting means to non-linear transformation.

19. The device according to claim 18, wherein said non-linear transformation means is a power circuit for raising the input signal to the $(m+1)$th power where m is a positive number, whereby said input signal is non-linearly transformed.

20. The device according to claim 17, wherein said non-linear transformation means is a power circuit for raising the input signal to the $(2n)$th power where n is a positive integer, whereby said input signal is non-linearly transformed and converted to an absolute value.

21. The device according to claim 1, wherein said circuit system further comprises:
control means electrically coupled to said selection circuit to control said selection circuit on the basis of each timing for said scanning means to provide said first and second image signals.

22. A device for detecting the positional relation of an image formed by an image-forming optical system with respect to a predetermined focal plane, comprising:
(A) image scanning means having first and second groups of a plurality of scanning elements, said first scanning element group being arranged in a first position forwardly spaced from said predetermined focal plane by a predetermined distance upon receipt of the image formed by said image-forming optical system to produce a first scanned image signal concerning the image at said first position, said second scanning element group being arranged in a second position rearwardly spaced from said predetermined focal plane by a predetermined distance upon receipt of the image formed by said image-forming optical system to produce a second scanned image signal concerning the image at said second position, and said scanning means providing said first and second image signals sequentially, said scanned image signals having a plurality of constituent parts; and
(B) a circuit system receiving said first and second scanned image signals provided by said image scanning means and detecting, on the basis of the image signals, the positional relation of the image formed by the optical system with respect to the predetermined focal plane, said circuit system comprising:
(B-1) variation detecting means receptive of said first and second image signals for producing a variation signal indicative of the variations between constituent parts of said scanned image signals;

(B-2) non-linear transformation means for non-linearly transforming said variation signal produced by said variation detecting means;

(B-3) integration means coupled to said non-linear transformation means for integrating the signal non-linearly transformed by said non-linear transformation means, said integration means having operational means for performing non-inversion integration of a non-linear transformation signal of said first image signal and inversion integration of a non-linear transformation signal of said second image signal from said non-linear transformation means, and having output means for indicating the positional relation of the image formed by the optical system with respect to the predetermined focal plane.

23. The device according to claim 22, wherein said variation signal has a plurality of absolute value levels and said non-linear transformation means is constructed for changing each level of said variation signal produced by said variation detecting means to an extent that differs for each absolute value level of said variation signal.

24. The device according to one of claims 17–20, 22 or 23, wherein said integration means comprises:

an integration circuit for integrating the non-linearly transformed signal by said non-linear transformation means; said operational means includes:

an inversion circuit for inverting the non-linear transformation signal from said non-linear transformation means concerning said second image signal; and a selection circuit for selectively applying the output signal of said non-linear transformation circuit and the output signal of said inversion circuit to said integration circuit.

25. A through-the-lens type focus detecting device usable with exchangeable lens systems having different optical factors, comprising:

(A) means for sensing radiation coming from an object and passed through a lens system used, said sensing means producing an electrical signal corresponding to the received radiation;

(B) means for receiving and processing said electrical signal produced by said sensing means and for discerning a focusing condition of said used lens system with respect to said object; and (C) changeover means for changing the accuracy of the focus detection of the device in accordance with the optical factor of said used lens system, said changeover means being arranged to change the degree of accuracy of the device by changing the operational characteristic of the processing means in accordance with the optical factor of the used lens system; the processing means including means for detecting changes in the signal level between two points close to each other with respect to time in the electrical signal produced by said sensing means, and the changeover means including means for changing the time interval between the two points in the electrical signal to be detected by the detecting means in accordance with the optical factor of the lens system used.

26. A through-the-lens type focus detecting device usable with exchangeable lens systems having different optical factors, comprising:

(A) means for sensing radiation coming from an object and passed through a lens system used, said sensing means producing an electrical signal corresponding to the received radiation;

(B) means for receiving and processing said electrical signal produced by said sensing means and for discerning a focusing condition of said used lens system with respect to said object; and (C) changeover means for changing the accuracy of the focus detection of the device in accordance with the optical factor of said used lens system, said changeover means being arranged to change the degree of accuracy of the device by changing the operational characteristic of the processing means in accordance with the optical factor of the used lens system; said processing means including means for non-linearly converting the electrical signal produced by the sensing means, and the changeover means including means for selecting a non-linear converting characteristic of the non-linear converting means in accordance with the optical factor of the lens system used.

27. A through-the-lens type focus detecting device usable with exchangeable lens systems having different optical factors, comprising:

(A) means for sensing radiation coming from an object and passed through a lens system used, said sensing means producing an electrical signal corresponding to the received radiation;

(B) means for receiving and processing said electrical signal produced by said sensing means and for discerning a focusing condition of said used lens system with respect to said object; and (C) changeover means for changing the accuracy of the focus detection of the device in accordance with the optical factor of said used lens system, said changeover means being arranged to change the degree of accuracy of the device by changing the operational characteristic of the processing means in accordance with the optical factor of the used lens system; the processing means including variable gain amplifying means and the changeover means including means for switching the gain of the amplifying means in accordance with the optical factor of the lens system used.

28. A device for detecting a focusing condition of an image forming optical system with respect to an object, said optical system having an optical axis and forming an image of said object whose position changes along said optical axis, said device comprising:

(A) means for sensing said image and for producing an electrical signal corresponding to the radiation distribution of the image;

(B) optical means for causing said sensing means to sense said image at a plurality of different positions along the optical axis and to produce image signals corresponding to the radiation distribution of the image at said respective positions;

(C) means for determining the focusing condition of the optical system with respect to the object on the basis of said image signals produced by said image sensing means;

and (D) means for adjusting the level of each of said electrical signals produced by said sensing means on the basis of the optical characteristic of said optical means prior to the supply of said electrical signals to said determining means.

29. The device according to claim 26, wherein said adjusting means includes means for amplifying each of said electrical signals with different gains on the basis of an optical characteristic of said optical means.

30. A device for detecting a focusing condition of an image forming optical system with respect to an object, said optical system having an optical axis for forming an image of said object whose position changes along said optical axis with respect to a predetermined focal plane, said device comprising:
- (A) means for forming electrical signals indicative of imaging conditions of said image at a plurality of different positions along the optical axis of the optical system, said positions including a first position a predetermined distance ahead of said focal plane and a second position the same distance behind the focal plane; and
- (B) means for determining the focusing condition of the optical system with respect to the object on the basis of said signals formed by said signal forming means, said determining means including:
  - (B-1) means for forming a first signal corresponding to the difference between the signals indicative of the imaging conditions of said image at said first and second positions respectively;
  - (B-2) means for forming a second signal to determine an in-focus range, the level of said second signal being changed in accordance with the changes in levels of said electrical signals formed by said signal forming means; and
  - (B-3) means for discriminating the focusing condition of said optical system with respect to the object on the basis of said first signal formed by said first signal forming means and said second signal formed by said second signal forming means.

31. The device according to claim 30, wherein said second signal forming means in said determining means is arranged to form said second signal on the basis of said electrical signals indicative of the imaging conditions of the image at the first and second positions respectively.

32. The device according to claim 31, wherein said second signal forming means is arranged to form said second signal on the basis of the sum of said electrical signals indicative of the imaging conditions of said image at said first and second positions respectively.

33. The device according to claim 32, wherein said second signal forming means is arranged to form said second signal by multiplying said sum by a constant smaller than 1.

34. The device according to claims 30, 31, 32, or 33, wherein said discriminating means produces an output indicative of the focusing condition of the optical system with respect to the object; and said determining means further includes means for controlling the output of said discriminating means on the basis of the level of said second signal formed by said second signal forming means.

35. The device according to claim 34, wherein said control means is arranged to inhibit the output of said discriminating means when the level of said second signal is below a predetermined level.

36. The device according to claims 30, 31, or 32, wherein said second signal forming means is arranged to adjust the level of said second signal on the basis of various optical factors of said optical system.

37. A device for detecting a focusing condition of an image forming optical system with respect to an object, said optical system having an optical axis for forming an image of said object whose position changes along said optical axis with respect to a predetermined focal plane, said device comprising:
- (A) means for time-sequentially forming electrical signals indicative of imaging conditions of said image at a plurality of different positions along the optical axis of the optical system respectively, said signal forming means including a plurality of image sensing means for sensing the image at the respective positions and for time-sequentially producing scanned image signals corresponding to the image at the respective positions and processing means for time-sequentially processing the scanned image signals and for time-sequentially producing said electrical signals indicative of the imaging conditions, said positions including a first position a predetermined distance ahead of the focal plane and a second position the same distance behind the focal plane;
- (B) means for discerning the focusing condition of the optical system with respect to the object on the basis of said signals formed time-sequentially by said signal forming means and producing an electrical output indicative of the focusing condition of the optical system;
- (C) means for controlling the output of said discerning means on the basis of said electrical signals formed by said signal forming means; said control means being arranged to control the output of said discerning means on the basis of the signals indicative of the imaging conditions of said image at said first and second positions; said control means being arranged to control the output of said discerning means according to the level of the sum of the signals indicative of the imaging conditions of the image at the first and second positions; said control means is arranged to inhibit the output of said discerning means when the level of said sum is below a predetermined level.

38. The device according to claim 37, wherein said discerning means is arranged to discern the focusing condition of the optical system on the basis of the difference of said signals indicative of the imaging conditions of the image at said first and second positions.

39. A device for detecting the focusing condition of an image forming optical system with respect to an object, said optical system having an optical axis and forming an image of said object whose position changes along the optical axis with respect to a predetermined focal plane, said device comprising:
- (A) means for forming electrical signals indicative of imaging conditions of the image at a plurality of different positions along the optical axis of the optical system, said positions including a first position a predetermined distance forward of the focal plane and second position the same distance to the rear of the focal plane;
- (B) discriminating means for determining the focusing condition of the optical system with respect to the object on the basis of said signals formed by said signal forming means, said discriminating means determining the focusing condition on the basis of the signals indicative of the imaging conditions of said image at said first and second positions between in-focus, near-focus, far-focus and extremely out-of-focus conditions and producing an electrical output indicating of the focusing condition of the optical system;

(C) means for indicating the focusing condition of the optical system determined by said discriminating means; and (D) means responsive to the electrical output of the discriminating means to activate said indicating means for distinctly indicating each of said in-focus, near-focus, far-focus and extremely out-of-focus conditions.

40. The device according to claim 39, wherein said indicating means includes three indication elements and said activating means is arranged to activate said three elements differently in four modes to distinctly indicate each of said in-focus, near-focus, far-focus and extremely out-of-focus conditions.

41. A device for indicating the focusing condition of an optical system with respect to an object, comprising:

(A) discriminating means for determining the focusing condition of the optical system with respect to the object between the in-focus, near-focus, far-focus, and extremely out-of-focus conditions and producing an electrical output indicative of the focusing condition of the optical system;

(B) means for indicating the focusing condition of the optical system determined by said discriminating means; and (C) means responsive to the electrical output of the discriminating means to activate said indicating means for distinctly indicating each of said in-focus, near-focus, far-focus, and extremely out-of-focus conditions.

42. The device according to claim 41, wherein said indicating means includes three indication elements and said activating means is arranged to activate said three elements differently in four modes to distinctly indicate each of said in-focus, near-focus, far-focus, and extremely out-of-focus conditions.

* * * * *